US008793019B2

(12) United States Patent
Yoshiike et al.

(10) Patent No.: US 8,793,019 B2
(45) Date of Patent: Jul. 29, 2014

(54) CONTROL DEVICE FOR LEGGED MOBILE ROBOT

(75) Inventors: Takahide Yoshiike, Saitama (JP); Masanori Takeda, Saitama (JP); Shinya Shirokura, Saitama (JP); Hiroyuki Kaneko, Saitama (JP); Tomoki Watabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 432 days.

(21) Appl. No.: 13/154,040

(22) Filed: Jun. 6, 2011

(65) Prior Publication Data
US 2011/0301756 A1 Dec. 8, 2011

(30) Foreign Application Priority Data

Jun. 7, 2010 (JP) ................................. 2010-130482

(51) Int. Cl.
*G05B 19/00* (2006.01)
*B25J 9/00* (2006.01)
*B62D 57/032* (2006.01)
*G06N 3/00* (2006.01)
B25J 13/08 (2006.01)
G05B 19/4093 (2006.01)

(52) U.S. Cl.
CPC .............. *B25J 9/0006* (2013.01); *B25J 13/085* (2013.01); *B25J 13/088* (2013.01); *B62D 57/032* (2013.01); *G05B 19/40931* (2013.01); *G06N 3/008* (2013.01)
USPC ........................... 700/253; 700/249; 700/260

(58) Field of Classification Search
CPC ....... A63H 11/14; A63H 11/18; B25J 9/0006; B25J 9/1664; B25J 11/00; B25J 11/0005; B25J 11/001; B25J 11/0015; B25J 13/085; B25J 13/088; B62D 57/032; G05B 19/40931; G05B 19/40932; G05B 2219/40264; G06N 3/008
USPC .................................... 700/253; 901/1, 46, 9
See application file for complete search history.

(56) References Cited

FOREIGN PATENT DOCUMENTS

WO 02/40224 5/2002

*Primary Examiner* — Jerrah Edwards
(74) *Attorney, Agent, or Firm* — Rankin, Hills & Clark LLP

(57) ABSTRACT

In a legged mobile robot 1 having legs 2, a first landing permissible region and a second landing permissible region for a desired landing position of a distal end portion (a foot 22) of a free leg are determined, and the desired landing position of the free leg foot is determined in a region where the first and second landing permissible regions overlap each other, to thereby generate a desired gait of the robot. The first landing permissible region is determined so as to satisfy a geometric leg motion requisite condition. The second landing permissible region is determined such that a motion continuity requisite condition and a floor reaction force element permissible range requisite condition that are related to a prescribed floor reaction force element as a constituent element of the floor reaction force can be satisfied.

7 Claims, 21 Drawing Sheets

ORIGIN OF SUPPORTING LEG COORDINATE SYSTEM

CONTROL DEVICE FOR LEGGED MOBILE ROBOT

BACKGROUND OF THE INVENTION

1. Field of the Invention

The present invention relates to a control device for a legged mobile robot.

2. Description of the Related Art

Conventionally, techniques for controlling an operation of a legged mobile robot such as a bipedal mobile robot have been proposed by the present applicant and others. According to the techniques, during a walking operation or other motions of a robot, a desired gait including a desired motion of the robot is generated in real time, and the operation of the robot is controlled to follow the desired gait.

For example, the present applicant has proposed, in Japanese Patent No. 3726081 (hereinafter, referred to as "Patent Document 1"), a technique of generating a desired gait of a robot wherein, in order to allow the robot to perform a continuous motion (motion not causing divergence that would throw the robot off balance), a cyclic gait in which a motion of the same pattern is repeated is set as a convergence target in the future of a desired motion of the robot, and the desired motion for each step of the robot is made to converge to the motion of the cyclic gait, to thereby generate the desired gait of the robot.

Such a desired gait of a legged mobile robot needs to be generated so as to be able to satisfy various kinds of kinetic or dynamic requisite conditions. For example, as to the leg motions, the ranges of movement of the joints of the legs are subject to mechanical restrictions, making it necessary to determine the desired motions of the legs within the ranges of movement of the joints.

Further, a zero moment point (ZMP) as a point of application of a floor reaction force acting on a robot should be located within a so-called supporting polygon which is determined in accordance with a contact surface of the robot leg with the floor surface. This raises the need to set a desired position of the ZMP or a desired value of the floor reaction force moment about a prescribed point of application to satisfy that condition.

Furthermore, in order to ensure a stable and continuous motion of a robot, it is necessary to generate a desired motion of the robot so that a trajectory of the desired motion converges to the motion of a cyclic gait in the future, as in the above-described Patent Document 1.

On the other hand, a legged mobile robot is configured such that, while it receives a floor reaction force as an external force via its leg coming in contact with the ground, it performs a dynamically feasible motion by the external force. Thus, in the case where a desired gait of the robot is to be generated in real time while the robot is in motion, it is desired that particularly a desired motion trajectory of the distal end portion of each leg of the robot (particularly the landing position and/or the landing time of the distal end portion of each leg of the robot) is efficiently and properly set under various kinds of requisite conditions as described above.

In general, however, objects that will be directly restricted by those requisite conditions which have to be taken into consideration when generating a desired gait of the robot differ from each other. Therefore, conventionally, a desired motion trajectory of the distal end portion of each leg would be determined in an exploratory manner, for example by repeating the processing of: firstly provisionally determining a motion trajectory of the distal end portion of each leg to satisfy a particular requisite condition that directly restricts the leg motion, then generating a desired gait of the entire robot in an experimental manner while determining a trajectory of the desired position of the ZMP and the like, and observing whether the generated desired gait satisfies other requisite conditions.

With this technique, however, it may take time to determine the desired motion trajectory of the distal end portion of each leg that makes it possible to satisfy various kinds of requisite conditions, in which case it may be difficult to determine a suitable desired motion trajectory of the distal end portion of each leg efficiently and in a short time.

SUMMARY OF THE INVENTION

In view of the foregoing, it is an object of the present invention to provide a control device for a legged mobile robot which is able to efficiently determine a motion trajectory of a distal end portion of each leg that makes it possible to satisfy a plurality of requisite conditions, and generate a desired gait that satisfies the plurality of requisite conditions, while the robot is in motion.

In order to achieve the above object, a control device for a legged mobile robot according to the present invention is a control device for a legged mobile robot having a plurality of legs extended from a base body, the control device being configured to determine, while the robot is in motion, a leg motion parameter and a floor reaction force element parameter to satisfy a plurality of kinds of requisite conditions, the leg motion parameter defining a motion trajectory of a distal end portion of each leg, the floor reaction force element parameter defining a desired trajectory of a floor reaction force element which is a prescribed constituent element of a floor reaction force to be applied to the robot, and use the leg motion parameter and the floor reaction force element parameter to generate a desired gait including at least a desired motion of the robot, to thereby control an operation of the robot so as to cause an actual gait of the robot to follow the desired gait, the plurality of kinds of requisite conditions including at least a geometric leg motion requisite condition that the motion trajectory of the distal end portion of each leg defined by the leg motion parameter becomes a motion trajectory within a geometrical range of movement of the leg, a motion continuity requisite condition that the desired trajectory of the floor reaction force element defined by the floor reaction force element parameter becomes a desired trajectory capable of implementing a continuous motion of the robot on a dynamic model expressing the dynamics of the robot, and a floor reaction force element permissible range requisite condition that a desired value of the floor reaction force element on the desired trajectory of the floor reaction force element defined by the floor reaction force element parameter falls within a prescribed permissible range, the control device including:

a first landing permissible region determining unit configured to determine a first landing permissible region, the first landing permissible region being a first permissible region for a desired landing position of a distal end portion of a free leg among the plurality of legs of the robot that is to be landed after the present time, so as to satisfy the geometric leg motion requisite condition;

a second landing permissible region determining unit configured to determine a second landing permissible region, the second landing permissible region being a second permissible region for the desired landing position that makes it possible to determine a desired trajectory of the floor reaction force element that satisfies the motion continuity requisite condition and the floor reaction force element permissible range requisite condition, on the basis of a relation at least between a change of the desired landing position of the distal end portion of the free leg and a change of the floor reaction force element satisfying the motion continuity requisite condition, and the permissible range related to the desired value of the floor reaction force element;

a leg motion parameter determining unit configured to determine the leg motion parameter such that the desired landing position of the distal end portion of the free leg is located within a region in which at least the first landing permissible region and the second landing permissible region overlap each other; and a floor reaction force element parameter determining unit configured to determine the floor reaction force element parameter defining the desired trajectory of the floor reaction force element, by using the leg motion parameter (first invention).

According to the first invention, the desired landing position of the distal end portion of the free leg is used as a typical index for determining the leg motion parameter defining a motion trajectory of the distal end portion of each leg so as to be able to satisfy the three different requisite conditions of geometric leg motion requisite conditions, motion continuity requisite condition, and floor reaction force element permissible range requisite condition.

In this case, the first landing permissible region corresponding to the geometric leg motion requisite condition as a requisite condition directly restricting the motion of each leg is determined by the first landing permissible region determining unit. Namely, the first landing permissible region is determined so as to satisfy the geometric leg motion requisite condition.

Among the plurality of requisite conditions, the motion continuity requisite condition and the floor reaction force element permissible range requisite conditions are requisite conditions that directly restrict the desired trajectory of the floor reaction force element. The floor reaction force acting on the robot is a force that acts on the robot via a leg that is in contact with the ground (or, landed on the ground). Thus, eventually, the desired trajectory of the floor reaction force element has dependence on the motion trajectory of the distal end portion of the leg that lands as appropriate (particularly, on the landing position of the free leg and the like).

That is, changing the landing position of the free leg will change the desired trajectory of the floor reaction force element that can satisfy the motion continuity requisite condition and the floor reaction force element permissible range requisite condition. This means that the motion continuity requisite condition and the floor reaction force element permissible range requisite condition are requisite conditions that indirectly restrict the desired motion trajectory of the distal end portion of each leg (particularly, the landing position of the free leg and the like).

In view of the foregoing, according to the first invention, there is provided the second landing permissible region determining unit that is configured to determine the second landing permissible region which is the second permissible region for the desired landing position that can determine a desired trajectory of the floor reaction force element that satisfies the motion continuity requisite condition and the floor reaction force element permissible range requisite condition, on the basis of a relation at least between a change of the desired landing position of the distal end portion of the free leg and a change of the floor reaction force element satisfying the motion continuity requisite condition as well as the permissible range related to the desired value of the floor reaction force element.

This causes the motion continuity requisite condition and the floor reaction force element permissible range requisite condition to be converted into the second landing permissible region.

Then, according to the first invention, the leg motion parameter determining unit determines the leg motion parameter such that the desired landing position of the distal end portion of the free leg is within a region where at least the first landing permissible region and the second landing permissible region overlap each other. Further, the floor reaction force element parameter determining unit uses the leg motion parameter to determine the floor reaction force element parameter that defines the desired trajectory of the floor reaction force element.

In this case, the leg motion parameter is determined such that the desired landing position of the distal end portion of the free leg is located within the region where at least the first and second landing permissible regions overlap each other. This allows the floor reaction force element parameter defining the desired trajectory of the floor reaction force element that can satisfy the motion continuity requisite condition and the floor reaction force element permissible range requisite condition to be determined without the need of repeatedly adjusting the leg motion parameter.

For example, determining the floor reaction force element parameter so as to satisfy the motion continuity requisite condition out of the motion continuity requisite condition and the floor reaction force element permissible range requisite condition basically makes it possible to determine a floor reaction force element parameter defining a desired trajectory of the floor reaction force element that can satisfy not only the motion continuity requisite condition but also the floor reaction force element permissible range requisite condition.

Therefore, according to the first invention, it is possible, while the legged mobile robot is in motion, to efficiently determine a motion trajectory of the distal end portion of each leg that makes it possible to satisfy the geometric leg motion requisite condition, the motion continuity requisite condition, and the floor reaction force element permissible range requisite condition, and to generate a desired gait satisfying those requisite conditions.

It is noted that in the case of generating a desired motion of the robot using the leg motion parameter and the floor reaction force element parameter in the first invention, the desired motion of the entire robot including the desired motion of the base body thereof may be determined for example on the premise of the desired motion trajectory of the distal end portion of each leg that is defined by the leg motion parameter, such that the desired trajectory of the floor reaction force element that is defined by the floor reaction force element parameter is satisfied on the dynamic model that expresses the dynamics of the robot.

Alternatively, for example in the case of performing feedback control of an actual posture of the body of the robot or an actual position of the overall center-of-gravity point thereof to the corresponding desired value in the desired motion of the robot, a feedback manipulated variable of the floor reaction force element on the dynamic model may be determined in accordance with a deviation of the actual posture of the body or the actual position of the overall center-of-gravity point from its desired value, and the desired motion of the entire robot may be determined so as to satisfy a corrected trajectory that is obtained by adding the feedback manipulated variable to the desired trajectory of the floor reaction force element.

In the first invention, it is preferable that the control device further includes a third landing permissible region determining unit configured to determine a third landing permissible region, the third landing permissible region being a third permissible region for the desired landing position of the distal end portion of the free leg, on the basis of information about the environment surrounding the robot, wherein the leg motion parameter determining unit determines the leg motion parameter such that the desired landing position of the distal end portion of the free leg is located within a region in which at least the first landing permissible region, the second landing permissible region, and the third landing permissible region overlap one another (second invention).

The information about the environment includes information about the shapes and/or properties of the floor surface (for example, information about presence/absence of an irregularity or a step on the floor, how slippery the floor is, and the like), and information about an obstacle such as an object arranged on the floor surface.

According to the second invention, the third landing permissible region can be determined by excluding a portion on the floor surface on which the free leg of the robot should be prevented from landing, including a portion with irregularity or step on the floor surface, a slippery portion of the floor surface, and an obstacle arranged on the floor surface. This makes it possible to determine the leg motion parameter such that the desired landing position of the distal end portion of the free leg becomes an appropriate position reflecting not only the geometric leg motion requisite condition, the motion continuity requisite condition, and the floor reaction force element permissible range requisite condition, but also a constraint depending on the environment surrounding the robot.

Further, in the first or second invention, the motion continuity requisite condition is preferably a condition for example that, in the case where the desired trajectory of the floor reaction force element defined by the floor reaction force element parameter is input into the dynamic model to generate a motion of the robot, a trajectory of the generated motion converges to a motion trajectory in a cyclic gait, the cyclic gait being a gait in which a motion of a same pattern of the robot is repeated periodically (third invention).

According to the third invention, the desired gait can be generated such that a continuous motion of the robot (motion that would not throw the robot off balance) can be performed stably.

Further, in the first through third inventions, in the case where the leg motion parameter determining unit is configured to determine the leg motion parameter so as to allow a desired landing time of the free leg to be adjusted within a prescribed permissible range, the second landing permissible region determining unit preferably determines the second landing permissible region on the basis of a relation among a change of the desired landing position of the distal end portion of the free leg, a change of the desired landing time of the distal end portion of the free leg, and a change of the floor reaction force element satisfying the motion continuity requisite condition, the permissible range related to the desired value of the floor reaction force element, and the permissible range related to the desired landing time of the free leg (fourth invention).

According to the fourth invention, the second landing permissible region is determined on the basis of: a relation among a change of the desired landing position of the distal end portion of the free leg, a change of the desired landing time of the distal end portion of the free leg, and a change of the floor reaction force element that satisfies the motion continuity requisite condition; the permissible range related to the desired value of the floor reaction force element; and the permissible range related to the desired landing time of the free leg. This enables the second landing permissible region to be determined inclusive of the influence of the adjustment of the desired landing time within the permissible range related to the desired landing time of the free leg.

In this case, when the desired landing position of the distal end portion of the free leg is determined within the region where the first and second landing permissible regions overlap each other, the desired landing time of the distal end portion of the free leg is restricted correspondingly. This allows the desired landing position and the desired landing time to be readily determined in association with each other. Accordingly, it is possible to efficiently determine the leg motion parameter appropriate for satisfying the above-described three requisite conditions, while securing degrees of freedom of both of the desired landing position and the desired landing time.

Furthermore, in the first through fourth inventions, it is suitable that the floor reaction force element is a position of a ZMP as a point of application of a total floor reaction force acting on the robot, and that the permissible range related to the desired value of the floor reaction force element is an existence permissible region of the ZMP set within a supporting polygon determined in accordance with a contact surface of the robot with a floor surface (fifth invention).

According to the fifth invention, the relation between the change of the desired landing position of the distal end portion of the free leg and the change of the floor reaction force element satisfying the motion continuity requisite condition, or the relation among the change of the desired landing position of the distal end portion of the free leg, the change of the desired landing time of the distal end portion of the free leg, and the change of the floor reaction force element satisfying the motion continuity requisite condition, is increased in terms of linearity, thereby facilitating the processing for determining the second landing permissible region.

Furthermore, in the first through third inventions, in the case where the floor reaction force element is a position of a ZMP as a point of application of a total floor reaction force acting on the robot, and the permissible range related to the desired value of the floor reaction force element is an existence permissible region of the ZMP set within a supporting polygon determined in accordance with a contact surface of the robot with a floor surface, it is preferable that the control device further includes:

a leg motion parameter provisionally determining unit configured to determine a provisional value of the leg motion parameter such that the desired landing position of the free leg is within the first landing permissible region;

a floor reaction force element parameter provisionally determining unit configured to use the determined provisional value of the leg motion parameter to determine a provisional value of the floor reaction force element parameter defining a desired trajectory of the position of the ZMP which is the floor reaction force element so as to satisfy at least the floor reaction force element permissible range requisite condition;

a ZMP correction amount determining unit configured to use a provisional ZMP trajectory which is a desired trajectory of the position of the ZMP defined by the determined provisional value of the floor reaction force element parameter and the dynamic model to determine a ZMP correction amount for correcting the provisional ZMP trajectory so as to satisfy the motion continuity requisite condition; and a determining unit configured to determine whether a position of the ZMP obtained by correcting the provisional ZMP trajectory by the determined ZMP correction amount is within the existence permissible region; wherein in the case where the determination result of the determining unit is negative, the second landing permissible region determining unit calculates a change amount of the ZMP correction amount in the case where the desired landing position of the free leg is changed by a prescribed amount from the desired landing position defined by the determined provisional value of the leg motion parameter to thereby determine a landing position-floor reaction force element interrelation parameter defining a relation between a change of the desired landing position of the distal end portion of the free leg and a change of the floor reaction force element satisfying the motion continuity requisite condition, and converts the permissible range related to the desired value of the floor reaction force element into a permissible region for the desired landing position of the distal end portion of the free leg, in accordance with the relation defined by the landing position-floor reaction force element interrelation parameter, to thereby determine the second landing permissible region (sixth invention).

According to the sixth invention, in the case where the determination result by the determining unit is affirmative, the provisional value of the leg motion parameter eventually defines a motion trajectory of the distal end portion of each leg that makes it possible to satisfy the geometric leg motion requisite condition, the motion continuity requisite condition, and the floor reaction force element permissible range requisite condition.

Therefore, in this case, the desired gait of the robot may be generated by using the desired motion trajectory of the distal end of each leg defined by the provisional value of the leg motion parameter and the ZMP trajectory (trajectory of the desired position of the ZMP) that is obtained by correcting the provisional ZMP trajectory defined by the provisional value of the floor reaction force element parameter by the determined ZMP correction amount, without the need of determining the second landing permissible region.

On the other hand, in the case where the determination result by the determining unit is negative, it is necessary to determine the second landing permissible region so as to determine anew the leg motion parameter that defines the motion trajectory of the distal end portion of each leg that makes it possible to satisfy the geometric leg motion requisite condition, the motion continuity requisite condition, and the floor reaction force element permissible range requisite condition.

In this case, the second landing permissible region determining unit determines the landing position-floor reaction force element interrelation parameter by calculating a change amount of the ZMP correction amount in the case where the desired landing position of the free leg is changed by a prescribed amount from the desired landing position defined by the determined provisional value of the leg motion parameter. As a result, it is possible to determine the landing position-floor reaction force element interrelation parameter that is highly reliable as a parameter defining the relation between the change of the desired landing position of the distal end portion of the free leg and the change of the floor reaction force element satisfying the motion continuity requisite condition.

Then, the second landing permissible region determining unit determines the second landing permissible region by converting the permissible range related to the desired value of the floor reaction force element into the permissible region for the desired landing position of the distal end portion of the free leg in accordance with the relation defined by the landing position-floor reaction force element interrelation parameter determined as described above. As a result, it is possible to appropriately determine the second landing permissible region that can determine the desired trajectory of the floor reaction force element that satisfies the motion continuity requisite condition and the floor reaction force element permissible range requisite condition.

Consequently, it is possible to quickly and efficiently determine the appropriate leg motion parameter and floor reaction force element parameter that can satisfy the geometric leg motion requisite condition, the motion continuity requisite condition, and the floor reaction force element permissible range requisite condition, to thereby generate a desired gait.

Furthermore, according to the sixth invention, the processing by the second landing permissible region determining unit is performed only in the case where the determination result by the determining unit is negative. This can reduce the calculation load of the desired gait generating processing.

Further, in the fourth invention, in the case where the floor reaction force element is a position of a ZMP as a point of application of a total floor reaction force acting on the robot, and the permissible range related to the desired value of the floor reaction force element is an existence permissible region of the ZMP set within a supporting polygon determined in accordance with a contact surface of the robot with a floor surface, it is preferable that the control device further includes:

a leg motion parameter provisionally determining unit configured to determine a provisional value of the leg motion parameter such that the desired landing position of the free leg is within the first landing permissible region;

a floor reaction force element parameter provisionally determining unit configured to use the determined provisional value of the leg motion parameter to determine a provisional value of the floor reaction force element parameter defining a desired trajectory of the position of the ZMP which is the floor reaction force element so as to satisfy at least the floor reaction force element permissible range requisite condition;

a ZMP correction amount determining unit configured to use a provisional ZMP trajectory which is a desired trajectory of the position of the ZMP defined by the determined provisional value of the floor reaction force element parameter and the dynamic model to determine a ZMP correction amount for correcting the provisional ZMP trajectory so as to satisfy the motion continuity requisite condition; and a determining unit configured to determine whether a position of the ZMP obtained by correcting the provisional ZMP trajectory by the determined ZMP correction amount is within the existence permissible region; wherein in the case where the determination result of the determining unit is negative, the second landing permissible region determining unit calculates a change amount of the ZMP correction amount in the case where the desired landing position of the free leg is changed by a prescribed amount from the desired landing position defined by the determined provisional value of the leg motion parameter and a change amount of the ZMP correction amount in the case where the desired landing time of the free leg is changed by a prescribed amount from the desired landing time defined by the determined provisional value of the leg motion parameter to thereby determine a landing position-landing time-floor reaction force element interrelation parameter defining a relation among a change of the desired landing position of the distal end portion of the free leg, a change of the desired landing time of the distal end portion of the free leg, and a change of the floor reaction force element satisfying the motion continuity requisite condition, and converts the permissible range related to the desired value of the floor reaction force element and the permissible range related to the desired landing time of the distal end portion of the free leg into a permissible region for the desired landing position of the distal end portion of the free leg, in accordance with the relation defined by the landing position-landing time-floor reaction force element interrelation parameter, to thereby determine the second landing permissible region (seventh invention).

According to the seventh invention, in the case where the determination result by the determining unit is affirmative, the provisional value of the leg motion parameter eventually defines a motion trajectory of the distal end portion of each leg that makes it possible to satisfy the geometric leg motion requisite condition, the motion continuity requisite condition, and the floor reaction force element permissible range requisite condition, as in the sixth invention. Therefore, in this case, the desired gait of the robot may be generated by using the desired motion trajectory of the distal end of each leg defined by the provisional value of the leg motion parameter and the ZMP trajectory (trajectory of the desired position of the ZMP) that is obtained by correcting the provisional ZMP trajectory defined by the provisional value of the floor reaction force element parameter by the determined ZMP correction amount, without the need of determining the second landing permissible region.

On the other hand, in the case where the determination result by the determining unit is negative, it is necessary to determine the second landing permissible region, as in the sixth invention.

In this case, according to the seventh invention, the second landing permissible region determining unit determines the landing position-landing time-floor reaction force element interrelation parameter by calculating a change amount of the ZMP correction amount in the case where the desired landing position of the free leg is changed by a prescribed amount from the desired landing position defined by the determined provisional value of the leg motion parameter, and a change amount of the ZMP correction amount in the case where the desired landing time of the free leg is changed by a prescribed amount from the desired landing time defined by the determined provisional value of the leg motion parameter.

As a result, it is possible to determine the landing position-landing time-floor reaction force element interrelation parameter that is highly reliable as a parameter defining the relation among the change of the desired landing position of the distal end portion of the free leg, the change of the desired landing time of the distal end portion of the free leg, and the change of the floor reaction force element satisfying the motion continuity requisite condition.

Then, the second landing permissible region determining unit determines the second landing permissible region by converting the permissible range related to the desired value of the floor reaction force element and the permissible range related to the desired landing time of the distal end portion of the free leg into the permissible region for the desired landing position of the distal end portion of the free leg in accordance with the relation defined by the landing position-landing time-floor reaction force element interrelation parameter determined as described above. As a result, it is possible to appropriately determine the second landing permissible region that can determine the desired trajectory of the floor reaction force element that satisfies the motion continuity requisite condition and the floor reaction force element permissible range requisite condition, inclusive of the influence of the adjustment of the desired landing time of the distal end portion of the free leg.

Consequently, it is possible to quickly and efficiently determine the appropriate leg motion parameter and floor reaction force element parameter that can satisfy the geometric leg motion requisite condition, the motion continuity requisite condition, and the floor reaction force element permissible range requisite condition, to thereby generate a desired gait.

Furthermore, according to the seventh invention, the processing by the second landing permissible region determining unit is performed only in the case where the determination result by the determining unit is negative, as in the sixth invention. This can reduce the calculation load of the desired gait generating processing.

DESCRIPTION OF THE PREFERRED EMBODIMENTS

First Embodiment

Hereinafter, a first embodiment of the present invention will be described by taking a bipedal mobile robot as an example of the legged mobile robot.

Figure 1:
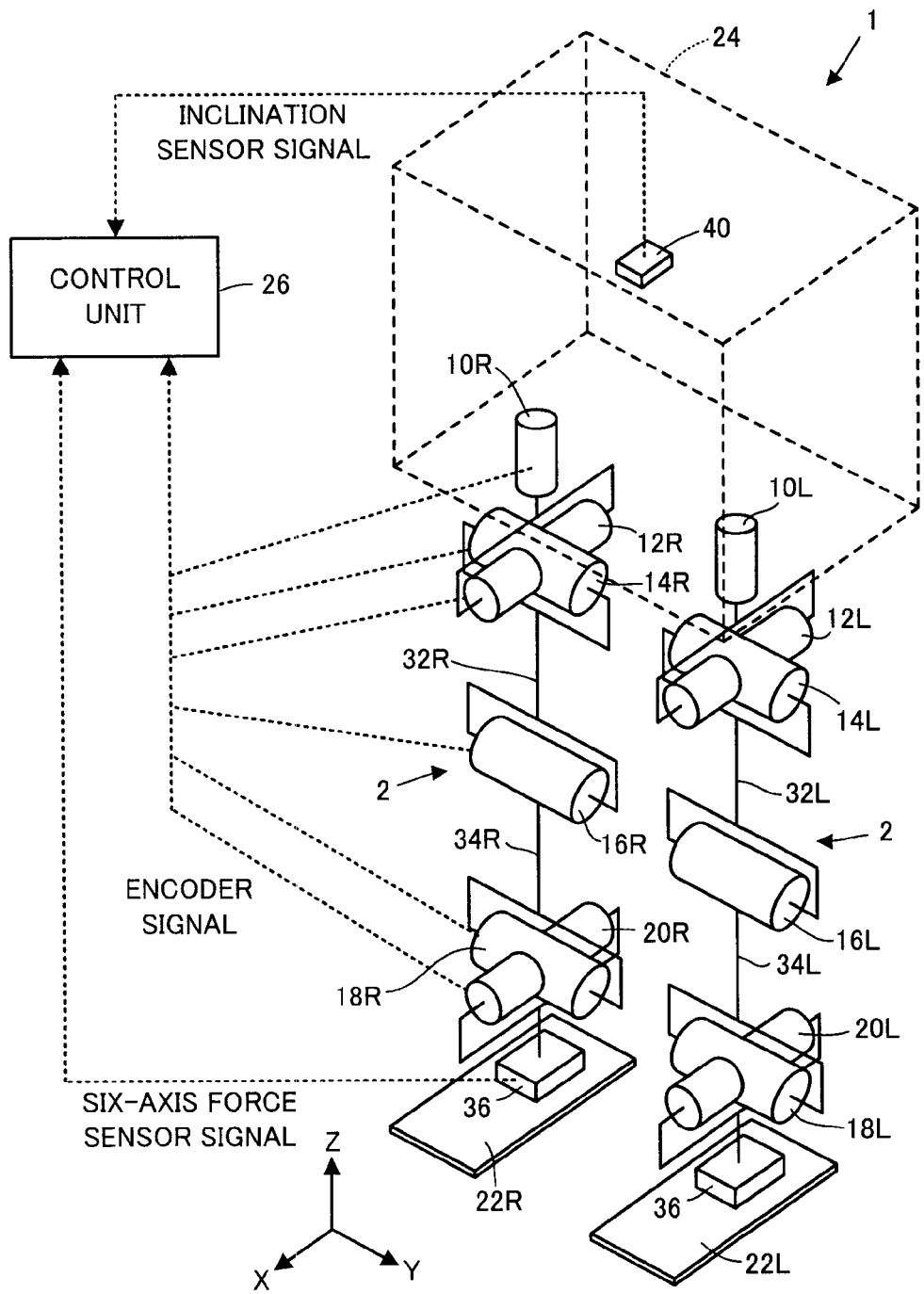
FIG. 1 is a perspective view schematically showing a construction of a bipedal mobile robot as a legged mobile robot according to a first embodiment of the present invention.

Referring to FIG. 1, a bipedal mobile robot 1 (hereinafter, simply referred to as the "robot 1") of the present embodiment includes a body 24 as a base body, and a pair of right and left legs 2, 2, extended from the body 24 as a moving mechanism for causing the body 24 to move on a floor surface.

The body 24 is connected to the proximal end portions (upper end portions) of the legs 2, 2 through waist joints (hip joints), which will be described later, so as to be supported above the floor surface by one or both of the legs 2, 2 in contact with the floor.

The legs 2, 2 share the same construction, each having six joints. The six joints are, in order from the body 24 side, a joint 10R or 10L for turning the waist (hip) (for rotation in a yaw direction relative to the body 24), a joint 12R or 12L for turning the waist (hip) in a roll direction (about the X axis), a joint 14R or 14L for rotating the waist (hip) in a pitch direction (about the Y axis), a joint 16R or 16L for rotating a knee in the pitch direction, a joint 18R or 18L for rotating an ankle in the pitch direction, and a joint 20R or 20L for rotating the ankle in the roll direction.

In the description of the present embodiment, the symbols R and L mean that they correspond to the right leg and the left leg, respectively. The X, Y, and Z axes correspond to three coordinate axes of a supporting leg coordinate system, which will be described later. The X-axis direction and the Y-axis direction in the supporting leg coordinate system are orthogonal to each other on a horizontal plane. The X-axis direction corresponds to the longitudinal direction (the roll axis direction) of the robot 1, while the Y-axis direction corresponds to the lateral direction (the pitch axis direction) of the robot 1. The Z-axis direction is the vertical direction (the gravitational direction), which corresponds to the up and down direction (the yaw axis direction) of the robot 1.

The joints 10R (L), 12R (L), and 14R (L) of each leg 2 constitute a waist joint (hip joint) having three degrees of freedom, the joint 16R (L) constitutes a knee joint having one degree of freedom, and the joints 18R (L) and 20R (L) constitute an ankle joint having two degrees of freedom.

The waist joint (hip joint) 10R (L), 12R (L), 14R (L) is connected to the knee joint 16R (L) by a thigh link 32R (L), while the knee joint 16R (L) is connected to the ankle joint 18R (L), 20 R (L) by a crus link 34R (L). Below the ankle joint 18R (L), 20R (L) of each leg 2, a foot 22R (L) is attached to constitute a distal end portion (lower end portion) of each leg 2. The upper end portion (proximal end portion) of each leg 2 is connected to the body 24 via the waist joint (hip joint) 10R (L), 12R (L), 14R (L).

Each of the above-described joints may have a structure well known in the art, which may be the one proposed by the present applicant in Japanese Patent Application Laid-Open No. 3-184782. In this case, an actuator for rotating each joint is made up of an electric motor 42 (see FIG. 2) provided with a reduction gear mechanism.

With the above-described construction of each leg 2, the foot 22R (L) of each leg 2 has six degrees of freedom relative to the body 24. During a travel of the robot 1, desired motions of the two feet 22R and 22L can be accomplished by driving 6*2=12 joints of the two legs 2, 2 (in this description, "*" denotes multiplication in scalar calculation and denotes an outer product in vector calculation) at appropriate angles. This arrangement enables the robot 1 to implement motions for traveling in a three-dimensional space, such as a walking operation or a running operation.

Although not shown in the figure, in the present embodiment, a pair of right and left arms is attached to the respective sides of the upper portion of the body 24, and a head is mounted on top of the body 24. Each arm is provided with a plurality of joints (shoulder, elbow, wrist, and other joints), enabling motions including a motion of swinging the arm back and forth relative to the body 24. The arms and the head, however, may be omitted.

A control unit 26 is housed inside the body 24, which controls operations of the robot 1. In FIG. 1, for convenience of illustration, the control unit 26 is shown outside the body 24.

In each leg 2, a six-axis force sensor 36 is provided between the ankle joint 18R (L), 20R (L) and the foot 22R (L). The six-axis force sensor 36 detects translational force components in three axis directions of a floor reaction force and the moment components about the three axes, transmitted from the floor to each leg 2 via the foot 22R (L), and outputs the detection signals to the control unit 26.

The body 24 is mounted with an inclination sensor 40, which measures inclination angles (in the roll and pitch directions) of the body 24 relative to the vertical direction (the gravitational direction) and changing velocities (angular velocities) thereof. More specifically, the inclination sensor 40 is composed of an acceleration sensor and a rate sensor (angular velocity sensor) such as a gyro sensor, and outputs the detection signals of these sensors to the control unit 26. Then, in the control unit 26, on the basis of the outputs from the inclination sensor 40, the inclination angle and the angular velocity of the body 24 relative to the vertical direction are measured by a technique well known in the art.

Further, the electric motor 42 (see FIG. 2) for rotating each joint is provided with an encoder (rotary encoder) 44 (see FIG. 2) for detecting a rotational angle of each joint, and the detection signal of the encoder 44 is output to the control unit 26.

Figure 2:
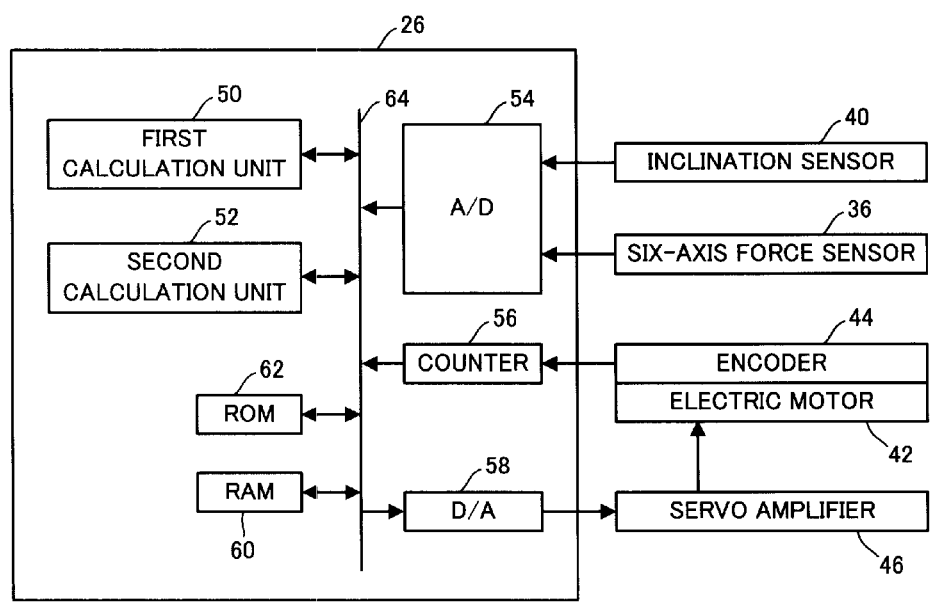
FIG. 2 is a block diagram showing a hardware configuration of a control unit provided in the robot shown in FIG. 1.

Referring to FIG. 2, the control unit 26 is made up of an electronic circuit unit which has a microcomputer. The control unit 26 includes a first calculation unit 50 and a second calculation unit 52 composed of CPUs, an A/D converter 54, a counter 56, a D/A converter 58, a RAM 60, a ROM 62, and a bus line 64 for transferring data among them.

In the control unit 26, outputs of the six-axis force sensor 36 and the inclination sensor 40 are converted into digital values by the A/D converter 54, and input to the RAM 60 via the bus line 64. Outputs of the encoder (rotary encoder) 44 of each joint of the robot 1 are input to the RAM 60 via the counter 56.

The first calculation unit 50 generates a desired gait, which will be described later, and also calculates and transmits a joint displacement command (a desired value of the rotational angle of each joint) to the RAM 60. The second calculation unit 52 reads a joint displacement command from the RAM 60 and a measured, actual joint displacement (an actual measurement value of the rotational angle of each joint) via the counter 56 from an output of the encoder 44, to calculate a drive command for driving the electronic motor 42 of each joint (a command value for defining the output torque of the electronic motor 42) necessary for causing the actual joint displacement to follow the joint displacement command.

The second calculation unit 52 then outputs the calculated drive command, via the D/A converter 58, to a servo amplifier 46 for driving the electronic motor 42. The servo amplifier 46 drives the electronic motor 42 (energizes the electronic motor 42) in accordance with the input drive command, so that the actual joint displacement of each joint is controlled to follow the joint displacement command.

Figure 3:
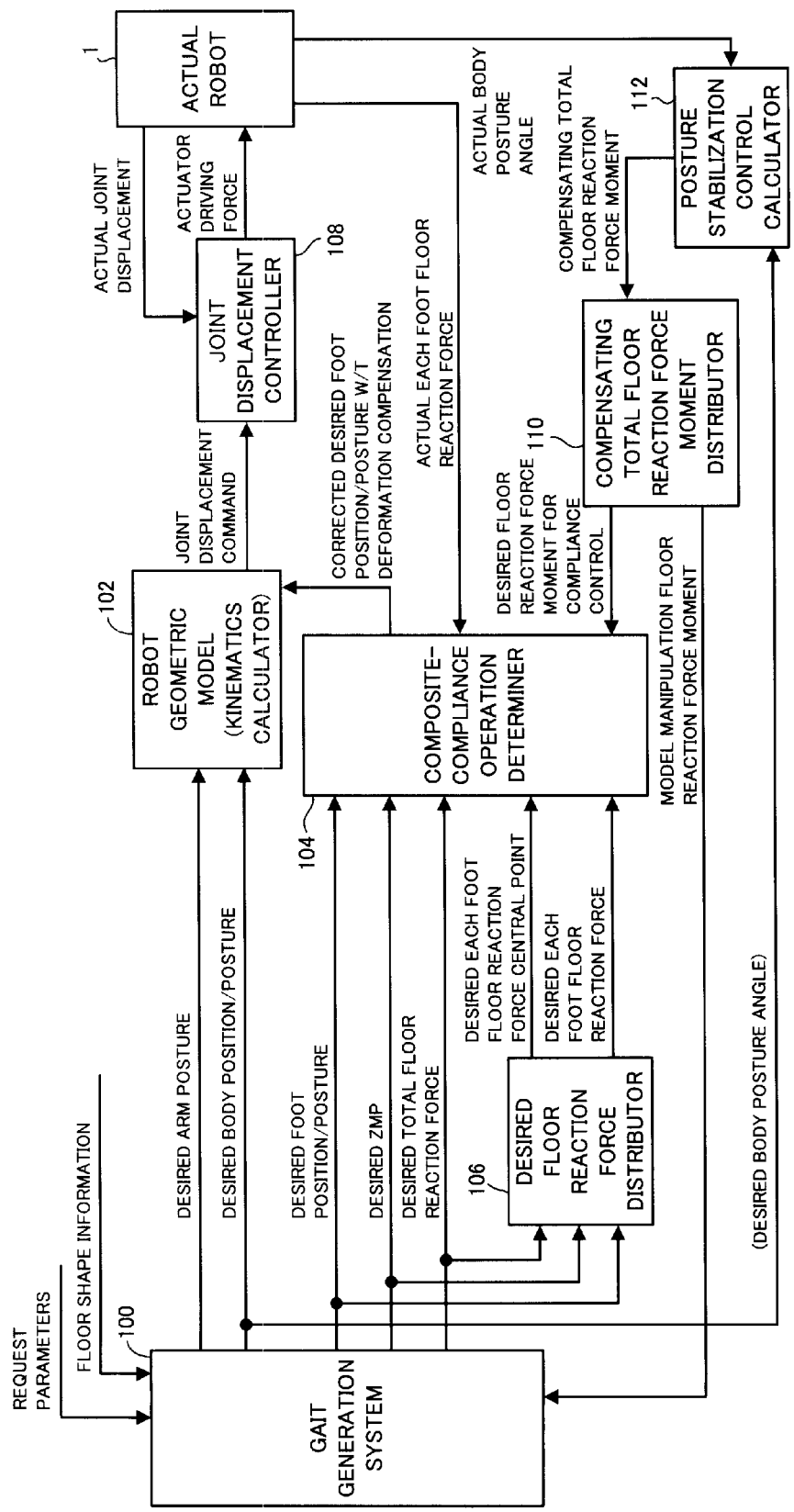
FIG. 3 is a block diagram showing a functional configuration of the control unit.

Now, the operation of the control device of the robot 1 according to the present embodiment will be schematically described with reference to FIG. 3. In FIG. 3, portions other than the "actual robot" correspond to functions implemented by the processing carried out by the control unit 26 (the processing of primarily the first calculation unit 50 and the second calculation unit 52).

For convenience of illustration, it is shown in FIG. 3 that the actual measurement values (such as the actual joint displacement) that the control unit 26 recognizes from outputs from the above-described sensors mounted on the robot 1 are output from the actual robot 1. In the following description, the symbols R and L will be omitted as long as it is not particularly necessary to distinguish between the right and left legs 2.

The control unit 26 includes a gait generation system 100, which generates and outputs a desired gait, i.e. a target of the operation (gait), of the robot 1 by using a dynamic model that expresses the dynamics of the robot 1 (relationship between the motion of the robot 1 and the external force acting on the robot 1). In the present embodiment, the desired gait generated by and output from the gait generation system 100 is made up of a desired motion for defining a trajectory of the amount of displacement (rotational angle) of each joint of the robot 1 and a target related to the external force acting on the robot 1.

More specifically, in the present embodiment, the desired gait is composed of: a desired body position/posture trajectory, which is the trajectory of a desired position and a desired posture of the body 24, a desired foot position/posture trajectory, which is the trajectory of a desired position and a desired posture of each foot 22, a desired arm posture trajectory, which is the trajectory of a desired posture of each arm, a desired ZMP trajectory, which is the trajectory of a desired position of a zero moment point (ZMP) of the robot 1, and a desired total floor reaction force trajectory, which is a desired trajectory of the total floor reaction force as the external force acting on the robot 1.

Among these constituent elements, the desired body position/posture trajectory, the desired foot position/posture trajectory, and the desired arm posture trajectory correspond to the desired motion, and the desired ZMP trajectory and the desired total floor reaction force trajectory correspond to the target related to the external force. In the case where any other part that can be moved with respect to the body 24 is provided in addition to the legs 2 and the arms, a desired position/posture trajectory of that movable part is added to the desired motion of the robot 1.

Here, the "trajectory" in the desired gait means a temporal change pattern (time series pattern), which is formed of the time series of instantaneous values calculated for each control cycle (calculation cycle) of the gait generation system 100. In the following description, it may be referred to as "pattern" in place of "trajectory". Further, in the following description, the term "desired" will be frequently omitted unless there is a possibility of misunderstanding.

The position and the velocity of the body 24 mean the position of a predetermined representative point of the body 24 (for example, the central point between the right and left hip joints) and the moving velocity thereof. Similarly, the position and the velocity of each foot 22 mean the position of a predetermined representative point of each foot 22 and the moving velocity thereof. In the present embodiment, the representative point of each foot 22 is set at a point on the bottom surface (sole) of each foot 22, for example at a point where a perpendicular line extended from the center of the ankle joint of a leg 2 toward the bottom surface of the foot 22 intersects with the bottom surface.

Further, the "posture" means a spatial orientation. For example, the body posture is represented by an inclination angle (posture angle) of the body 24 in the roll direction (about the X axis) and an inclination angle (posture angle) of the body 24 in the pitch direction (about the Y axis) relative to the vertical direction. The foot posture is expressed by spatial azimuths of two axes fixedly set on each foot 22. In the present description, a body posture may be referred to as a body posture angle. The body posture may include the rotational angle of the body 24 in the yaw direction (about the Z axis).

Furthermore, among the constituent elements of a gait, the elements other than those related to the external force acting on the robot 1 (the desired ZMP and the desired total floor reaction force), that is, the gait related to the motions of the portions of the robot 1, including the foot position/posture and the body position/posture, will be collectively referred to as the "motion".

Still further, the floor reaction force acting on each foot 22 (floor reaction force made up of translational force and moment) is referred to as "each-foot floor reaction force", and the resultant force of the "each-foot floor reaction force" of all (two) feet 22R and 22L of the robot 1 will be referred to as "total floor reaction force". In the following description, however, each-foot floor reaction force will hardly be mentioned, and therefore, the term "floor reaction force" will be regarded to have substantially the same meaning as the term "total floor reaction force", unless otherwise specified.

The ZMP means a point on the floor surface at which a horizontal component (moment component about the horizontal axis) of the moment that acts about the point due to the resultant force of the inertial force caused by the motion of the robot 1 and the gravitational force acting on the robot 1 becomes "0". In the case of a gait that satisfies a dynamic balance condition, the ZMP agrees with a floor reaction force central point. In this case, providing a desired ZMP may be regarded as equivalent to providing a desired floor reaction force central point.

A desired floor reaction force is generally expressed by a point of application and a translational force and moment applied to the point. While the point of application may be set at any location, in the present embodiment, a desired ZMP is set as the point of application of a desired floor reaction force. In a gait that satisfies the dynamic balance condition, the ZMP agrees with the floor reaction force central point, as described above. Therefore, the moment component of the desired floor reaction force having the desired ZMP as the point of application will be zero except for the vertical component (moment component about the Z axis).

Of a desired gait generated by the gait generation system 100, a desired body position/posture trajectory and a desired arm posture trajectory are input to a robot geometric model (kinematics calculator) 102.

Further, a desired foot position/posture trajectory, a desired ZMP trajectory (desired floor reaction force central point trajectory), and a desired total floor reaction force trajectory (in more detail, a desired translational floor reaction force vertical component trajectory, a desired translational floor reaction force horizontal component trajectory, and a desired floor reaction force moment trajectory about a desired ZMP) are input to a composite-compliance operation determiner 104 and also to a desired floor reaction force distributor 106.

In the desired floor reaction force distributor 106, the desired floor reaction force is distributed to the respective feet 22R and 22L, and a desired each foot floor reaction force central point (desired position of the floor reaction force central point of each foot 22R, 22L) and a desired each foot floor reaction force (desired floor reaction force to be applied to the floor reaction force central point of each foot 22R, 22L) are determined. The trajectories of the desired each foot floor reaction force central point and the desired each foot floor reaction force thus determined are input to the composite-compliance operation determiner 104. It is noted that the desired floor reaction force being output from the gait generation system 100 may be limited to only a component necessary for the compliance control by the composite-compliance operation determiner 104. For example, a desired translational floor reaction force horizontal component does not necessarily have to be output from the gait generation system 100.

In the composite-compliance operation determiner 104, a desired foot position/posture is corrected to obtain a corrected desired foot position/posture w/t deformation compensation, and the trajectory of this corrected desired foot position/posture is input to the robot geometric model 102.

The robot geometric model 102 calculates joint displacement commands of the joints of the legs 2, 2 that satisfy the desired body position/posture and the corrected desired foot position/posture w/t deformation compensation, which have been received, by inverse kinematics calculation based on a kinematics model (rigid-body link model) of the robot 1. The robot geometric model 102 then outputs the calculated joint displacement commands to a displacement controller 108. Further, the robot geometric model 102 calculates joint displacement commands of the joints of the arms that satisfy the desired arm posture, and outputs the calculated joint displacement commands to the displacement controller 108.

The displacement controller 108 uses the joint displacement commands calculated by the robot geometric model 102 as desired values to perform follow-up control on the rotational angles of the joints (actual joint displacements) of the legs 2, 2 and the arms of the robot 1 via the servo amplifier 46. More specifically, the displacement controller 108 adjusts the output torque of the electric motor 42, as the actuator driving force, so as to make the actual joint displacements (actual measurement values) measured on the basis of the outputs of the encoder 44 agree with the joint displacement commands.

An actual each foot floor reaction force, i.e. a floor reaction force that actually acts on each foot 22 of the robot 1 by an actual motion of the robot 1 as a result of the above-described follow-up control, is measured from an output of the six-axis force sensor 36, and the actual measurement value of the actual each foot floor reaction force is input to the composite-compliance operation determiner 104.

Further, an actual body posture angle, i.e. an actual posture angle (inclination angle relative to the vertical direction) of the body 24 of the robot 1, is measured from an output of the inclination sensor 40, and the actual measurement value of the actual body posture angle is input to a posture stabilization control calculator 112. Furthermore, of the desired body position/posture generated by the gait generation system 100, a desired body posture angle (desired value of the posture angle of the body 24 relative to the vertical direction) and others are also input to the posture stabilization control calculator 112. In the present embodiment, the desired body posture angle takes a constant value (fixed value), which is for example the posture angle (=0) of the body 24 in the state where the trunk axis of the body 24 of the robot 1 is set in the vertical direction. When the desired body posture angle takes a constant value (fixed value) as described above, the desired body posture angle does not necessarily have to be input to the posture stabilization control calculator 112.

The posture stabilization control calculator 112 calculates a body posture angle error $\Delta\theta$, which is a deviation of an input actual body posture angle (actual measurement value) from a desired body posture angle. Further, the posture stabilization control calculator 112 calculates, as a manipulated variable (feedback manipulated variable) required to cause the body posture angle error $\Delta\theta$ to converge to "0", a compensating total floor reaction force moment Mdmd which is a required value of the floor reaction force moment to be additionally applied to the robot 1 about the desired ZMP. The calculator 112 calculates the compensating total floor reaction force moment Mdmd by a feedback control law in accordance with the calculated body posture angle error $\Delta\theta$.

In this case, for example the PD law is used as the feedback control law. Specifically, from the body posture angle error $\Delta\theta$ and its temporal change rate (differential value) $\Delta\omega$, the compensating total floor reaction force moment Mdmd is calculated by the following expression 50:

$$Mdmd = K1*\Delta\theta + K2*\Delta\omega Vx \qquad \text{Expression 50}$$

In the expression 50, K1 and K2 are a proportional gain and a derivative gain, respectively. The values of K1 and K2 are predetermined values in the present embodiment.

In more detail, the compensating total floor reaction force moment Mdmd in this case is composed of a component Mdmdx in the roll direction (about the X axis) and a component Mdmdy in the pitch direction (about the Y axis). Here, Mdmdx and Mdmdy mean required moments about a desired ZMP (more specifically, required values for perturbation of the floor reaction force moment about the desired ZMP) necessary for causing the component in the roll direction (about the X axis) and the component in the pitch direction (about the Y axis), respectively, of the body posture angle error $\Delta\theta$ to "0".

The component Mdmdx about the X axis is calculated by the expression 50 in accordance with the components of $\Delta\theta$ and $\Delta\omega$ about the X axis. Further, the component Mdmdy about the Y axis is calculated by the expression 50 in accordance with the components of $\Delta\theta$ and $\Delta\omega$ about the Y axis.

It is noted that the values of the gains K1 and K2 in the expression 50 may be set in a variable manner as appropriate in accordance with the motional state of the robot 1. For example, one or both of the K1 and K2 values may be determined variably in accordance with the overall center of gravity of the robot 1 or the inertial force in the vertical direction of the body 24. This enables calculation of the value of Mdmd that can make the body posture angle error $\Delta\theta$ smoothly converge to "0", by compensating the influence of the inertial force in the vertical direction accompanying the motion of the robot 1.

Furthermore, $\Delta\theta$ may be converted into a positional error of a mass point of an inverted pendulum model, which will be described later (more specifically, $\Delta\theta$ may be multiplied by a height h of a body mass point 24b, which will be described later), and Mdmd may be calculated from this positional error and its temporal change rate by the PD law.

The compensating total floor reaction force moment Mdmd determined by the posture stabilization control calculator 112 is distributed through a compensating total floor reaction force moment distributor 110 into a desired floor reaction force moment for compliance control and a model manipulation floor reaction force moment.

The desired floor reaction force moment for compliance control is a perturbation floor reaction force moment about a desired ZMP that is to be additionally applied to the actual robot 1 in order to make the body posture angle error $\Delta\theta$ approach "0". The model manipulation floor reaction force moment is a perturbation floor reaction force moment about the desired ZMP that is to be additionally generated in a dynamic model for gait generation, which will be described later, for the same purpose as that of the desired floor reaction force moment for compliance control. In other words, the model manipulation floor reaction force moment is a perturbation floor reaction force moment that is generated about the desired ZMP by the motion of a desired gait ultimately determined by the gait generation system 100 (desired gait output from the gait generation system 100).

These floor reaction force moments are determined, for the respective components in the roll direction (about the X axis) and in the pitch direction (about the Y axis), in the following manner. Firstly, the model manipulation floor reaction force moment is determined in accordance with the following expression 52. In the expression 52, Mdmd represents each component (Mdmdx or Mdmdy) in the roll direction (about the X axis) or in the pitch direction (about the Y axis).

Similarly, a floor reaction force moment permissible range means a permissible range of the floor reaction force moment of each component in the roll direction (about the X axis) or in the pitch direction (about the Y axis). The floor reaction force moment permissible range is determined in the gait generation system 100 (in S1008 in FIG. 24), as will be described later.

If Mdmd>Upper limit of the floor reaction force moment permissible range:

Model manipulation floor reaction force moment=−(Mdmd−Upper limit of the floor reaction force moment permissible range)

If Mdmd<Lower limit of the floor reaction force moment permissible range:

Model manipulation floor reaction force moment=−(Mdmd−Lower limit of the floor reaction force moment permissible range)

If Lower limit of the floor reaction force moment permissible range≤Mdmd≤Upper limit of the floor reaction force moment permissible range:

Model manipulation floor reaction force moment=0   Expression 52

In the above expression 52, the compensating total floor reaction force moment Mdmd (specifically, Mdmdx or Mdmdy) by itself is compared with the floor reaction force moment permissible range. More generally, the object to be compared with the floor reaction force moment permissible range in the above expression 52 is a moment that is obtained by adding Mdmd to a reference instantaneous value of the floor reaction force moment about the desired ZMP. The reference instantaneous value is the moment about the desired ZMP in the desired total floor reaction force generated by the gait generation system 100 on the assumption that the body posture angle error $\Delta\theta$ is constantly maintained at "0".

In this case, in the present embodiment, the reference instantaneous value of the moment about the desired ZMP is constantly "0" for both components in the roll direction (about the X axis) and in the pitch direction (about the Y axis). Accordingly, the value obtained by adding Mdmd to the reference instantaneous value equals to Mdmd. For this reason, in the above expression 52, Mdmd (specifically, Mdmdx or Mdmdy) is directly compared with the floor reaction force moment permissible range.

Subsequently, the desired floor reaction force moment for compliance control is determined, for each of the components in the roll direction (about the X axis) and in the pitch direction (about the Y axis), by the following expression 54. Similarly as in the expression 50, Mdmd in the expression 54 means each component (Mdmdx or Mdmdy) in the roll direction (about the X axis) or in the pitch direction (about the Y axis).

Desired floor reaction force moment for compliance control=*Mdmd*+Model manipulation floor reaction force moment   Expression 54

Therefore, the desired floor reaction force moment for compliance control and the model manipulation floor reaction force moment are determined such that their difference is equal to Mdmd.

Figure 4:
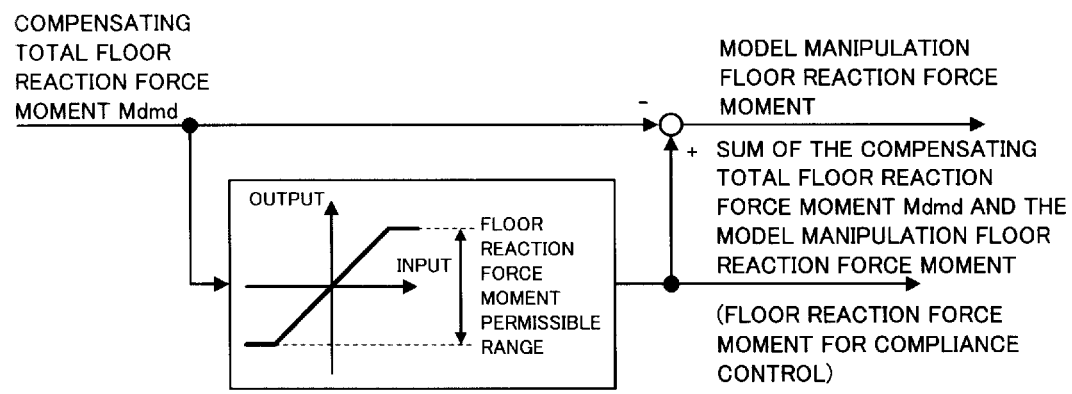
FIG. 4 is a block diagram showing the processing of a compensating total floor reaction force moment distributor shown in FIG. 3.

The compensating total floor reaction force moment distributor 110 that performs the above-described calculations can be expressed in a block diagram as shown in FIG. 4. According to the calculations, for each component in the roll direction (about the X axis) or in the pitch direction (about the Y axis), in the case where the compensating total floor reaction force moment Mdmd (Mdmdx or Mdmdy) is within the floor reaction force moment permissible range, Mdmd by itself is determined to be the desired floor reaction force moment for compliance control, and the model manipulation floor reaction force moment is determined to be "0".

For each component in the roll direction (about the X axis) or in the pitch direction (about the Y axis), in the case where the compensating total floor reaction force moment Mdmd (Mdmdx or Mdmdy) is out of the floor reaction force moment permissible range, one of the upper limit and the lower limit of the floor reaction force moment permissible range, whichever is closer to Mdmd, is determined to be the desired floor reaction force moment for compliance control, and the moment obtained by reversing the sign of the deviation of Mdmd from the floor reaction force moment permissible range (=Mdmd−Boundary value of the floor reaction force moment permissible range) is determined to be the model manipulation floor reaction force moment.

Returning to FIG. 3, the model manipulation floor reaction force moment determined as described above is input to the gait generation system 100. Furthermore, floor shape information around the robot 1 (more generally, information on the environment surrounding the robot 1) as well as request parameters, which will be described later, are input to the gait generation system 100.

On receipt of the model manipulation floor reaction force moment, the floor shape information, and the request parameters, the gait generation system 100 determines a desired ZMP trajectory, and generates a motion of a desired gait (desired motion), using a dynamic model, such that a horizontal component of the floor reaction force moment about the desired ZMP thus determined becomes the model manipulation floor reaction force moment, as will be described later in detail. In this case, the foot position/posture trajectory is determined to reflect the above-described floor shape information and the request parameters.

It is noted that the desired total floor reaction force which is output from the gait generation system 100 to the composite-compliance operation determiner 104 is aimed at causing the horizontal component of the floor reaction force moment about the desired ZMP to be "0".

Further, the desired floor reaction force moment for compliance control determined in the compensating total floor reaction force moment distributor 110 as described above is input to the composite-compliance operation determiner 104. The composite-compliance operation determiner 104 in turn determines a corrected desired foot position/posture (trajectory) w/t deformation compensation by causing the motion of the robot 1 to follow the motion of the desired gait generated by the gait generation system 100 and by correcting the desired foot position/posture such that the actual floor reaction force moment about the desired ZMP approximates to the desired floor reaction force moment for compliance control.

In this case, it is virtually impossible to cause every state of the foot position/posture of the robot 1 as well as the floor reaction force to agree with a desired state thereof, so that a trade-off relationship is established therebetween to make them compromisingly agree with the desired states as much as possible. Namely, the composite-compliance operation determiner 104 places a weight on the control error with respect to each desired value, and determines the corrected desired foot position/posture (trajectory) w/t deformation compensation so as to minimize the weighted mean of the control errors (or the squares of the control errors).

In other words, the corrected desired foot position/posture (trajectory) w/t deformation compensation is determined such that the actual floor reaction force moment about the desired ZMP and the actual foot position/posture of the robot 1 approximate to the desired floor reaction force moment for compliance control and the desired foot position/posture, respectively, as much as possible. Then, the composite-compliance operation determiner 104 outputs to the robot geometric model 102 the corrected desired foot position/posture as an ultimate desired value of the foot position/posture, to thereby control the operation of the robot 1.

That is, the composite-compliance operation determiner 104 controls the actual operation of the robot 1 by causing the desired floor reaction force moment for compliance control to be additionally applied to the robot 1 as an additional external force, while causing the actual motion of the robot 1 to follow the motion of the desired gait.

The construction and operation of the composite-compliance operation determiner 104 are described in detail for example in Japanese Patent Application Laid-Open No. 10-277969 previously filed by the present applicant. Therefore, no more description will be provided for the composite-compliance operation determiner 104 in the present description.

With the operation control of the robot 1 as described above, a motion of a desired gait is generated such that a model manipulation floor reaction force moment as a model manipulation external force is produced additionally about a desired ZMP on the dynamic model of the robot 1, while it is controlled such that the model manipulation floor reaction force moment is not added to the floor reaction force of the actual robot 1.

As a result, there is an imbalance (unbalance) between the motion of the desired gait and the floor reaction force by the differential portion of the model manipulation floor reaction force moment. This is equivalent to applying a floor reaction force moment that is the model manipulation floor reaction force moment with a reversed sign to the actual robot 1 in terms of the effect of causing the above-described body posture angle error $\Delta\theta$ to converge to "0".

That is, by determining a model manipulation floor reaction force moment as appropriate, the actual posture of the body 24 of the actual robot 1 can be converged to a desired posture, and accordingly, the entire posture of the actual robot 1 can be stabilized.

In this case, the sum of the model manipulation floor reaction force moment with its sign reversed and the desired floor reaction force moment for compliance control provides a total restoring force (floor reaction force moment) that makes the body posture angle error $\Delta\theta$ converge to "0". That is, the difference between the desired floor reaction force moment for compliance control and the model manipulation floor reaction force moment provides the total restoring force.

It is noted that a model manipulation floor reaction force moment can take any value, irrespective of the range in which a ZMP can exist, making it possible to generate an extremely high posture restoring force.

Hereinafter, the processing carried out by the gait generation system 100 will be described in more detail, by taking a walking operation of the robot 1 as an example.

In the following description, the terms "floor reaction force vertical component" and "floor reaction force horizontal component" will mean "translational floor reaction force vertical component" and "translational floor reaction force horizontal component", respectively, unless otherwise specified.

Further, a "two-leg supporting period" in a gait will refer to a period during which the robot 1 supports its own weight by two legs 2, 2. A "one-leg supporting period" will refer to a period during which the robot 1 supports its own weight by only one leg 2. In the walking operation of the robot 1 primarily explained in the present embodiment, the two-leg supporting period and the one-leg supporting period are alternately repeated.

Furthermore, the leg 2 supporting the self-weight of the robot 1 during the one-leg supporting period will be referred to as a "supporting leg", while the leg 2 not supporting the self-weight will be referred to as a "free leg". Still further, the foot 22 of the supporting leg 2 will be referred to as a supporting leg foot 22, while the foot 22 of the free leg 2 will be referred to as a free leg foot 22. In the description of the present embodiment, for convenience of explanation, the leg 2 that becomes a "supporting leg" and the leg 2 that becomes a "free leg" during a one-leg supporting period will be referred to as the supporting leg and the free leg, respectively, even during the two-leg supporting period immediately preceding that one-leg supporting period.

In the case where the gait generation system 100 is about to generate a desired gait, request parameters representing basic requests regarding a motion mode of the robot 1 are input to the gait generation system 100 by radio communication or the like from a controlling device, a server or the like (not shown) outside of the robot 1.

The request parameters include parameters (for example, average moving speed, moving direction, or moving route of the robot 1) as basic guidelines for determining the type of motion (walking, running, or the like) of the robot 1, a desired landing position/posture of the free leg foot 22 (desired position/posture upon landing of the free leg foot 22), and a desired landing time thereof. The request parameters may be stored in advance in a storage device (not shown) in the robot 1, and the gait generation system 100 may read them in accordance with a prescribed schedule.

Further, the floor shape information described above is also input to the gait generation system 100. The floor shape information is generated by the control unit 26 for example on the basis of images picked up by an image pickup camera (not shown) installed in the head or the like of the robot 1. It may be configured such that the floor shape information is input to the control unit 26 at any time from a server or the like external to the robot 1, through radio communication with the robot 1, for example.

Alternatively, the robot 1 may be equipped with a self-position recognizing function (the function of recognizing the self-position and orientation of the robot 1 in the global coordinate system), and map information including the floor shape information in the environment where the robot 1 moves may be stored in advance in the storage device of the robot 1. In this case, the floor shape information around the robot 1, recognized from the self-position and orientation of the robot 1, may be obtained from the map information so as to be input to the gait generation system 100. The floor shape information may also include property information of the floor, such as a friction coefficient and hardness thereof.

The gait generation system 100 uses the input request parameters and floor shape information to generate a desired gait in accordance with a prescribed algorithm. More specifically, in the present embodiment, the gait generation system 100 firstly determines, on the basis of the request parameters and the floor shape information, gait parameters as parameters for defining some of the constituent elements of a desired gait, such as a desired foot position/posture trajectory, a desired floor reaction force vertical component trajectory, and a desired ZMP trajectory, and then uses the gait parameters and the dynamic model of the robot 1 to sequentially determine instantaneous values of the desired gait. In this manner, the gait generation system 100 generates the time series pattern (trajectory) of the desired gait.

In this case, the desired foot position/posture trajectory is generated, for each foot 22, by using a finite-duration setting filter proposed in Japanese Patent No. 3233450 by the present applicant, for example. This finite-duration setting filter is composed of a plurality of stages (three stages or more in the present embodiment) of first-order lag filters of variable time constants, that is, filters whose transfer functions are expressed in the form of $1/(1+\tau s)$ (where $\tau$ is a variable time constant; this filter will be hereinafter referred to as a unit filter), the plurality of stages of the filters being connected in series. This arrangement makes it possible to generate and output a trajectory that reaches a specified value at a specified time as desired.

In this case, the time constant $\tau$ of the unit filter of each stage is variably set in sequence in accordance with the remaining time until the above-described specified time after starting the generation/output by the finite-duration setting filter. More specifically, the setting is made such that the value of $\tau$ is decreased from a prescribed initial value ($>0$) as the remaining time reduces, and finally reaches "0" at the specified time when the remaining time reaches "0". A step input having a height based on the above-described specified value (more specifically, a change amount from the initial value to the specified value of the output of the finite-duration setting filter) is supplied to the finite-duration setting filter.

This finite-duration setting filter is capable of not only generating an output that reaches a specified value at a specified time, but also setting a changing velocity of the output of the finite-duration setting filter at the specified time to "0" or substantially "0". Particularly, in the case where three stages or more (three stages will do) of the unit filters are connected, the changing acceleration (a differential value of the changing velocity) of the output of the finite-duration setting filter can be set to "0" or substantially "0" as well.

Using such a finite-duration setting filter, a foot position/posture trajectory (a position/posture trajectory from when a foot 22 lands to when it lands again) is generated for example in a manner as described below. Specifically, a desired foot position trajectory in the X-axis direction (longitudinal direction) is generated for example in the following manner.

The height of the step input to the finite-duration setting filter is determined in accordance with the position in the X-axis direction of a next desired landing position of each foot 22 (more specifically, a change amount (amount of movement) in the X-axis direction of the next desired landing position relative to the preceding landing position; this corresponds to the specified value described above), and at the same time, the time constant $\tau$ is initialized to a prescribed initial value. Then, the determined step input is supplied to the finite-duration setting filter, and the generation of the trajectory of the position of the foot 22 in the X-axis direction is started. During this trajectory generating processing, the time constant $\tau$ is variably set in sequence such that it decreases from the initial value to "0" by a desired landing time (which corresponds to the specified time described above) of the foot 22. In this manner, the trajectory of the position of the foot 22 in the X-axis direction is generated which allows a desired landing position to be reached at a desired landing time.

Further, a desired foot position trajectory in the Z-axis direction (vertical direction) is generated for example in the following manner. Firstly, in accordance with a next desired landing position and desired landing time of the foot 22 as well as the floor shape information (specifically, the floor shape information on the longitudinal plane passing the present landing position and the next desired landing position of the foot 22), the position of the foot 22 in the Z-axis direction at which the height (vertical position) of the foot 22 becomes maximum (hereinafter, referred to as the "highest-point position") and the arrival time at the highest-point position are determined.

Then, the height of the step input to the finite-duration setting filter is determined in accordance with the highest-point position (which corresponds to the specified value described above), and at the same time, the time constant $\tau$ is initialized. Thereafter, the determined step input is supplied to the finite-duration setting filter, whereby the foot position trajectory in the Z-axis direction up to the highest-point position is generated sequentially. At this time, the time constant $\tau$ is variably set in sequence such that it decreases from the initial value to "0" by the highest-point position arrival time (which corresponds to the specified time described above).

Once the generation of the trajectory of the position in the Z-axis direction up to the highest-point position is finished, the time constant $\tau$ is initialized, and a step input having a polarity opposite from that of the previous step input (more specifically, a step input with an opposite polarity and having a height according to the change amount in the Z-axis direction from the highest-point position to a next expected landing position (which corresponds to the specified value described above)) is input to the finite-duration setting filter, and a trajectory of the foot position in the Z-axis direction from the highest-point position to the desired landing position is generated sequentially. At this time, the time constant $\tau$ is variably set in sequence such that it decreases from the initial value to "0" by the desired landing time of the foot 22.

In generation of the foot position trajectory in the Z-axis direction, the time constant τ may be variably set such that it continuously decreases from the initial value to "0" from the trajectory generation starting time to the desired landing time of the foot 22, and further, the polarity of the step input may be reversed to the opposite polarity at or around the arrival time at the highest-point position, to thereby generate the foot position trajectory in the Z-axis direction. This arrangement enables the foot 22 to reach a desired landing position at a desired landing time with no problem, although it may not be able to cause the foot 22 to reach a highest-point position as desired with precision.

A foot posture trajectory may be generated using the finite-duration setting filter similarly as in the case of generating the foot position trajectory described above. In this case, among the spatial components of a foot posture, for a component whose posture angle monotonously changes (monotonously increases or monotonously decreases), the foot posture trajectory may be generated similarly as in the case of generating the foot position trajectory in the X-axis direction described above. For a component whose posture angle change has a maximum value or a minimum value, the foot posture trajectory may be generated similarly as in the case of generating the foot position trajectory in the Z-axis direction described above.

It is noted that the desired foot position/posture trajectory generated by the finite-duration setting filter as described above is the desired position/posture trajectory of each foot 22 on a supporting leg coordinate system, which will be described later.

The desired foot position/posture trajectory generated in the above-described manner is generated such that the position of each foot 22 starts to move, while gradually accelerating, from its initial ground-contact state (the state at the initial time of a desired gait) toward a desired landing position. Further, the desired foot position/posture trajectory is generated such that the changing velocity of the position is gradually decreased to "0" or substantially "0" by an expected landing time so that the expected landing position is reached at the expected landing time, when the motion is stopped. Accordingly, the ground speed (the changing velocity of the position of each foot 22 on the supporting leg coordinate system that is fixed to a floor) at the instant a foot 22 lands becomes "0" or substantially "0".

Further, in the present embodiment, the finite-duration setting filter is composed of three stages or more (for example, three stages) of the unit filters connected in series, so that the velocity of each foot 22 (the changing velocity of the foot position) reaches "0" or substantially "0" by a desired landing time, and the acceleration of each foot 22 also reaches "0" or substantially "0" at the desired landing time, when the movement stops. This means that the ground acceleration also becomes "0" or substantially "0" at the landing instant, resulting in further reduction of the landing impact. In particular, even if the actual landing time of the robot 1 deviates from the desired landing time, the impact will not increase much. Supplementally, the number of stages of the unit filters of the finite-duration setting filter may be two for causing the ground speed of each foot 22 to reach "0" or substantially "0" at a desired landing time.

Regarding the foot posture, after each foot 22 lands at its heel at a desired landing time, the foot 22 continues to move until substantially the entire surface of the bottom surface (sole) of the foot 22 comes in contact with the floor. For this reason, the time at which substantially the entire surface of the sole of the foot 22 comes in contact with the floor is set to the above-described specified time, to generate the foot posture trajectory by the finite-duration setting filter.

Further, in the present embodiment, the foot position trajectory is generated using the finite-duration setting filter. Alternatively, a desired foot position trajectory may be generated using a function, such as a polynomial, that is set such that the changing velocity of the foot position at a desired landing time reaches "0" or substantially "0" (i.e., the time differential value of the foot position becomes "0"), and further that the changing acceleration (the time differential value of the changing velocity) of the foot position at the desired landing time reaches "0" or substantially "0".

This applies to the generation of a desired foot posture trajectory as well. Regarding the generation of the desired foot posture trajectory, however, a function, such as a polynomial, is set such that the changing velocity of the posture of each foot 22 and, further, the changing acceleration thereof reach "0" or substantially "0" at the time when substantially the entire surface of the sole of each foot 22 comes in contact with a floor, as described above.

Supplementally, in a desired foot position/posture trajectory generated in a walking gait (gait for a walking operation of the robot 1), which is the gait primarily described in the present embodiment, the foot 22 of the free leg lands at its heel on a floor surface upon transition from the one-leg supporting period to the two-leg supporting period. Then, the landed foot 22 is turned so that its tiptoe approaches the floor surface, until substantially the entire surface of the sole of the foot 22 comes in contact with the floor. Subsequently, the foot 22 is turned so that its heel comes off the floor while only the tiptoe remains in contact with the floor, and finally the foot leaves the floor.

Figure 5:
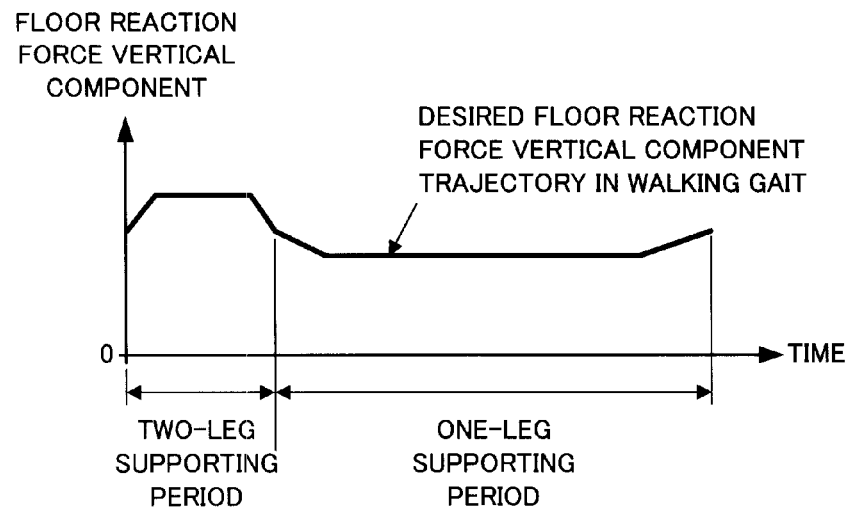
FIG. 5 is a graph showing an example of a desired floor reaction force vertical component trajectory generated by a gait generation system shown in FIG. 3.

The gait generation system 100 further sets a desired floor reaction force vertical component trajectory. The desired floor reaction force vertical component trajectory in a walking gait of the robot 1 is set for example as shown in FIG. 5. In this example, the desired floor reaction force vertical component trajectory is set to have a trapezoidal shape projecting (upward) to an increasing side of a floor reaction force vertical component during the two-leg supporting period, and to have a trapezoidal shape projecting (downward) to a decreasing side of the floor reaction force vertical component during the one-leg supporting period. Then, the values of the floor reaction force vertical component in the respective trapezoidal parts, the times of the bending points, and others are determined as gait parameters (floor reaction force vertical component trajectory parameters) that define the desired floor reaction force vertical component trajectory.

It is noted that the floor reaction force vertical component trajectory in the walking gait of the robot 1 may be a trajectory in which the value of the floor reaction force vertical component is maintained substantially constant.

A desired ZMP trajectory is determined such that a desired ZMP is located within a so-called supporting polygon (a smallest convex polygon including a ground contact surface of the robot 1 (the contact surface with the floor)) and such that it has a high stability allowance and does not develop an abrupt change. It is noted that the state where a desired ZMP exists near the center of the supporting polygon is regarded to have a high stability allowance (for more detail, see Japanese Patent Application Laid-Open No. 10-86081).

Figure 6:
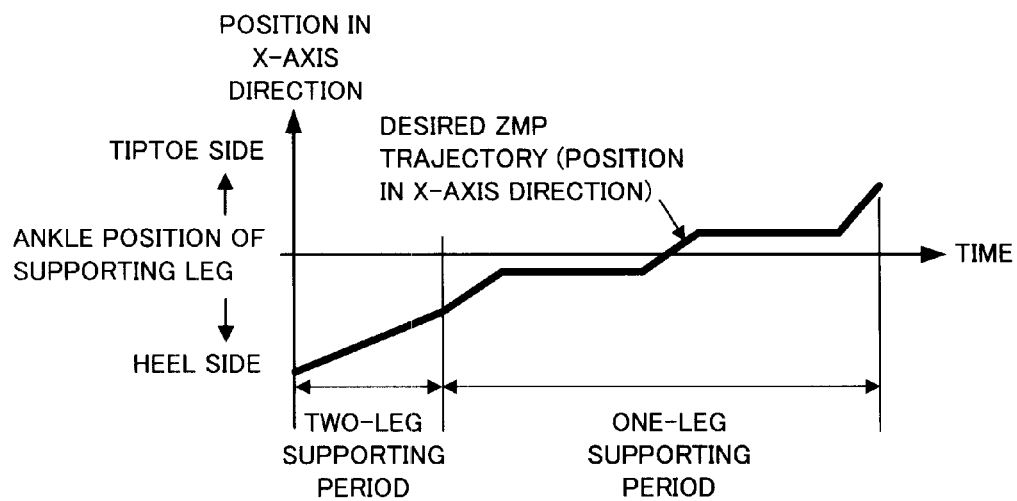
FIG. 6 is a graph showing an example of a desired ZMP trajectory (component in the X-axis direction) generated by the gait generation system shown in FIG. 3.

A desired ZMP trajectory in a walking gait is set for example as shown in a graph in FIG. 6. More specifically, the desired ZMP trajectory in FIG. 6 is an example of the desired ZMP trajectory in the X-axis direction (trajectory of the position in the X-axis direction of the desired ZMP).

In this example, the position in the X-axis direction of the desired ZMP during the two-leg supporting period is set such that it moves from the position closer to the tiptoe of the foot 22 of the leg 2 that was in contact with the ground in the immediately preceding one-leg supporting period, toward the position closer to the heel of the foot 22 of the leg 2 that was newly landed. Then, during the one-leg supporting period in which the newly landed leg 2 functions as the supporting leg, the position in the X-axis direction of the desired ZMP is set to move from the position closer to the heel of the foot 22 of the leg 2 to the position closer to the tiptoe thereof. In this case, in the illustrated example, the position in the X-axis direction of the desired ZMP during the one-leg supporting period is maintained constant during a period in which substantially the entire surface of the sole of the foot 22 of the leg 2 is in contact with the ground.

Although not shown in the figure, the position in the Y-axis direction of the desired ZMP in the walking gait is set as follows. During the one-leg supporting period, it is set to be kept at the same position as the position in the Y-axis direction of the ankle joint of the leg 2 which functions as a supporting leg, for example. Then, during the two-leg supporting period, the position in the Y-axis direction of the desired ZMP is set to move from the same position as the position in the Y-axis direction of the ankle joint of the leg 2 that was the supporting leg in the immediately preceding one-leg supporting period, to the same position as the position in the Y-axis direction of the ankle joint of the leg 2 that was newly landed.

In the present embodiment, the positions and times of the bending points in the desired ZMP trajectory set as shown in FIG. 6 are set as ZMP trajectory parameters (parameters that define the desired ZMP trajectory).

A desired arm posture is expressed in terms of a relative posture with respect to the body 24.

Furthermore, a desired gait is described in terms of a global coordinate system. The global coordinate system is a coordinate system that is fixed to a floor. More specifically, a supporting leg coordinate system is used, which will now be described. The supporting leg coordinate system is a coordinate system fixed to a floor, in which a point, at which a perpendicular line extended from the center of the ankle of a supporting leg 2 to a floor surface intersects with the floor surface in the state where the supporting leg foot 22 is turned after its landing, without slippage, and substantially the entire surface of the sole of the supporting leg foot 22 is in contact (in close contact) with the floor surface, is defined as an origin thereof (this point agrees with a representative point of the foot 22 in the state where substantially the entire surface of the sole of the supporting leg foot 22 is in contact with the floor surface in the present embodiment), and in which a horizontal plane passing the origin is defined as an XY plane. In this case, the X-axis direction and the Y-axis direction correspond to the longitudinal direction and the lateral direction, respectively, of the supporting leg foot 22. The Z-axis direction corresponds to the vertical direction.

It is noted that the origin of the supporting leg coordinate system does not necessarily have to agree with the representative point of the supporting leg foot 22 (a point representing the position of the foot 22) in the state where substantially the entire surface of the sole of the foot 22 is in contact with the floor surface. Alternatively, the origin may be set at a point on the floor surface that is different from the representative point.

Furthermore, in the present embodiment, in a two-leg supporting period and a one-leg supporting period immediately following the same in a walking gait, a coordinate system defined in accordance with the above-described relationship in correspondence with a supporting leg foot 22 during the one-leg supporting period immediately following the two-leg supporting period is used as the supporting leg coordinate system.

Hereinafter, a dynamic model of the robot 1 used for gait generation in the present embodiment will be described with reference to FIG. 7.

Figure 7:
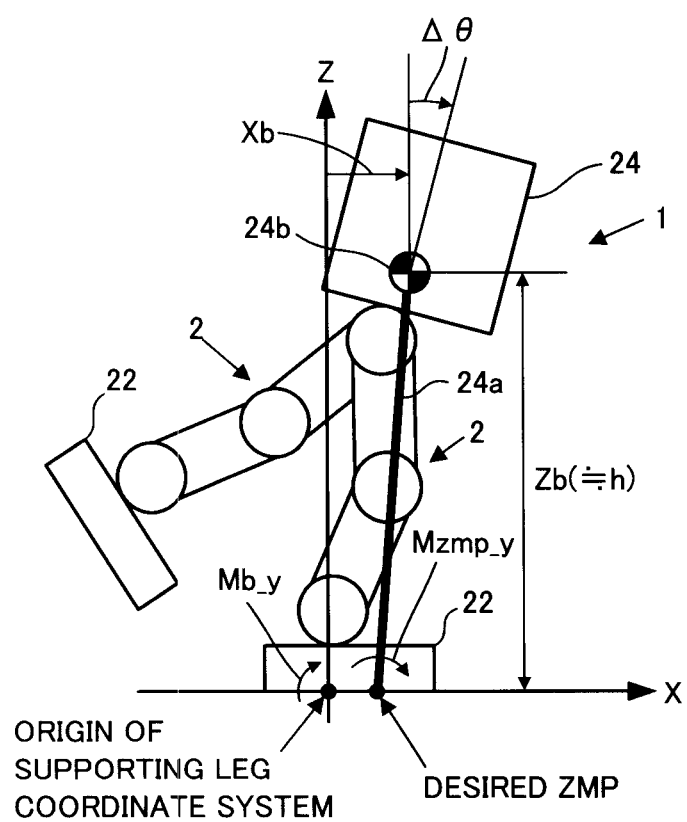
FIG. 7 is a diagram visually showing a dynamic model of the robot which is used in the processing by the gait generation system and a posture stabilization control calculator shown in FIG. 3.

The dynamic model of the robot 1 used in the present embodiment, as shown in FIG. 7, is a model formed of an inverted pendulum (hereinafter, this model may be referred to as the "inverted pendulum model") that is provided with an extensible rod 24a which can swing freely with a desired ZMP as a supporting point, and a mass point 24b which is supported at an upper end of the rod 24a. It is assumed that the rod 24a has no mass.

In this dynamic model, the motion of the mass point 24b of the inverted pendulum corresponds to the motion of the body 24 of the robot 1, and the relationship between the motion of the body 24 and the floor reaction force acting on the robot 1 is expressed as the relationship between the motion of the mass point 24b (hereinafter, referred to as the "body mass point 24b") and the floor reaction force acting on the inverted pendulum. Furthermore, in this dynamic model, it is assumed that the masses of the legs 2, 2 of the robot 1 are sufficiently smaller than that of the body 24 (or the mass of the combination of the body 24, the arms, and the head), and that the mass of the body mass point 24b agrees with the mass of the entire robot 1. The position of the body mass point 24b is set to a position which is uniquely determined from the body position/posture of the robot 1.

The behavior of this dynamic model (the dynamics of the robot on the dynamic model) is mathematized as shown below. It should be noted that, for simplification of the explanation, only the equations of motions on a sagittal plane (a plane that contains the X axis and the Z axis of the supporting leg coordinate system) will be described, while the equations of motions on a lateral plane (a plane that contains the Y axis and the Z axis of the supporting leg coordinate system) will not be described.

For convenience of explanation, variables and parameters related to the dynamic model are defined as follows:

Zb: Vertical position of the body mass point (position in the Z-axis direction)
Xb: Horizontal position of the body mass point (position in the X-axis direction)
mb: Mass of the body mass point
Xzmp: Horizontal position of the desired ZMP (position in the X-axis direction)
Zzmp: Vertical position of the desired ZMP (position in the Z-axis direction)
Fx: Horizontal component of the floor reaction force (specifically, component in the X-axis direction of the translational floor reaction force)
Fz: Vertical component of the floor reaction force (specifically, component in the Z-axis direction of the translational floor reaction force)
Mzmp_y: Floor reaction force moment about the desired ZMP (specifically, component about the Y axis of the floor reaction force moment)
Mb_y: Floor reaction force moment about the origin of the supporting leg coordinate system (specifically, component about the Y axis of the floor reaction force moment)

For an arbitrary variable A, dA/dt represents the first order differential value of A, and d2A/dt2 represents the second order differential value of A. Therefore, when the variable A represents a displacement (position), then dA/dt indicates the velocity and d2A/dt2 indicates the acceleration. g represents a gravitational acceleration constant. Here, g takes a positive value.

The equations of motions of the above dynamic model are expressed by the following expressions 01 to 04:

$$Fz = mb*(g+d2Zb/dt2) \quad \text{Expression 01}$$

$$Fx = mb*d2Xb/dt2 \quad \text{Expression 02}$$

$$Mb\_y = -mb*Xb*(g+d2Zb/dt2) + mb*Zb*(d2Xb/dt2) \quad \text{Expression 03}$$

$$Mzmp\_y = -mb*(Xb-Xzmp)*(g+d2Zb/dt2) + mb*(Zb-Zzmp)*(d2Xb/dt2) \quad \text{Expression 04}$$

In this case, the relationship between Mb_y and Mzmp_y is expressed by the following expression 05:

$$Mb\_y = Mzmp\_y - mb*Xzmp*(g+d2Zb/dt2) + mb*Zzmp*(d2Xb/dt2) = Mzmp\_y - Xzmp*Fz + Zzmp*Fx \quad \text{Expression 05}$$

It is noted that the positional difference in the vertical direction (Z-axis direction) between the desired ZMP and the origin of the supporting leg coordinate system is generally "0" or substantially "0", so that it may be regarded as: Zzmp=0.

Further, the variation of the height (position in the vertical direction) of the body 24 while the robot 1 is traveling relative to its average height (in other words, the divergence of the position in the vertical direction of the body 24) is generally sufficiently small, so that it may be regarded as: Zb≅h (where h is a fixed value indicating an average height of the body mass point 24b corresponding to the average height of the body 24). Accordingly, Zb in the second term on the right side of the above expression 03 and Zb in the second term on the right side of the above expression 04 may be replaced with the constant value h.

The gait generation system 100 according to the present embodiment generates a desired gait for one step in sequence, by taking the desired gait for one step from the instant one leg 2 of the robot 1 lands to the instant the other leg 2 lands as a unit. Thus, in the walking gait described in the present embodiment, a desired gait from the beginning of a two-leg supporting period to the end of the succeeding one-leg supporting period (or, to the beginning of the next two-leg supporting period) is generated in sequence.

As used herein, the term "one step" of a desired gait means from the instant one leg 2 of the robot 1 lands to the instant the other leg 2 lands. Further, a desired gait for one step that is about to be generated will be called a "current time gait", a desired gait for the next step will be called a "next time gait", and a desired gait for the step after the next will be called a "next but one time gait". A desired gait for one step that was generated immediately before the "current time gait" will be called a "last time's gait".

Furthermore, in order to generate a current time gait that can secure the continuity of the motion of the robot 1, the gait generation system 100 determines a normal turning gait which is a virtual cyclic gait (gait in which the same pattern of motion of the robot 1 is repeated continuously at a constant period) following the current time gait.

Then, the gait generation system 100 generates the current time gait in such a manner that the motion trajectory of the body 24 of the current time gait will converge to the motion trajectory of the body 24 in the normal turning gait in the future. In other words, the gait generation system 100 generates the current time gait by taking the normal turning gait as a convergence target in the future. In this case, according to the present embodiment, the position/posture at landing (landing position/posture) or the landing time of the foot 22 of the free leg 2 in the current time gait is updated as appropriate in the course of generation of the current time gait.

Hereinafter, the gait generating processing according to the gait generation system 100 will be described in detail with reference to FIGS. 8 to 24, by taking the generation of a walking gait as a primary example. The gait generation system 100 generates a desired gait by carrying out the gait generating processing (main routine processing) shown by a flowchart (structured flowchart) in FIG. 8.

Firstly, in S010, various initializing operations are performed, including initialization of time t to "0". This processing is performed primarily at the time of startup of the gait generation system 100.

Figure 8:
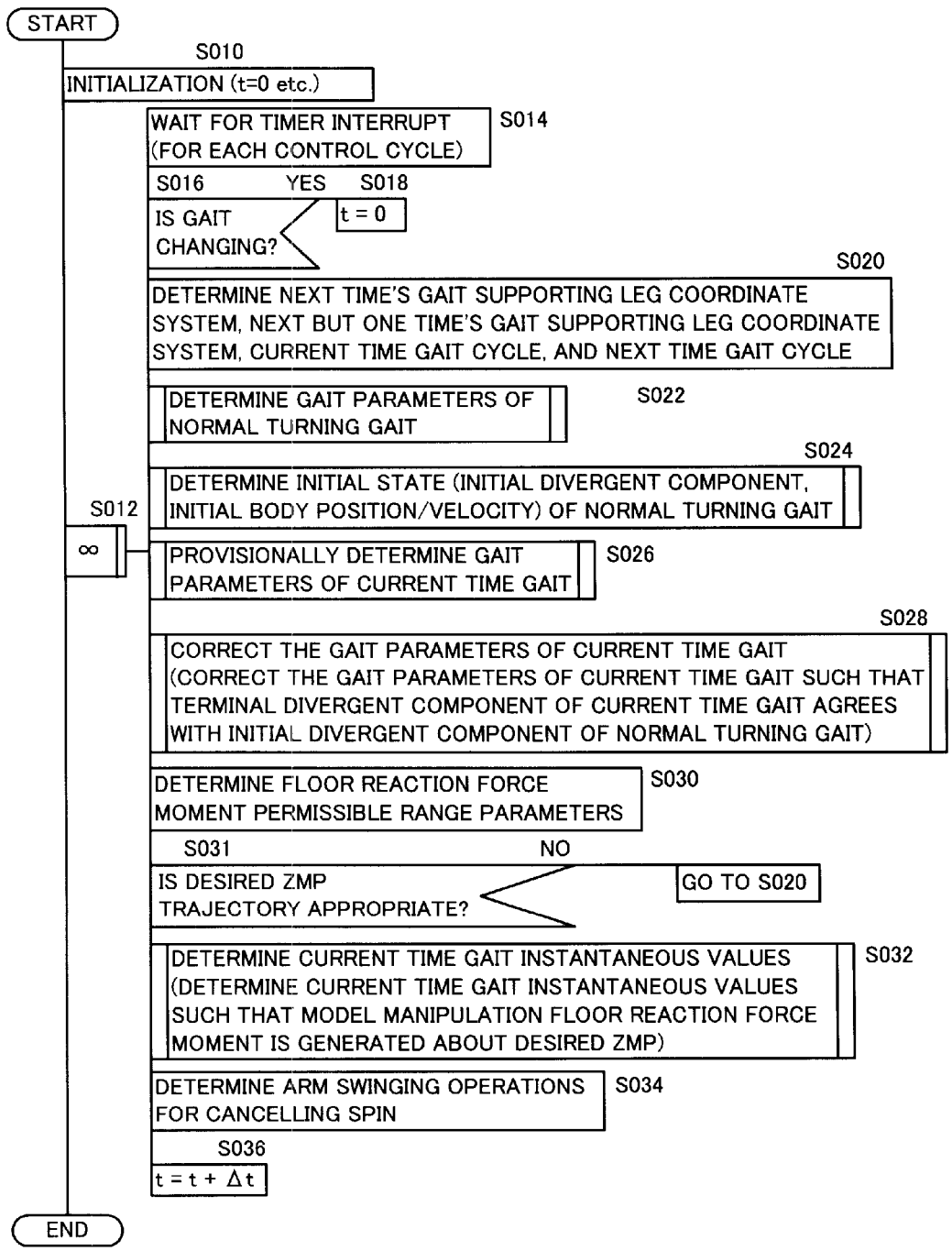
FIG. 8 is a flowchart showing the main routine processing carried out by the gait generation system shown in FIG. 3.

Next, the process proceeds through S012 to S014, where the gait generation system 100 waits for a timer interrupt for each control cycle (calculation cycle of the flowchart in FIG. 8). The control cycle is denoted by Δt.

Next, the process proceeds to S016, where the gait generation system 100 determines whether a gait is changing. If the gait is changing, the process proceeds through S018 to S020. In this case, in S018, the gait generation system 100 initializes time t to "0". If it is determined in S016 that the gait is not changing, the process proceeds to S020.

Here, the "change of gait" refers to the time when the generation of the last time's gait has been completed and the generation of the current time gait has started. For example, a control cycle following the control cycle in which the generation of the last time's gait has been completed corresponds to the change of gait.

Next, in S020, the gait generation system 100 determines a next time's gait supporting leg coordinate system, a next but one time's gait supporting leg coordinate system, a current time gait cycle, and a next time gait cycle.

To determine a supporting leg coordinate system specifically means to determine the position of its origin and the posture (orientation of each coordinate axis) of the supporting leg coordinate system. In this case, the supporting leg coordinate system is a coordinate system which has its position/posture (to be more specific, the position of the origin and the orientations of the X axis and the Y axis) defined in accordance with a prescribed relationship in correspondence with the position/posture of a supporting leg foot 22 in the state where substantially the entire surface of the sole of the foot 22 is in contact with the floor surface, as described above. Therefore, determining the next time's gait supporting leg coordinate system and the next but one time's gait supporting leg coordinate system is equivalent to determining a desired landing position/posture of the free leg foot 22 of the current time gait and a desired landing position/posture of the free leg foot 22 of the next time gait, respectively.

The processing of determining the supporting leg coordinate systems and the gait cycles in S020 in the case where the same is performed following the processing in S018 or following the processing in S016 when the determination result in S016 is negative (i.e. in the case where it is performed for the first time in each control cycle) is different from the processing in S020 in the case where it is performed following the processing in S031, which will be described later, when the determination result in S031 is negative. Here, the processing in S020 that is performed following the processing in S018 or following the determination processing in S016 will be described, while the processing in S020 that is performed when the determination result in S031 is negative will be described later. Accordingly, the description of the processing of S020 provided here relates to the processing of S020 that is performed following the processing in S018 or following the determination processing in S016, unless otherwise specified.

In the processing of S020 that is performed following the processing in S018 or following the determination processing in S016, the next time's gait supporting leg coordinate system and the next but one time's gait supporting leg coordinate system are basically determined within a range where a geometric (kinematic) constraint related to the motions of the legs 2, or, a geometric leg motion requisite condition can be satisfied, on the basis of the request parameters described above.

Here, the geometric leg motion requisite condition refers to a condition that a foot position/posture trajectory as a desired motion trajectory of the distal end portion of each leg 2 should be a motion trajectory within a geometric (kinematic) range of movement of each leg 2 of the robot 1. More specifically, the geometric leg motion requisite condition includes, for example, a condition that the amount of displacement (rotational angle) of each joint of each leg 2 does not exceed a prescribed range which is defined in accordance with the structures of the joint and its driving system, and a condition that the right and left legs 2R and 2L do not interfere with each other.

Further, the request parameters include required values which define a landing position/posture and landing time of the free leg foot 22 up to the next but one step. The required values for the first step and the second step, corresponding to the current time gait and the next time gait, respectively, are supplied to the gait generation system 100 before the generation of the current time gait is started (before the change of gait in S016 described above). These required values may be configured to be changeable in the course of the generation of the current time gait.

It is noted that the required values for the landing position/posture and landing time of the free leg foot 22 up to the next but one step may be determined on the basis of commands (requests) from an external controlling device or the like and on the basis of a history of movement of the robot 1 up to then. Further, the request parameters may be parameters which directly designate the required values for the positions and postures of the next time's and the next but one time's gait supporting leg coordinate systems and the required values for the current time's and the next time's gait cycles.

Furthermore, although the landing position/posture of a free leg foot 22 may be a position/posture at the instant of landing thereof, in the description of the present embodiment, it is assumed for ease of understanding that the landing position/posture of the free leg foot 22 refers to the position/posture of the free leg foot 22 in the state where substantially the entire surface of the sole of the free leg foot 22 comes in contact with a floor surface after the foot 22 is turned without slippage following the landing thereof. This position/posture may be referred to as the "landing-time foot reference position/posture". In the present embodiment, it is assumed that the landing time of a free leg foot 22 refers to the time at the instant of landing of the foot 22.

In S020, the gait generation system 100 determines whether the required value of the landing position/posture of the free leg foot 22 (the free leg foot 22 of the current time gait) for the first step and the required value of the landing position/posture of the free leg foot 22 (the free leg foot 22 of the next time gait) for the second step, which are defined by the above-described request parameters, are required values that can satisfy the above-described geometric leg motion requisite condition, and determines the next time's gait supporting leg coordinate system and the next but one time's gait supporting leg coordinate system in accordance with the determination result.

More specifically, in order to determine a next time's gait supporting leg coordinate system and a next but one time's gait supporting leg coordinate system that can satisfy the geometric leg motion requisite condition, the gait generation system 100 sets a first landing permissible region which is a permissible region for a landing position of a free leg foot 22 that can satisfy the geometric leg motion requisite condition (specifically, it sets the first landing permissible regions for the free leg foot 22 which are observed in the supporting leg coordinate systems of the current time gait and the next time gait, respectively) on a floor surface recognized from the input floor shape information.

In the present embodiment, the first landing permissible region is a region in which a relative position/posture of the above-described landing-time foot reference position/posture with respect to a supporting leg foot 22 (i.e. position/posture observed from the supporting leg coordinate system corresponding to the supporting leg foot 22) and a shape thereof are predetermined. The first landing permissible region is set separately for the case where the supporting leg foot 22 is the right foot 22R and for the case where the supporting leg foot 22 is the left foot 22L.

The first landing permissible region of the free leg foot 22L in the case where the right foot 22R is the supporting leg foot (hereinafter, this may be referred to as a "left foot first landing permissible region") is a region that is set with respect to the supporting leg coordinate system for the supporting leg foot 22R in the position/posture relationship as shown in a solid line in FIG. 9 (in FIG. 9, the region is shown as the first landing permissible region in the current time gait, which is observed in the current time's gait supporting leg coordinate system).

Further, the first landing permissible region of the free leg foot 22R in the case where the left foot 22L is the supporting leg foot (hereinafter, this may be referred to as a "right foot first landing permissible region") is a region that is set with respect to the supporting leg coordinate system for the supporting leg foot 22L in the position/posture relationship as shown in a broken line in FIG. 9 (in FIG. 9, the region is shown as the first landing permissible region in the next time gait, which is observed in the next time's gait supporting leg coordinate system).

In this case, the shape and the position/posture of the left foot first landing permissible region are set in such a manner that the above-described geometric leg motion requisite condition can be satisfied in the case where the free leg foot 22L is landed so that the landing position of the free leg foot 22L falls within that left foot first landing permissible region in the state where the landing posture of the free leg foot 22L (specifically, the posture about the Z axis of the supporting leg coordinate system for the supporting leg foot 22R) is within a prescribed permissible range.

Similarly, the shape and the position/posture of the right foot first landing permissible region is set in such a manner that the geometric leg motion requisite condition can be satisfied in the case where the free leg foot 22R is landed so that the landing position of the free leg foot 22R falls within that right foot first landing permissible region in the state where the landing posture of the free leg foot 22R (specifically, the posture about the Z axis of the supporting leg coordinate system for the supporting leg foot 22L) is within a prescribed permissible range.

It is noted that the left foot first landing permissible region and the right foot first landing permissible region are bilaterally symmetrical with respect to the supporting leg coordinate system.

In S020 following S018, in order to firstly determine a next time's gait supporting leg coordinate system, the gait generation system 100 sets a first landing permissible region for a free leg foot 22 in the current time gait on the current time's gait supporting leg coordinate system. Then, in the case where the required value of the landing posture of the free leg foot 22 in the current time gait is within a prescribed permissible range and the required value of the landing position of the free leg foot 22 falls within the first landing permissible region in the current time's gait supporting leg coordinate system, then the gait generation system 100 determines that the required value of the landing position/posture of the free leg foot 22 is a required value that can satisfy the geometric leg motion requisite condition.

In this case, the gait generation system 100 sets the required value of the landing position/posture of the free leg foot 22 in the current time gait, as it is, as a desired value of the landing position/posture (or, a desired landing position/posture) of the free leg foot 22, and determines the supporting leg coordinate system corresponding to this desired landing position/posture as the next time's gait supporting leg coordinate system.

In the case where the required value of the landing posture of the free leg foot 22 in the current time gait is out of the prescribed permissible range, or in the case where the required value of the landing position of the free leg foot 22 is out of the first landing permissible region in the current time's gait supporting leg coordinate system, then the gait generation system 100 determines that the required value of the landing position/posture of the free leg foot 22 is not a required value that can satisfy the geometric leg motion requisite condition.

At this time, in the case where the required value of the landing posture of the free leg foot 22 is out of the prescribed permissible range, the gait generation system 100 sets a posture that is closest to the required value of the landing posture of the free leg foot 22 within the prescribed permissible range as a desired value of the landing posture of the free leg foot 22. In the case where the required value of the landing posture of the free leg foot 22 is within the prescribed permissible range, the gait generation system 100 sets the required value of the landing posture of the free leg foot 22, as it is, as a desired value.

Further, in the case where the required value of the landing position of the free leg foot 22 is out of the first landing permissible region in the current time's gait supporting leg coordinate system, the gait generation system 100 sets a position that is closest to the required value of the landing position within the first landing permissible region as a desired value of the landing position of the free leg foot 22 in the current time gait. In the case where the required value of the landing position of the free leg foot 22 is within the first landing permissible region in the current time's gait supporting leg coordinate system, the gait generation system 100 sets the required value of the landing position of the free leg foot 22, as it is, as a desired value.

Then, the gait generation system 100 sets a supporting leg coordinate system that corresponds to the desired landing position/posture of the free leg foot 22 in the current time gait, determined in the above-described manner, as the next time's gait supporting leg coordinate system.

Further, in the next time's gait supporting leg coordinate system thus determined, the gait generation system 100 sets a first landing permissible region for a free leg foot 22 in the next time gait. The gait generation system 100 then determines whether the required value of the landing posture of the free leg foot 22 in the next time gait is within a prescribed permissible range and the required value of the landing position of the free leg foot 22 falls within the first landing permissible region in the next time's gait supporting leg coordinate system. Then, in accordance with the determination result, the gait generation system 100 determines a next but one time's gait supporting leg coordinate system. The way of determining the next but one time's gait supporting leg coordinate system is similar to the above-described way of determining the next time's gait supporting leg coordinate system.

As described above, in S020 following S018, the next time's gait supporting leg coordinate system and the next but one time's gait supporting leg coordinate system are each determined so as to follow the required values of the landing position/posture of the free leg foot 22 up to the next but one step defined by the request parameters as much as possible, within the range satisfying the geometric leg motion requisite condition.

Figure 9:
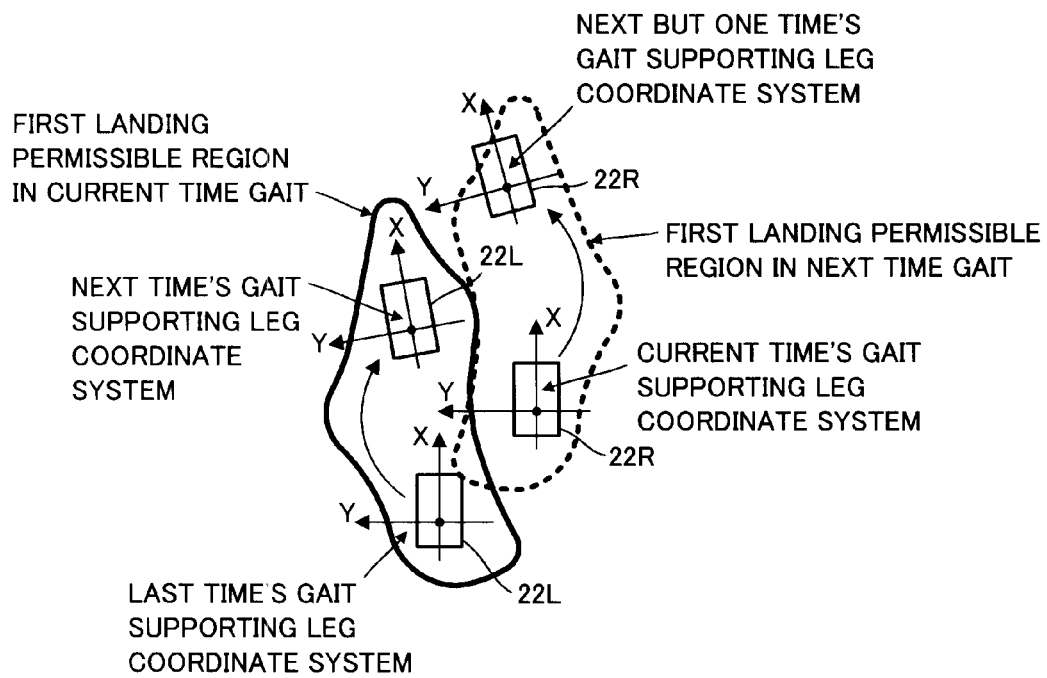
FIG. 9 is a diagram visually showing an example of a first landing permissible region used in the processing in S020 in FIG. 8.

FIG. 9 shows, by way of example, the next time's gait supporting leg coordinate system and the next but one time's gait supporting leg coordinate system that are determined in the above-described manner. In this example, it is assumed that the required value of the landing position of the free leg foot 22 (22L in the figure) in the current time gait is within the first landing permissible region (left foot first landing permissible region) in the current time's gait supporting leg coordinate system and that the required value of the landing position of the free leg foot 22 (22R in the figure) in the next time gait is within the first landing permissible region (right foot first landing permissible region) in the next time's gait supporting leg coordinate system.

As to the current time gait cycle, in the case where a required value of the current time gait cycle, which is a difference between a required value of the landing time of the free leg foot 22 in the current time gait that is defined by the request parameters and a desired landing time of the free leg foot 22 in the last time's gait, is within a prescribed permissible range (hereinafter, referred to as the "gait cycle permissible range") for limiting the displacement speed of the joints of the legs 2 and others, then the gait generation system 100 determines the required value, as it is, as a desired value of the current time gait cycle. In the case where the required value of the current time gait cycle is out of the gait cycle permissible range, then the gait generation system 100 sets a value that is closest to the required value within the gait cycle permissible range as a desired value of the current time gait cycle.

Furthermore, in the case where a required value of the next time gait cycle, which is a difference between a required value of the landing time of the free leg foot 22 in the next time gait that is defined by the request parameters and a desired landing time of the free leg foot 22 in the current time gait that corresponds to the desired value of the current time gait cycle determined in the above-described manner (=desired landing time of the free leg foot 22 in the last time's gait+desired value of the current time gait cycle), is within the above-described gait cycle permissible range, then the gait generation system 100 sets the required value, as it is, as a desired value of the next time gait cycle. In the case where the required value of the next time gait cycle is out of the gait cycle permissible range, then the gait generation system 100 sets a value that is closest to the required value within the gait cycle permissible range as a desired value of the next time gait cycle.

The above is the details of the processing that is carried out by the gait generation system 100 in S020 following the processing in S018 or following the determination processing in S016.

Supplementally, in the present embodiment, the desired landing position/posture of the free leg foot 22 of the robot 1 in one or both of the current time gait and the next time gait (and also the position/posture of at least one of the next time's gait supporting leg coordinate system and the next but one time's gait supporting leg coordinate system), or the gait cycle of the current time gait or of the next time gait may be corrected from the corresponding one initially determined in S020 in each control cycle.

Subsequently, the process proceeds to S022, where the gait generation system 100 determines gait parameters of a normal turning gait which is a virtual cyclic gait that follows the current time gait (i.e. a virtual cyclic gait to which the current time gait aims to converge). In the present embodiment, the gait parameters include: foot trajectory parameters that define a desired foot position/posture trajectory in the normal turning gait, body posture trajectory parameters that define a desired body posture trajectory, arm trajectory parameters that define a desired arm posture trajectory, ZMP trajectory parameters that define a desired ZMP trajectory, and floor reaction force vertical component trajectory parameters that define a desired floor reaction force vertical component trajectory.

As used herein, the "normal turning gait" means a cyclic gait that causes no discontinuity in the motional states (of foot position/posture, body position/posture, and the like) of the robot 1 at the boundary of a gait (gait boundary for each cycle) when the gait is repeated. As the "normal turning gait" is a cyclic gait, meaning that a gait of the same pattern is repeated at a constant period, it enables continuous motion of the robot 1. In other words, the "normal turning gait" is a cyclic gait that enables repetition of motion of the same pattern without causing discontinuity in the gait trajectory (i.e. the gait that does not cause "divergence", which will be describe later, in principle even after an infinite number of repetitions thereof).

In the present embodiment, the normal turning gait, which is a cyclic gait, is a gait in which a gait for one cycle is repeated at a constant period, the gait for one cycle being formed of a gait for two steps of the robot 1, i.e. a first turning gait following the current time gait and a second turning gait following the first turning gait. The term "turning" is used here because, as the turning rate of zero means straight advancement, the straight advancement can also be included in "turning" in a broad sense.

Adding supplemental explanation of the normal turning gait (hereinafter, it may also be simply referred to as the "normal gait"), in a bipedal mobile robot, the gait for one cycle of a normal gait needs to include a gait for at least two steps. In this case, it is also possible to set a complicated normal gait in which the gait for one cycle includes three or more steps.

The normal gait, however, is used only for determining a value of a desired (proper) divergent component at the end (ending time) of the current time gait, as will be described later. Thus, using the normal gait having a gait for three or more steps for one cycle will provide little effect despite the complicated processing for generating the gait. Accordingly, in the present embodiment, the gait for one cycle in the normal gait is composed of the gait for two steps (i.e. a combination of the first turning gait and the second turning gait). It is noted that for a legged mobile robot having three or more feet, the number of gaits for defining the normal gait will increase accordingly.

Figure 10:
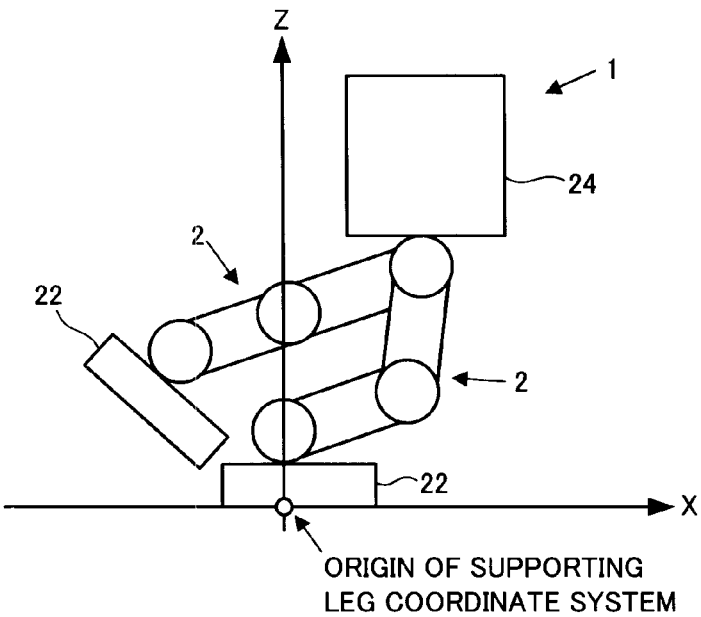
FIG. 10 is a diagram visually showing a divergent state of the posture of the robot shown in FIG. 1.

As used herein, the "divergence" means that the position of the body 24 of the robot 1 is undesirably shifted to a position away from the positions of both feet 22, 22, as shown in FIG. 10. Further, the value of the divergent component is a numerical value indicating how far the position of the body 24 of the robot 1 becomes away from the positions of both feet 22, 22 (to be more specific, from the origin of the supporting leg coordinate system set on the ground contact surface of the supporting leg foot 22).

The normal gait is a virtual gait that is generated by the gait generation system 100 for determining a desired motional state of the robot 1 at the end of the current time gait. Therefore, the normal turning gait as it is not output from the gait generation system 100.

In the present embodiment, a divergent component is used as an index so that desired gaits are continuously generated without causing the divergence described above. However, even in the case of a normal gait which is a typical example of a continuous gait, when gait parameters of the normal gait change, the initial divergent component of the normal gait (divergent component at the starting time of the normal gait) will change. That is, a proper divergent component changes depending on the form of gait, such as the manner of walking, the manner of running, the moving speed, and so on.

Accordingly, in the present embodiment, in generating a current time gait, the gait generation system 100 firstly determines a normal gait as a virtual cyclic gait in the future (a virtual cyclic gait in the future that enables continuous and stable movement of the robot 1) which is preferable as a gait following the current time gait to be generated (a gait as a target of convergence in the future), in accordance with the request parameters regarding the current time gait (or in accordance with the supporting leg coordinate systems and the gait cycles determined in S020), and then obtains an initial divergent component of the normal gait.

Then, the gait generation system 100 generates the current time gait such that the terminal divergent component of the current time gait coincides with the obtained initial divergent component of the normal gait (more generally, the current time gait is made to continue to or gradually approximate to the normal gait). The basis guidelines for generating such gaits are the same as those disclosed in Japanese Patent No. 3726081 previously proposed by the present applicant.

Figure 11:
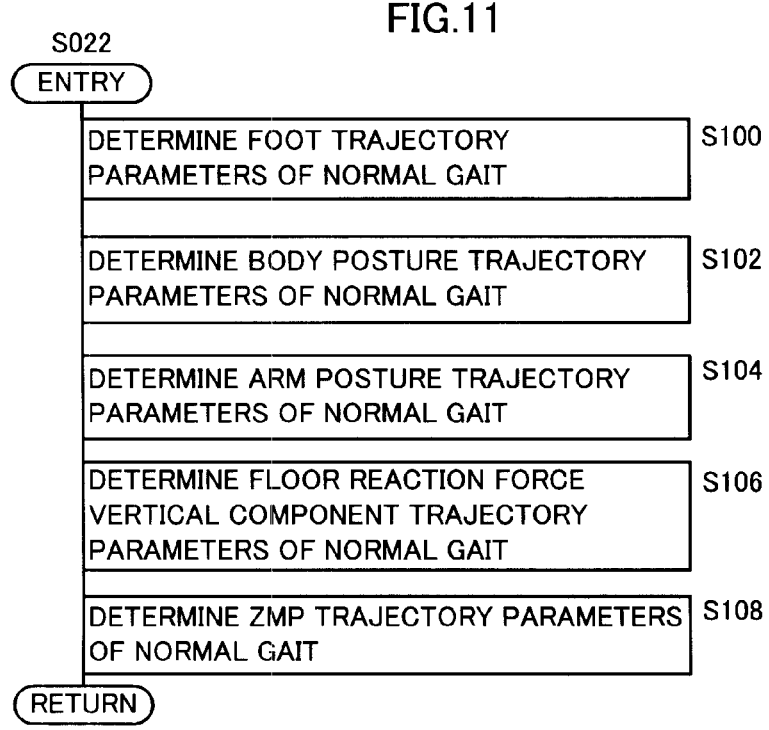
FIG. 11 is a flowchart showing the subroutine processing in S022 in FIG. 8.

Returning to the main subject, in S022, the gait generation system 100 carries out subroutine processing shown by a flowchart in FIG. 11.

Firstly, in S100, the gait generation system 100 determines the foot trajectory parameters among the gait parameters of a normal gait, in such a manner that the foot position/posture trajectory continues in order of a current time gait, a first turning gait, and a second turning gait. Hereinafter, a specific setting method will be described, with reference to FIG. 12, assuming that the normal gait is a walking gait. In the following description, the foot 22 of a supporting leg will be called the supporting leg foot 22, and the foot 22 of a free leg will be called the free leg foot 22. Further, the "beginning" and "end" of a gait will mean the starting time and the ending time, respectively, of the gait, or instantaneous gaits at the respective times.

The foot trajectory parameters primarily include the positions/postures of the supporting leg foot 22 and the free leg foot 22 at the beginning and the end of a first turning gait and a second turning gait, respectively, and the gait cycles of the respective turning gaits (the time from the beginning to the end of each turning gait). Of the foot trajectory parameters, the free leg foot position/posture at the beginning of the first turning gait is defined as the supporting leg foot position/ posture at the end of the current time gait observed from the next time's gait supporting leg coordinate system.

In this case, the supporting leg foot position/posture at the end of the current time gait is a position/posture of the supporting leg foot 22 of the current time gait in the state where the foot 22 is turned by a prescribed angle in the pitch direction (in the direction in which the heel of the foot 22 is raised), without slippage, from the above-described landing-time foot reference position/posture corresponding to the current time's gait supporting leg coordinate system.

Further, the supporting leg foot position/posture at the beginning of the first turning gait is defined as the free leg foot position/posture at the end of the current time gait observed from the next time's gait supporting leg coordinate system. In this case, the free leg foot position/posture at the end of the current time gait is determined in such a manner that the position/posture of the free leg foot 22 of the current time gait when it is turned by a prescribed angle in the pitch direction (in the direction in which the tiptoe of the foot 22 is lowered), without slippage, from the free leg foot position/posture at the end of the current time gait agrees with the above-described landing-time foot reference position/posture corresponding to the next time's gait supporting leg coordinate system.

The free leg foot position/posture at the end of the first turning gait is defined as the free leg foot position/posture at the end of the next time gait observed from the next time's gait supporting leg coordinate system. In this case, the free leg foot position/posture at the end of the next time gait is determined in such a manner that the position/posture of the free leg foot 22 of the next time gait when it is turned by a prescribed angle in the pitch direction (in the direction in which the tiptoe of the foot 22 is lowered), without slippage, from the free leg foot position/posture at the end of the next time gait agrees with the above-described landing-time foot reference position/posture corresponding to the next but one time's gait supporting leg coordinate system.

The supporting leg foot position/posture at the end of the first turning gait is defined as the supporting leg foot position/posture at the end of the next time gait observed from the next time's gait supporting leg coordinate system. In this case, the supporting leg foot position/posture at the end of the next time gait is a position/posture of the supporting leg foot 22 of the next time gait in the state where it is turned by a prescribed angle in the pitch direction (in the direction in which the heel of the foot 22 is raised), without slippage, from the above-described landing-time foot reference position/posture corresponding to the next time's gait supporting leg coordinate system.

The free leg foot position/posture at the beginning of the second turning gait is defined as the supporting leg foot position/posture at the end of the first turning gait observed from the next but one time's gait supporting leg coordinate system. The supporting leg foot position/posture at the beginning of the second turning gait is defined as the free leg foot position/posture at the end of the first turning gait observed from the next but one time's gait supporting leg coordinate system.

The free leg foot position/posture at the end of the second turning gait is the position/posture observed from the next but one time's gait supporting leg coordinate system, and is made to agree with the free leg foot position/posture at the end of the current time gait observed from the current time's gait supporting leg coordinate system. In other words, the free leg foot position/posture at the end of the second turning gait is a position/posture determined in such a manner that the position/posture of the free leg foot 22 of the second turning gait when it is turned by a prescribed angle in the pitch direction (in the direction in which the tiptoe is lowered), without slippage, from the free leg foot position/posture at the end of the second turning gait agrees with the landing-time foot reference position/posture corresponding to a next but two time's gait supporting leg coordinate system (shown in FIG. 12) in the normal gait.

Here, the next but two time's gait supporting leg coordinate system is a supporting leg coordinate system in which the position/posture (position/posture represented by xnext, ynext, and θznext in FIG. 12) of the next but two time's gait supporting leg coordinate system observed in the next but one time's gait supporting leg coordinate system agrees with the position/posture of the next time's gait supporting leg coordinate system observed in the current time's gait supporting leg coordinate system.

Further, the supporting leg foot position/posture at the end of the second turning gait is the position/posture observed from the next but one time's gait supporting leg coordinate system, and the position/posture is made to agree with the supporting leg foot position/posture at the end of the current time gait observed from the current time's gait supporting leg coordinate system. That is, the supporting leg foot position/posture at the end of the second turning gait is the position/posture of the supporting leg foot 22 in the next but one time gait in the state where it is turned by a prescribed angle in the pitch direction (in the direction in which the heel of the foot 22 is raised), without slippage, from the landing-time foot reference position/posture corresponding to the next but one time's gait supporting leg coordinate system.

The gait cycles of the first turning gait and the second turning gait are set to be identical to the next time gait cycle. Although the gait cycles of the first and second turning gaits do not necessarily have to be the same with each other, both cycles are preferably determined at least on the basis of the next time gait cycle.

Next, the process proceeds to S102, where the gait generation system 100 determines the body posture trajectory parameters that define a desired body posture trajectory in the normal gait.

In the present embodiment, the body posture trajectory parameters of the normal gait are determined such that the desired body posture trajectory defined thereby coincides with a trajectory of a reference body posture of a prescribed pattern that is determined in advance. In the present embodiment, this reference body posture is set to be a constant posture (fixed posture) that does not change over time.

The reference body posture is for example a posture in which the trunk axis of the body 24 is constantly in the vertical direction (i.e. the body posture in the state where the robot 1 is standing upright), or, a posture in which the body posture angle relative to the vertical direction is constantly kept at "0". The parameters defining such a reference body posture trajectory (value of the constant body posture angle of the reference body posture and the like) are determined as the body posture trajectory parameters. When the body posture is set to the constant posture as described above, naturally, the angular velocity and the angular acceleration of the body posture angle are constantly kept at "0" as well.

Supplementally, the body posture in a normal gait does not necessarily have to be a constant posture as long as it is set such that the body posture at the beginning of the normal gait (at the beginning of the first turning gait) and that at the end thereof (at the end of the second turning gait) are connected (such that the body posture angle and its angular velocity at the beginning of the normal gait coincide with those at the end thereof). In the present embodiment, the reference body posture has been set to be a constant posture, as described above, to facilitate understanding of the present embodiment.

The process then proceeds to S104, where the gait generation system 100 determines the arm posture trajectory parameters. More specifically, the gait generation system 100 determines the arm posture trajectory parameters other than those related to the changes in angular momentum of both arms about the vertical axis (or the trunk axis of the body 24). For example, parameters defining a relative height of the distal end (hand) of the arm and a relative position of the center of gravity of the entire arm with respect to the body 24, and the like are determined as the arm posture trajectory parameters. In the present embodiment, the relative position of the center of gravity of the entire arm is set to be maintained constant with respect to the body 24.

The process then proceeds to S106, where the gait generation system 100 determines the floor reaction force vertical component trajectory parameters. In this case, the floor reaction force vertical component trajectory parameters are determined such that the floor reaction force vertical component trajectory defined thereby will be substantially continuous in both of the first and second turning gaits.

Figure 13:
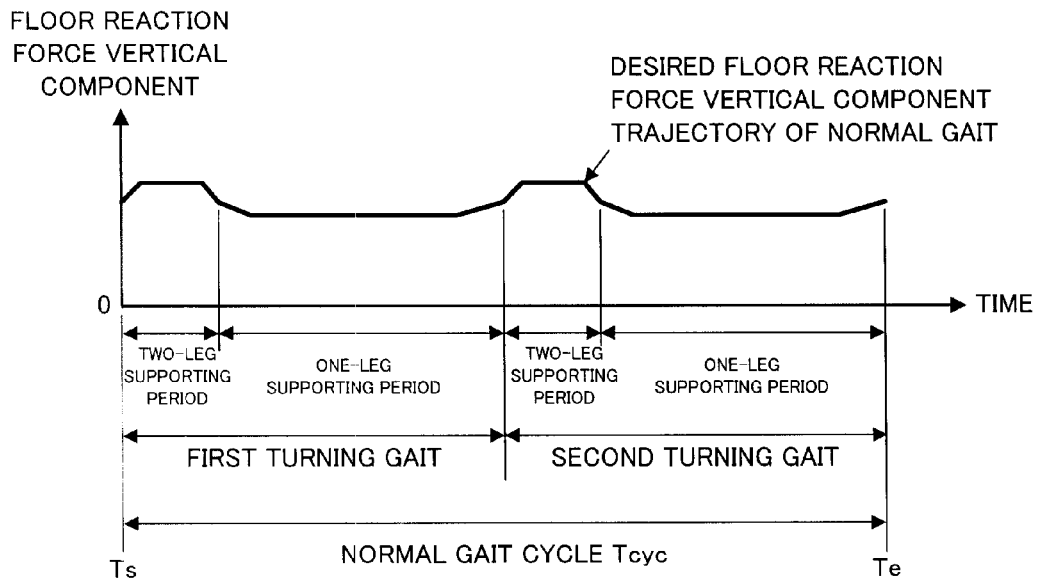
FIG. 13 is a graph showing, by way of example, a desired floor reaction force vertical component trajectory in a normal turning gait of the robot shown in FIG. 1.

Specifically, a desired floor reaction force vertical component trajectory in the case where the normal gait is a walking gait is set to have a pattern as shown for example in FIG. 13. The pattern is similar to the one previously shown in FIG. 5 in both of the first and second turning gaits. The times of the bending points and the values of the floor reaction force vertical component in this pattern are determined as the floor reaction force vertical component trajectory parameters.

The floor reaction force vertical component trajectory parameters are determined such that the average value of the floor reaction force vertical components in the period of one cycle of the normal gait (the period equivalent to the sum of the periods of the first and second turning gaits) agrees with the self-weight of the robot 1. That is, the floor reaction force vertical component trajectory parameters are determined such that the average value of the floor reaction force vertical components during the period of one cycle of the normal gait has the same magnitude as that of the gravitational force acting on the entire robot 1 but acts in the opposite direction.

The floor reaction force vertical component trajectory parameters (and, hence, the floor reaction force vertical component trajectory) are determined in the above-described manner because the following condition needs to be satisfied: for any state quantities of the normal gait (motional state quantities including the position, posture, and velocity of each part of the robot 1), the initial state (the initial state of a first turning gait observed from the supporting leg coordinate system of the first turning gait of the normal gait) and the terminal state (the terminal state of a second turning gait observed from the supporting leg coordinate system of the first turning gait following the second turning gait of the normal gait) coincide with each other (hereinafter, this condition may be referred to as the "normal gait boundary condition").

The process then proceeds to S108, where the gait generation system 100 determines the ZMP trajectory parameters that define a desired ZMP trajectory of a normal gait as a combination of the first and second turning gaits. In this case, the desired ZMP trajectory is determined such that it has a high stability allowance and does not develop an abrupt change, as previously described.

Figure 14:
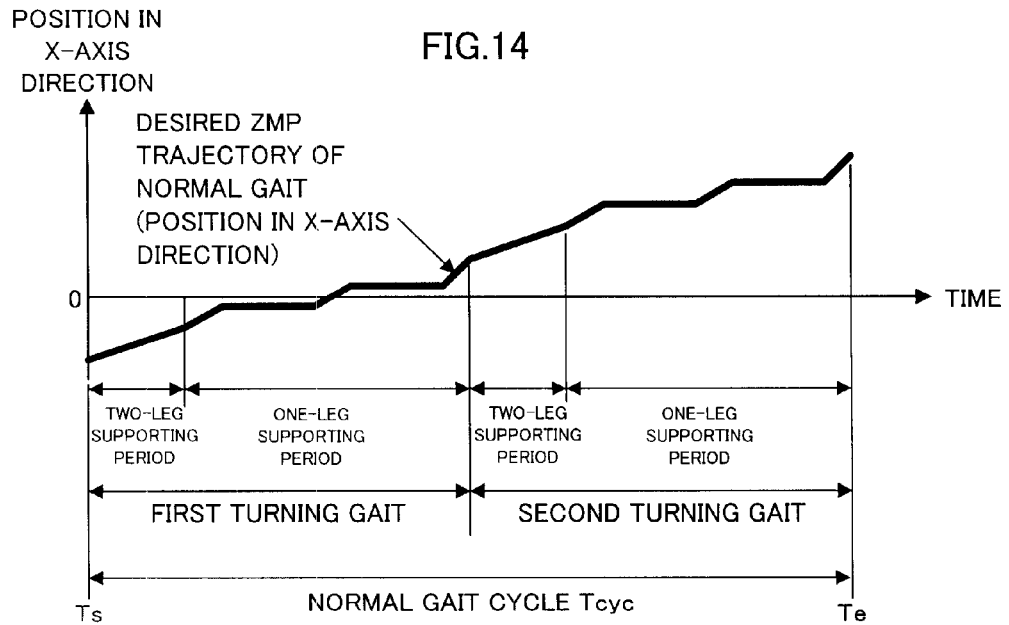
FIG. 14 is a graph showing, by way of example, a desired ZMP trajectory (component in the X-axis direction) in the normal turning gait of the robot shown in FIG. 1.

The desired ZMP trajectory (more specifically, the position in the X-axis direction of the desired ZMP) in the case where the normal gait is a walking gait is set to have a pattern as shown for example in FIG. 14. This pattern is similar to that previously shown in FIG. 6 in both of the first and second turning gaits. The times of the bending points and the positions of the desired ZMP in this pattern are determined as the ZMP trajectory parameters.

Although not shown in the figure, the position in the Y-axis direction of the desired ZMP in the case where the normal gait is a walking gait is set as follows for both of the first and second turning gaits. In the one-leg supporting period, it is set to be maintained at the same position as the position in the Y-axis direction of the ankle joint of a supporting leg 2 (i.e. the position immediately beneath the ankle joint). In the two-leg supporting period, the position in the Y-axis direction of the desired ZMP is set to move from the same position as the position in the Y-axis direction of the ankle joint of the leg 2 that served as the supporting leg in the immediately preceding one-leg supporting period, to the same position as the position in the Y-axis direction of the ankle joint of the leg 2 that has been newly landed.

The above is the details of the processing in S022 in FIG. 8.

Returning to FIG. 8, following the processing in S022 as described above, the process proceeds to S024, where the gait generation system 100 calculates the initial state of the normal gait. The initial state calculated here includes an initial body position/velocity (initial body position and initial body velocity) and an initial divergent component of the normal gait. The calculation of the initial state is performed in an exploratory manner by the processing shown by a flowchart in FIG. 15.

The processing will now be described. Firstly, in S200, the gait generation system 100 determines initial states of desired foot position/posture, desired arm posture, and desired body posture angle of the normal gait (the states at the starting time of the normal gait (=the ending time of the current time gait)) on the basis of the normal gait parameters (the gait parameters determined in S022 in FIG. 8).

Here, the term "state" means a set of a position or posture and its temporal change rate (changing velocity of the position or posture). For example, the initial state of the desired foot position/posture means a set of the foot position/posture at the starting time of the normal gait and its temporal change rate (i.e., the moving velocity of the foot 22 and the changing velocity of its posture). The same applies to the initial state of the desired arm posture and the initial state of the desired body posture angle.

In this case, the initial state of the position/posture of the foot of a supporting leg and the initial state of the position/posture of the foot of a free leg are determined on the basis of the foot trajectory parameters determined in S100 in FIG. 11.

Specifically, among the foot trajectory parameters, the supporting leg foot position/posture at the beginning of the first turning gait and the free leg foot position/posture at the beginning of the first turning gait described above are determined as the position/posture of the foot of the supporting leg and the position/posture of the foot of the free leg, respectively, at the starting time of the normal gait.

Further, the temporal change rate of the position/posture of the foot of the supporting leg at the starting time of the normal gait is calculated as a temporal change rate of the foot position/posture at the starting time (starting time of the normal gait) of a foot position/posture trajectory (observed from the next time's gait supporting leg coordinate system) from the supporting leg foot position/posture at the beginning of the first turning gait to the free leg foot position/posture at the end of the second turning gait, the trajectory being generated by a finite-duration setting filter.

In this case, of the foot position/posture trajectory from the supporting leg foot position/posture at the beginning of the first turning gait to the free leg foot position/posture at the end of the second turning gait, the trajectory from the starting time of the normal gait to the time immediately thereafter can be used to calculate the temporal change rate of the position/posture of the foot of the supporting leg at the starting time of the normal gait.

Further, the temporal change rate of the position/posture of the foot of the free leg at the starting time of the normal gait is calculated as a temporal change rate of the foot position/posture at the starting time (starting time of the normal gait) of a foot position/posture trajectory (observed from the next time's gait supporting leg coordinate system) from the supporting leg foot position/posture at the beginning of the current time gait to the free leg foot position/posture at the end of the first turning gait, the trajectory being generated by a finite-duration setting filter.

In this case, of the foot position/posture trajectory from the supporting leg foot position/posture at the beginning of the current time gait to the free leg foot position/posture at the end of the first turning gait, the trajectory from the starting time of the current time gait to the starting time of the normal gait (or the time immediately thereafter) may be generated, so that this trajectory (the trajectory in the vicinity of the starting time of the normal gait) can be used to calculate the temporal change rate of the position/posture of the foot of the free leg at the starting time of the normal gait.

The initial state of the arm posture is determined, on the basis of the arm posture trajectory parameters determined in S104 in FIG. 11, by obtaining the arm posture (including the position of the overall center of gravity of the arms relative to the body 24) at the starting time of the normal gait and the change amount of the arm posture in a period immediately following the starting time of the normal gait.

Further, the initial state of the body posture angle is determined, on the basis of the body posture trajectory parameters determined in S102 in FIG. 11, by obtaining the body posture angle at the starting time of the normal gait and the change amount of the body posture angle in a period immediately following the starting time of the normal gait. It is noted that in the present embodiment, the body posture defined by the body posture trajectory parameters is a posture in which the trunk axis of the body 24 is constantly in the vertical direction. Thus, the body posture angle and its angular velocity at the starting time of the normal gait are both "0".

Subsequently, in S202, the gait generation system 100 provisionally determines (Xs, Vxs) (Xs: horizontal position, Vxs: horizontal velocity) which is a candidate for the initial body horizontal position/velocity (a set of candidates for the horizontal position and the horizontal velocity of the body 24 at the starting time of the normal gait). The candidate (Xs, Vxs) to be provisionally determined here may be arbitrary. For example, it may be provisionally determined as the candidate (Xs, Vxs) for the body horizontal position/velocity in the initial state of the normal gait determined when the last time's gait was generated.

For simplification of the explanation, description will be given for the case of exploring the initial state (initial body horizontal position/velocity) of a normal gait in the X-axis direction (roll-axis direction) on a sagittal plane. In practice, however, it is necessary to explore the initial state of the normal gait (initial state satisfying the above-described normal gait boundary condition), for each of the position and the velocity, in the X-axis direction (roll-axis direction) and in the Y-axis direction (pitch-axis direction) separately or simultaneously.

As an exploratory determining technique, a method in which a pseudo-Jacobian (sensitivity matrix) is determined and then a next candidate is determined by a steepest descent method or the like, or a simplex method may be used. In the present embodiment, the steepest descent method will be used for example.

Subsequently, the process proceeds through S204 to S206, where an initial body vertical position/velocity (Zs, Vzs) is determined, which is a set of the vertical position (position in the Z-axis direction) Zs and the vertical velocity (velocity in the Z-axis direction) Vzs of the body 24 at the starting time of the normal gait.

In the present embodiment, the initial body vertical velocity Vzs is determined for example in the following manner.

For the robot 1, the following dynamic relationship holds:

Terminal overall center-of-gravity vertical position−
Initial overall center-of-gravity vertical
position=Second order integral of (Floor reaction
force vertical component/Overall mass of the
robot)+Second order integral of gravitational
acceleration+Initial overall center-of-gravity vertical velocity*Duration of one step      Expression 13

(where the gravitational acceleration takes a negative value)

In the normal gait, the terminal overall center-of-gravity vertical position coincides with the initial overall center-of-gravity vertical position, so that the right side in the above expression 13 should be zero. Thus, the initial overall center-of-gravity vertical velocity can be determined from this relationship. Specifically, firstly, a value obtained by dividing the floor reaction force vertical component, which is calculated on the basis of the floor reaction force vertical component trajectory parameters determined in S106 in FIG. 11, by the overall mass of the robot 1 is integrated two times with respect to the period from the beginning to the end of the normal gait, to thereby obtain the amount of movement of the overall center of gravity due to the floor reaction force vertical component (the first term in the right side of the expression 13).

Furthermore, the gravitational acceleration is integrated two times with respect to the period from the beginning to the end of the normal gait, to thereby obtain the amount of movement of the overall center of gravity due to the gravitational force (the second term in the right side of the expression 13). Then, the sum of the amount of movement of the overall center of gravity due to the floor reaction force vertical component and the amount of movement of the overall center of gravity due to the gravitational force, which have been obtained as described above, is reversed in sign, and the resultant value is divided by the duration of one cycle Tcyc of the normal gait, to thereby obtain the initial overall center-of-gravity vertical velocity.

Then, in the present embodiment, a multi-mass-point model (geometric model) having mass points at the body 24 and other parts (the legs 2, 2 and the arms), for example, is used to obtain the vertical velocity of the body 24 which causes the vertical velocity of the center-of-gravity point of the multi-mass-point model to coincide with the initial overall center-of-gravity vertical velocity described above, on the basis of the initial states of the foot position/posture, the arm posture, and the like determined in S200 and also on the basis of the initial body horizontal position/velocity (Xs, Vxs) determined in S202 (or S218 to be described later), and the vertical velocity thus obtained is determined to be the initial body vertical velocity Vzs.

The multi-mass-point model may be, for example, a 3-mass-point model which includes one body mass point having a mass of the body 24 (or a mass of the combination of the body 24 and the arms) and two leg mass points each having a mass of the corresponding leg 2, 2. In this case, it is for example assumed that the position of the body mass point is defined on the basis of the position/posture of the body 24 and that the position of each leg mass point is defined on the basis of the foot position/posture of the corresponding leg 2. In the case of using such a 3-mass-point model, the vertical velocity of the body mass point can be calculated on the basis of the initial state of the foot position/posture and the initial overall center-of-gravity vertical velocity obtained as described above. Then, the initial body vertical velocity Vzs can be determined on the basis of the vertical velocity of the body mass point and the initial state of the body posture angle determined in S200.

It is noted that a multi-mass-point model having a greater number of mass points (e.g., a geometric model having a mass point at each link of the robot 1) may be used to determine the initial body vertical velocity Vzs more accurately. Further, in the case where the mass of the portion excluding the body 24 of the robot 1 is sufficiently small as compared with the mass of the body 24, for example the above-described initial overall center-of-gravity vertical velocity as it is may be determined to be the initial body vertical velocity Vzs, considering that the vertical velocity of the overall center of gravity of the robot 1 substantially agrees with the vertical velocity of the body 24.

On the other hand, the initial body vertical position Zs of the normal gait is determined using for example the body height determining technique previously proposed in Japanese Patent Application Laid-Open No. 10-86080 by the present applicant. At this time, the initial body vertical position Zs that prevents the knees of the legs 2, 2 from being fully stretched at the starting time is determined on the basis of the foot position/posture at the starting time (i.e. the supporting leg foot position/posture at the beginning of the first turning gait and the free leg foot position/posture at the beginning of the first turning gait determined in S100 in FIG. 11) and also on the basis of a prescribed geometric condition regarding the bending angles of the knees of the legs 2.

For example, when the knee bending angle of a supporting leg 2 and the knee bending angle of a free leg 2 are denoted by $\theta$sup and $\theta$swg, respectively, the initial body vertical position is determined such that the sum of the reciprocals of the sine function values of the knee bending angles $\theta$sup and $\theta$swg attains a prescribed value (a finite value). Here, the knee bending angles $\theta$sup and $\theta$swg each represent the angle of the axial center of the crus relative to the axial center of the thigh of the corresponding leg 2, which increases from "0" as the knee is bent from the fully stretched state of the leg 2. The technique for determining the vertical position of the body 24 is described in detail in Japanese Patent Application Laid-Open No. 10-86080 mentioned above, and thus, no further description will be provided here.

Supplementally, the robot 1 has six degrees of freedom per leg, so that once the initial states of the foot position/posture trajectory and the body position/posture trajectory (the positions/postures and the temporal change rates thereof) are provided, the initial states of the motions of the body 24 and the legs 2, 2 of the robot 1 will all be determined uniquely. This means that for example in the case where the overall mass of the body 24 and the legs 2, 2 substantially agrees with the overall mass of the robot 1, the initial overall center-of-gravity vertical velocity will be uniquely determined once the initial states of the motions of the body 24 and the legs 2, 2 are provided.

Conversely, with each leg having six degrees of freedom, even if one state related to the velocity (e.g., the initial body vertical velocity) among the initial states of the foot position/posture trajectory and the body position/posture trajectory is unknown, the unknown initial state will be uniquely determined once the initial overall center-of-gravity vertical velocity is provided.

After the processing in S206, the process proceeds to S208, where a gait as a candidate for the normal gait (a gait for one step (one cycle) of the normal gait) is generated provisionally. More specifically, on the basis of the normal gait parameters determined in S022 in FIG. 8, instantaneous values of a desired ZMP, a desired floor reaction force vertical component, a desired foot position/posture, a desired body posture, and a desired arm posture at each instant from the starting time to the ending time are sequentially obtained.

Then, the body position is sequentially determined, using the dynamic model (inverted pendulum model) shown in FIG. 7, to satisfy the obtained desired ZMP and the obtained desired floor reaction force vertical component, to thereby generate the gait from the starting time to the ending time of the normal gait. In this case, the initial body horizontal position/velocity (Xs, Vxs) and the initial body vertical position/velocity (Zs, Vzs), which have been described above, are set as the initial states of the position and the velocity of the body 24.

It is noted that this gait is generated only in the gait generation system 100; it is not output from the gait generation system 100 as a desired value for driving the actual robot 1.

Figure 16:
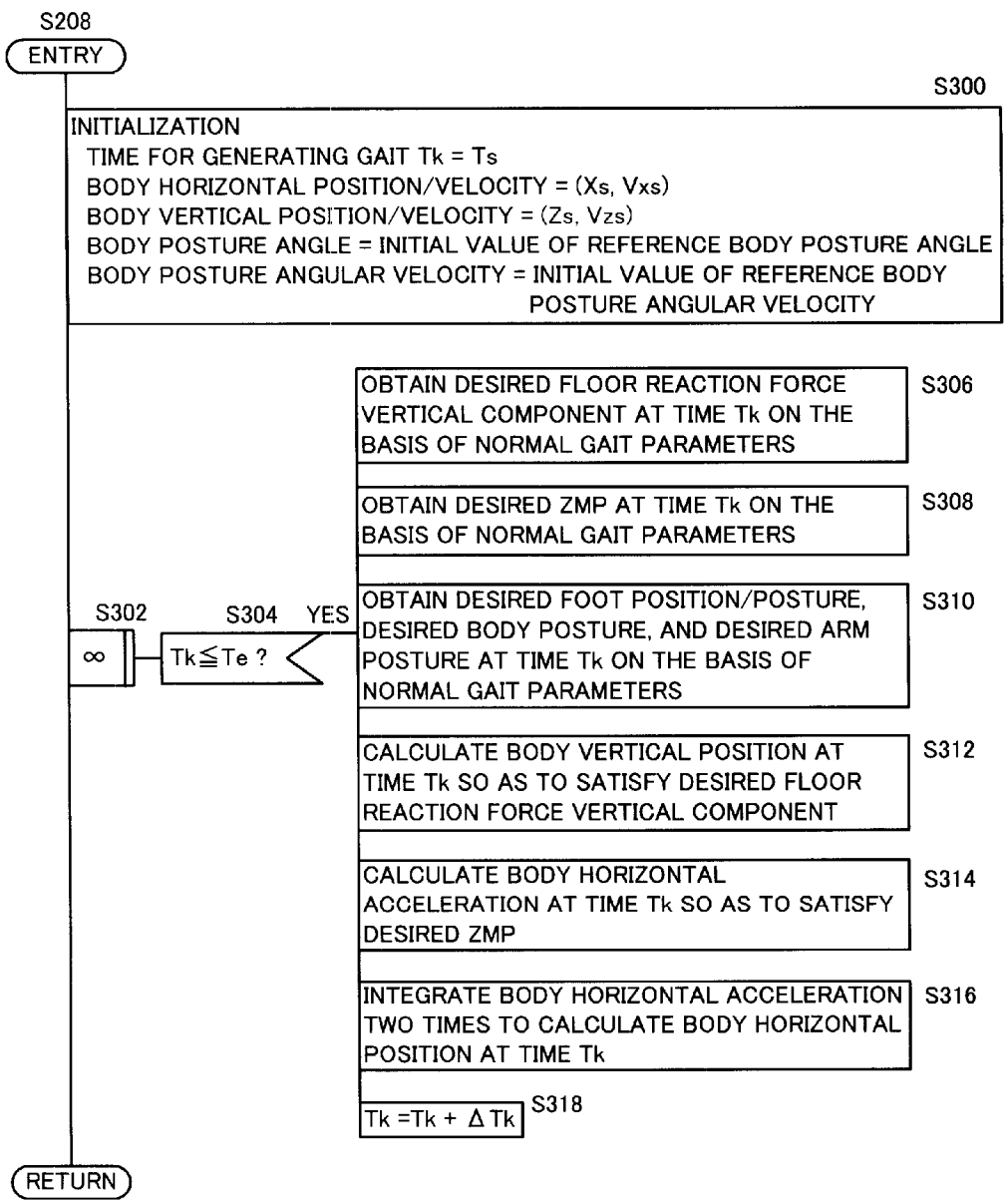
FIG. 16 is a flowchart showing the subroutine processing in S208 in FIG. 15.

More specifically, the processing in S208 is carried out as illustrated by a flowchart in FIG. 16.

The processing will now be described. Firstly, in S300, the gait generation system 100 performs various initializing operations. Specifically, time Tk for generating a gait is initialized to starting time Ts of a normal gait. Further, a latest candidate value for the initial body horizontal position/velocity (Xs, Vxs) (latest candidate value determined in S202, or in S216 or S218 which will be described later, in FIG. 15) is substituted into the body horizontal position/velocity, and a latest value of the initial body vertical position/velocity (Zs, Vzs) (latest value determined in S206 in FIG. 15) is substituted into the body vertical position/velocity. Further, an initial value of a reference body posture angle is substituted into the body posture angle, and an initial value of a reference body posture angular velocity is substituted into the body posture angular velocity.

The process then proceeds through S302 to S304, where the gait generation system 100 determines whether the time Tk (present value) for generating a gait is time before the ending time Te (=Ts+Tcyc) (i.e. whether Tk≤Te). If the determination result is affirmative, the gait generation system 100 carries out the processing in S306 to S316 (details of which will be described later) so as to determine the instantaneous values of a gait at time Tk.

The process then proceeds to S318, where the gait generation system 100 increases the time Tk for generating a gait by a prescribed notch time ΔTk, and then carries out the determination in S304 again. Here, the notch time ΔTk may be set to agree with the control cycle Δt, for example, although ΔTk may be set to be longer than Δt so as to reduce the amount of calculations.

Figure 15:
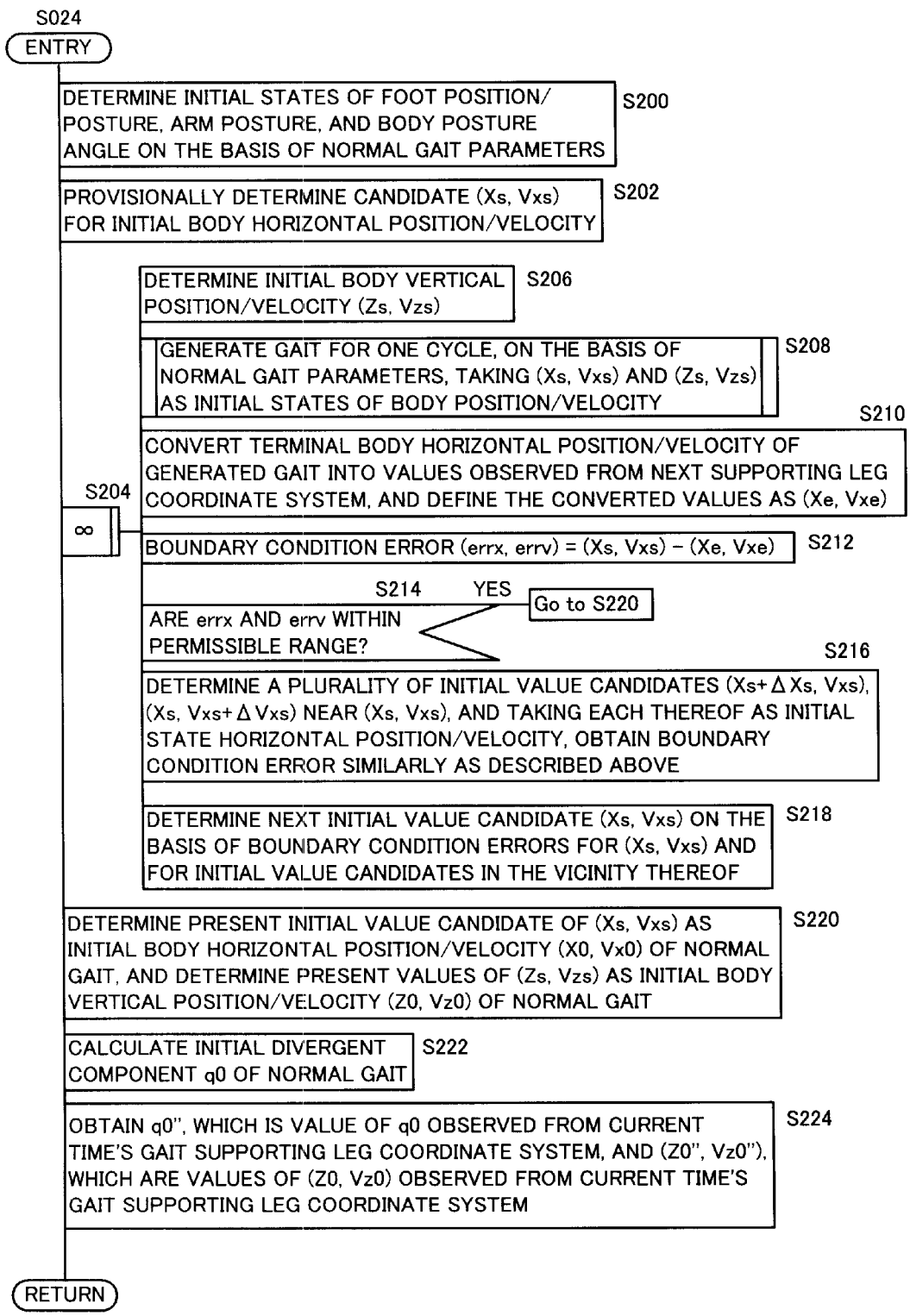
FIG. 15 is a flowchart showing the subroutine processing in S024 in FIG. 8.

If the determination result in S304 is affirmative, the processing from S306 to S318 is repeated. If the determination result in S304 is negative, the processing in FIG. 16, i.e. the processing in S208 in FIG. 15, is terminated. As a result, the generation of the normal gait (provisional normal gait) for one cycle from the starting time to the ending time of the normal gait is completed.

The gait generation system 100 carries out the processing of determining the instantaneous values of the provisional normal gait in the aforementioned S306 to S316 in the following manner. Firstly, in S306, the gait generation system 100 obtains an instantaneous value at time Tk of the desired floor reaction force vertical component trajectory as shown in FIG. 13, on the basis of the normal gait parameters (more specifically, the floor reaction force vertical component trajectory parameters).

Further, in S308, the gait generation system 100 obtains an instantaneous value at time Tk of the desired ZMP trajectory as shown in FIG. 14, on the basis of the normal gait parameters (more specifically, the ZMP trajectory parameters).

Subsequently, the process proceeds to S310, where the gait generation system 100 obtains instantaneous values at time Tk of the desired foot position/posture (specifically, desired foot positions/postures of both the supporting leg and the free leg), the desired body posture, and the desired arm posture, on the basis of the normal gait parameters (more specifically, the foot trajectory parameters, the body posture trajectory parameters, and the arm posture trajectory parameters). As to the desired arm posture, more specifically, the overall center-of-gravity positions of both arms are determined, while the motions of the arms (arm swinging motions) involving the changes in angular momentum about the vertical axis (or the trunk axis of the body 24) are not yet determined.

Subsequently, the process proceeds to S312, where the gait generation system 100 calculates the body vertical position at time Tk so as to satisfy the desired floor reaction force vertical component determined in S306 (or, to balance the sum of the inertial force in the vertical direction of the overall center of gravity of the robot 1 and the gravitational force with the desired floor reaction force vertical component).

Specifically, the dynamic relational expressions represented by the following expressions 15 and 16 (expressions obtained by discretizing Newton's equations of motion in the vertical direction) are used to calculate the overall center-of-gravity vertical velocity and the overall center-of-gravity vertical position of the robot 1.

Overall center-of-gravity vertical velocity at time $Tk$=Overall center-of-gravity vertical velocity at time $(Tk-\Delta Tk)$+((Floor reaction force vertical component at time $Tk$/Overall mass of the robot)+Gravitational acceleration)*$\Delta Tk$    Expression 15

(where the gravitational acceleration takes a negative value)

Overall center-of-gravity vertical position at time $Tk$=Overall center-of-gravity vertical position at time $(Tk-\Delta Tk)$+Overall center-of-gravity vertical velocity at time $Tk$*$\Delta Tk$    Expression 16

Then, in the present embodiment, the gait generation system 100 obtains the body vertical position by using, for example, the above-described 3-mass-point model (the 3-mass-point model described in conjunction with the processing in S206), on the basis of the overall center-of-gravity vertical position, the desired foot position/posture, and the reference body posture (desired body posture) at time Tk calculated as described above. In this case, the positions of the two leg mass points in the 3-mass-point model are determined on the basis of the desired foot position/posture.

Further, the vertical position of the body mass point at which the vertical position of the overall center of gravity in the 3-mass-point model agrees with the overall center-of-gravity vertical position at time Tk obtained as described above is determined. Then, the body vertical position is determined on the basis of the vertical position of the body mass point and the desired body posture (reference body posture).

A multi-mass-point model having a greater number of mass points (e.g., a model having a mass point at each link of the robot 1) may be used to obtain the body vertical position more accurately. In the case where the mass of the portion excluding the body 24 is sufficiently small as compared with the mass of the body 24, the overall center-of-gravity vertical position may be simply considered to agree with the vertical position of the center of gravity of the body 24, and the body vertical position may be determined on the basis of the overall center-of-gravity vertical position and the desired body posture (reference body posture).

The process then proceeds to S314, where the gait generation system 100 determines the body horizontal acceleration (acceleration of the body 24 in the horizontal direction) at time Tk so as to satisfy the desired ZMP (or, to satisfy the dynamic balance condition that the horizontal component of the moment generated about the desired ZMP by the resultant force of the inertial force of the robot 1 and the gravitational force is "0").

At this point, the instantaneous values (values at the present time Tk) of the foot position/posture, the arm posture, the body posture, and the body vertical position of the normal gait (provisional normal gait) have been determined. Thus, when the remaining body horizontal position is determined, the desired motion of the entire robot 1 will be determined, except for the motional degree of freedom of each arm that causes the angular momentum about the vertical axis to change. Accordingly, once the body horizontal position is determined, all floor reaction forces except for the moment of the floor reaction force about the vertical axis will be determined uniquely.

It is noted that, in the present embodiment, the desired floor reaction force vertical component and the desired ZMP of the normal gait (provisional normal gait) are defined by the floor reaction force vertical component trajectory parameters and the desired ZMP trajectory parameters, respectively, of the normal gait parameters determined in S022 in FIG. 8. This means that the floor reaction force determined dependent on the determination of the body horizontal position will be only the floor reaction force horizontal component.

Supplementally, in the robot 1 according to the present embodiment, each leg 2 has six degrees of freedom, and thus, once the desired foot position/posture and the desired body position/posture are determined, the position/posture of each portion of each leg 2 will be determined uniquely. The motional degree of freedom of each arm causing a change in angular momentum about the vertical axis is used to cancel a spinning force, as will be described later.

In S314, the body horizontal acceleration is obtained by using the above-described expression 04 related to the dynamic model (the inverted pendulum model) in FIG. 7, for example. More specifically, the vertical position and the horizontal position of the body mass point 24b at the present time Tk are determined from the body vertical position at the present time Tk, the body horizontal position at time $(Tk-\Delta Tk)$, and the desired body posture at the present time Tk. Alternatively, the body horizontal position at time Tk may be estimated in an interpolating manner on the basis of either the time series of the body horizontal position up to time $(Tk-\Delta Tk)$ or the gait state at time $(Tk-\Delta Tk)$, and the estimated body horizontal position may be used in place of the body horizontal position at time $(Tk-\Delta Tk)$.

Further, a value obtained by subtracting the gravitational force (=$mb*g$) acting on the body mass point 24b from the floor reaction force vertical component at the present time Tk is divided by the mass mb of the body mass point 24b to thereby obtain the vertical acceleration of the body mass point 24b at the present time Tk.

Then, the vertical position, the horizontal position, and the vertical acceleration of the body mass point 24b, which have been obtained as described above, are substituted into Zb, Xb, and d2Zb/dt2, respectively, of the above expression 04, the horizontal position and the vertical position of the desired ZMP at the present time Tk are substituted into Xzmp and Zzmp, respectively, of the expression 04, and Mzmp_y of the expression 04 is set to "0". The resultant expression is then solved on d2Xb/dt2, to calculate the body mass point horizontal acceleration d2Xb/dt2 at the present time Tk. This body mass point horizontal acceleration d2Xb/dt2 is obtained as the body horizontal acceleration at the present time Tk.

Alternatively, a more precise dynamic model may be used to determine, in an exploratory manner, the body horizontal acceleration that causes the horizontal component of the floor reaction force moment about the desired ZMP to attain "0".

The process then proceeds to S316, where the gait generation system 100 integrates two times the body horizontal acceleration obtained in S314, to calculate the body horizontal position at the present time Tk. More specifically, a value obtained by multiplying the body horizontal acceleration by the notch time ΔTk is added to the body horizontal velocity at time Tk−ΔTk, so as to obtain the body horizontal velocity at the present time Tk. Further, a value obtained by multiplying the body horizontal velocity by the notch time ΔTk is added to the body horizontal position at time Tk−ΔTk, so that the body horizontal position at the present time Tk is obtained.

The above is the details of the gait generating processing carried out in S306 to S316.

Figure 12:
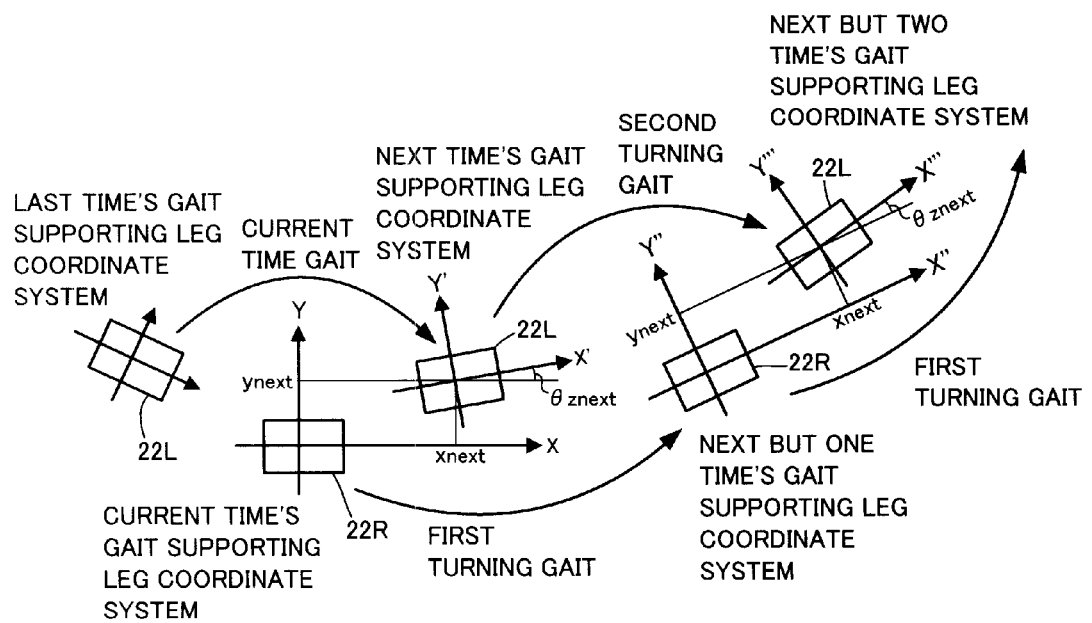
FIG. 12 is a diagram showing, by way of example, the movement of the feet of the robot shown in FIG. 1 and supporting leg coordinate systems.

After completion of the processing in S208 in FIG. 15, the process proceeds to S210, where the gait generation system 100 converts the terminal body horizontal position and velocity of the generated gait (provisional normal gait) into values observed from the supporting leg coordinate system corresponding to the supporting leg at that instant (the supporting leg coordinate system having the X''' axis and the Y''' axis in FIG. 12 as the two axes in the horizontal direction), and defines the resultant values as (Xe, Vxe) (Xe: terminal body horizontal position; Vxe: terminal body horizontal velocity).

The process then proceeds to S212, where the gait generation system 100 calculates a difference between the initial body horizontal position/velocity (Xs, Vxs) and the terminal body horizontal position/velocity (Xe, Vxe), as shown in the figure. This difference (Xs−Xe, Vxs−Vxe) is called the body horizontal position/velocity boundary condition error (errx, errv). The normal gait is a gait that satisfies the above-described boundary condition. Therefore, (Xs, Vxs) and (Xe, Vxe) need to agree with each other and, hence, the body horizontal position/velocity boundary condition error (errx, errv) needs to be zero or substantially zero. In the present embodiment, (Xs, Vxs) that causes the body horizontal position/velocity boundary condition error (errx, errv) to be substantially zero is obtained in an exploratory manner, as will be described below.

The process then proceeds to S214, where the gait generation system 100 determines whether the body horizontal position/velocity boundary condition error (errx, errv) falls within a permissible range that has been set in advance as appropriate (i.e. whether both of errx and errv fall within the permissible range).

If the determination result in S214 is negative, the process proceeds to S216. In S216, a plurality of (two in the present embodiment) initial value candidates (Xs+ΔXs, Vxs) and (Xs, Vxs+ΔVxs) are determined in the vicinity of (Xs, Vxs). Here, ΔXs and ΔVxs represent prescribed minute change amounts relative to Xs and Vxs, respectively. Then, by taking the respective ones of these initial value candidates as the initial states of the body horizontal position/velocity, normal gaits (provisional normal gaits) are generated, using the gait parameters, by the processing similar to that in S208 described above.

Further, the terminal body positions/velocities of the generated normal gaits are converted into values (Xe+ΔXe1, Vxe+ΔVxe1) and (Xe+ΔXe2, Vxe+ΔVxe2) observed from the supporting leg coordinate system corresponding to the supporting leg at that instant (the supporting leg coordinate system having the X'''' axis and the Y'''' axis in FIG. 12 as the two axes in the horizontal direction). Here, (Xe+ΔXe1, Vxe+ΔVxe1) represents the terminal body position/velocity corresponding to (Xs+ΔXs, Vxs), and (Xe+ΔXe2, Vxe+ΔVxe2) represents the terminal body position/velocity corresponding to (Xs, Vxs+ΔVxs). In the processing for generating the normal gaits (provisional normal gaits) in this case, the initial states of the state quantities except for the body horizontal position/velocity may be set to be the same as those in the case where the initial value candidate for the body horizontal position/velocity is (Xs, Vxs), for example.

Further in S216, a difference between each initial value candidate and the terminal body position/velocity corresponding thereto, that is, the body horizontal position/velocity boundary condition errors corresponding to the respective initial value candidates (Xs+ΔXs, Vxs) and (Xs, Vxs+ΔVxs) are obtained by the processing similar to that in S212 described above.

The process then proceeds to S218, where the gait generation system 100 determines a next initial value candidate for (Xs, Vxs), by an exploratory method, on the basis of the body horizontal position/velocity boundary condition errors relative to the respective ones of the initial value candidate (Xs, Vxs) and the initial value candidates (Xs+ΔXs, Vxs) and (Xs, Vxs+ΔVxs) in the vicinity thereof. As the exploratory method, a method in which a pseudo-Jacobian (sensitivity matrix) is obtained and a next candidate is determined by a steepest descent method or the like, or a simplex method may be used.

For example, a sensitivity matrix is obtained which indicates the degree of change of the body horizontal position/velocity boundary condition error observed when the body horizontal position and the body horizontal velocity are changed from their initial value candidate (Xs, Vxs) by minute amounts on the basis of the body horizontal position/velocity boundary condition errors relative to (Xs, Vxs) and to the initial value candidates (Xs+ΔXs, Vxs) and (Xs, Vxs+ΔVxs) in the vicinity thereof. Then, the obtained sensitive matrix is used to newly determine an initial value candidate (Xs, Vxs) that can further reduce the body horizontal position/velocity boundary condition error. After the new initial value candidate (Xs, Vxs) for the body horizontal position/velocity is determined in this manner, the process returns to S206.

The gait generation system 100 repeats the processing in S206 to S218 as long as the determination result in S214 is negative. When the determination result in S214 turns to be affirmative, the process leaves the repetition loop (S204) to proceed to S220. In this case, the provisional normal gait generated immediately before the process leaves the repetition loop of S204 will be obtained as the normal gait that satisfies the boundary condition.

In S220, the initial value candidate (Xs, Vxs) for the initial body horizontal position/velocity and the initial body vertical position/velocity (Zs, Vzs) in the provisional normal gait that have been ultimately generated in S208 in the repetition loop of S204 are determined to be the initial body horizontal position/velocity (X0, Vx0) and the initial body vertical position/velocity (Z0, Vz0), respectively, of the normal gait to be obtained.

The process then proceeds to S222, where the gait generation system 100 calculates a normal gait initial divergent component (a value of the divergent component at the starting time Ts of the normal gait) q0.

In the present embodiment, the value of the divergent component of a gait is defined as will be described below. In S222, the normal gait initial divergent component q0 is calculated in accordance with this definition.

Firstly, when the above expression 03 indicating the relationship between the motion of the body mass point 24b in the inverted pendulum model in FIG. 7 and the floor reaction force moment (the floor reaction force moment about the origin of the supporting leg coordinate system) is expressed by a state equation, the following expression 100 is derived. It is here assumed that the variation of the height (the vertical position) of the body 24 while the robot 1 is traveling relative to its average height (i.e. divergence of the height of the body 24) is sufficiently small, so that Zb in the second term on the right side of the expression 03 agrees with a fixed value h, which has been set in advance as the average height of the body mass point 24b. Here, the floor reaction force moment Mb_y in the above expression 03 is denoted by Min, as the input moment to the inverted pendulum.

$$\frac{d}{dt}XVb = \begin{bmatrix} 0 & 1 \\ \frac{(g + d2Zb/dt2)}{h} & 0 \end{bmatrix} * XVb + \begin{bmatrix} 0 \\ \frac{1}{h*mb} \end{bmatrix} * \text{Min}$$

Expression 100 where $XVb \equiv \begin{bmatrix} Xb \\ Vxb \end{bmatrix}$, $Vxb \equiv dXb/dt$

Rewriting the expression 100 to an expression based on a discrete time system provides the following state equation 102:

$$XVb(k+1) = A(k)*XVb(k) + B(k)*\text{Min}(k)$$

Expression 102

The variables followed by suffixes (k) and (k+1) mean the value at the k-th time and the value at the k+1-th time, respectively, in the discrete time system. In the following description, the k-th time and the k+1-th time may be denoted simply by "time k" and "time k+1", respectively, in some cases.

As defined in the note to the expression 100 above, XVb in the expression 102 denotes a state variable vector (column vector) taking the horizontal position Xb of the body mass point 24b and the horizontal velocity Vxb, which is the temporal change rate thereof, as the state variables.

Further, A(k) and B(k) in the expression 102 denote a square matrix (state transition matrix) of order 2 and a column vector of order 2, respectively, and the component values thereof are determined as indicated by the following expressions 104a to 104c and 106a to 106c. It is noted that ΔT represents a notch time in the discrete time system, and ω0 represents the angular frequency value defined by the expression 108 in the following note. Further, exp( ) represents an exponential function of the base of a natural logarithm.

If $g + d2Zb/dt2 > 0$:

Expression 104a $$A(k) = \begin{bmatrix} \frac{\exp(\omega 0 * \Delta T) + \exp(-\omega 0 * \Delta T)}{2} & \frac{\exp(\omega 0 * \Delta T) - \exp(-\omega 0 * \Delta T)}{2*\omega 0} \\ \frac{\exp(\omega 0 * \Delta T) - \exp(-\omega 0 * \Delta T)}{2}*\omega 0 & \frac{\exp(\omega 0 * \Delta T) + \exp(-\omega 0 * \Delta T)}{2} \end{bmatrix}$$

Expression 106a $$B(k) = \begin{bmatrix} -1 + \frac{\exp(\omega 0 * \Delta T) + \exp(-\omega 0 * \Delta T)}{2} \\ \frac{\exp(\omega 0 * \Delta T) - \exp(-\omega 0 * \Delta T)}{2}*\omega 0 \end{bmatrix} * \frac{1}{\omega 0^2} * \frac{1}{h*mb}$$

If $g + d2Zb/dt2 = 0$:

Expression 104b $$A(k) = \begin{bmatrix} 1 & \Delta T \\ 0 & 1 \end{bmatrix}$$

Expression 106b $$B(k) = \begin{bmatrix} \frac{(\Delta T)^2}{2} \\ \Delta T \end{bmatrix} * \frac{1}{h*mb}$$

If $g + d2Zb/dt2 < 0$:

Expression 104c $$A(k) = \begin{bmatrix} \cos(\omega 0 * \Delta T) & \frac{\sin(\omega 0 * \Delta T)}{\omega 0} \\ -\omega 0 * \sin(\omega 0 * \Delta T) & \cos(\omega 0 * \Delta T) \end{bmatrix}$$

Expression 106c $$B(k) = \begin{bmatrix} -1 + \cos(\omega 0 * \Delta T) \\ -\omega 0 * \sin(\omega 0 * \Delta T) \end{bmatrix} * \frac{1}{\omega 0^2} * \frac{1}{h*mb}$$

Expression 108 where $\omega 0 \equiv \sqrt{\left|\frac{g + d2Zb/dt2}{h}\right|}$

In this case, as is obvious from the above expressions 104a to 104c, 106a to 106c, and 108, the component values of A(k) and B(k) are determined dependent on the value of the vertical acceleration d2Zb/dt2 (the motional acceleration d2Zb/dt2 in the vertical direction) of the body mass point 24b. Accordingly, the component values of A(k) and B(k) will be the values dependent on the inertial force in the vertical direction of the body mass point 24b (=−mb*d2Zb/dt2), i.e., the function values of the inertial force.

The gravitational force acting on the body mass point 24a has a fixed value. Thus, stated differently, the component values of A(k) and B(k) are the function values of the resultant force of the inertial force in the vertical direction of the body mass point 24b and the gravitational force acting on the body mass point 24b, or the function values of a floor reaction force vertical component that balances with that resultant force.

Supplementally, in the case where the mass mb of the body mass point 24b of the inverted pendulum agrees with the overall mass of the robot 1 as in the present embodiment, the floor reaction force vertical component that balances with the resultant force of the inertial force in the vertical direction of the body mass point 24b and the gravitational force acting on the body mass point 24b agrees with the floor reaction force vertical component (the translational floor reaction force vertical component of the total floor reaction force) acting on the robot 1.

In a system expressed by the state equation of the above expression 102, when the initial value XVb(0) of the state variable vector XVb (value of XVb at the time when k=0 (time 0)) and the time series of the input moment Min (horizontal component Mb_y of the floor reaction force moment) from time 0 to time k−1 are provided, then the value XVb(k) of the state variable vector XVb at an arbitrary time k (>0) will be provided by the following expression 110:

$$XVb(k) = \phi(k, 0) * XVb(0) + \sum_{i=0}^{k-1} \phi(k, i+1) * B(i) * \text{Min}(i) \quad \text{Expression 110}$$

where $$\phi(k, j) \equiv A(k-1) * A(k-2) * \ldots * A(j)$$

$$(j = 0, 1, \ldots, k)$$

As to $\phi(k,j)$ defined by the note to the expression 110, if j=k, then $\phi(k,j)$=Identity matrix.

Attention will now be paid to the behavior of the inverted pendulum model in the normal gait described above. It is here assumed that the starting time Ts of the normal gait is the time when k=0, that the ending time Te (=Ts+Tcyc) of the normal gait is the time when k=kcyc (where kcyc≡Tcyc/ΔT), and that the state variable vector XVb defined by the motion of the normal gait at the starting time Ts is XVb(0). Further, of the state variable vector XVb at the ending time Te (when k=kcyc) of the normal gait, the component dependent on the state variable vector value XVb(0) at the starting time Ts of the normal gait is denoted by XVb(kcyc). At this time, the relationship between XVb(kcyc) and XVb(0) will be expressed by the following expression 112 on the basis of the above expression 110.

$$XVb(kcyc) = \phi(kcyc, 0) * XVb(0) \quad \text{Expression 112}$$

where $\phi(kcyc, \mathbf{0}) = A(kcyc-1) * \ldots * A(1) * A(0)$

Further, the two eigenvalues of the matrix $\phi(kcyc, \mathbf{0})$ on the right side of the expression 112 are denoted by λ1 and λ2, the eigenvectors (column vectors) corresponding to the respective eigenvalues are denoted by $(a\mathbf{11}, a\mathbf{21})^T$ and $(a\mathbf{12}, a\mathbf{22})^T$, and the square matrix of order 2 having these eigenvectors as the first column and the second column is denoted by Γcyc. A matrix obtained by diagonalizing $\phi(kcyc, \mathbf{0})$ by using the matrix Γcyc is denoted by Λ. That is, Λ is defined by the following expression 114. Hereinafter, the matrix Γcyc will be referred to as the diagonalizing matrix.

$$\Lambda \equiv \Gamma_{cyc}^{-1} * \phi(k_{cyc}, 0) * \Gamma_{cyc} \quad \text{Expression 114}$$

where $\Lambda \equiv \begin{bmatrix} \lambda 1 & 0 \\ 0 & \lambda 2 \end{bmatrix}$ $\Gamma_{cyc} \equiv \begin{bmatrix} a11 & a12 \\ a21 & a22 \end{bmatrix}$ $\phi(k_{cyc}, 0) * \begin{bmatrix} a11 \\ a21 \end{bmatrix} = \lambda 1 * \begin{bmatrix} a11 \\ a21 \end{bmatrix}$ $\phi(k_{cyc}, 0) * \begin{bmatrix} a12 \\ a22 \end{bmatrix} = \lambda 2 * \begin{bmatrix} a12 \\ a22 \end{bmatrix}$ The following expression 116 is derived from the expression 114 and the above expression 112.

$$\Gamma_{cyc}^{-1} * XVb(kcyc) = \Lambda * \Gamma_{cyc}^{-1} * XVb(0) \quad \text{Expression 116}$$

It is noted that the matrix $\phi(kcyc, \mathbf{0})$ to be diagonalized by the diagonalizing matrix Γcyc is the product of the state transition matrices A(0), A(1), . . . , A(kcyc−1) at each time (more specifically, at each time for every notch time ΔT from time 0 to time kcyc−1) within the period from the starting time (time 0) to the ending time (time kcyc) of one cycle of a normal gait, as indicated by the note to the above expression 112. Thus, the matrix $\phi(kcyc, \mathbf{0})$ is determined dependent on the time series of the inertial force of the body mass point 24b in the period of one cycle of the normal gait. Consequently, each component value of the diagonalizing matrix Γcyc is also determined dependent on the time series of the inertial force of the body mass point 24b in the period of one cycle of the normal gait.

Here, a vector obtained by linearly converting a state variable vector XVb(k) at an arbitrary time k by an inverse matrix $\Gamma cyc^{-1}$ of the diagonalizing matrix Γcyc (hereinafter, this vector will be referred to as the "converted state variable vector") is denoted by $(p(k), q(k))^T$. That is, the converted state variable vector $(p(k), q(k))^T$ is defined by the following expression 118:

$$(p(k), q(k))^T = \Gamma cyc^{-1} * XVb(k) \quad \text{Expression 118}$$

The following expression 120 is derived from the expression 118 and the above expression 116.

$$(p(kcyc), q(kcyc))^T = \Lambda * (p(0), q(0))^T \quad \text{Expression 120}$$

In this expression 120, if λ1>1, then the absolute value of p(kcyc)>the absolute value of the initial value p(0), whereas if λ1≤1, then the absolute value of p(kcyc)≤the absolute value of the initial value p(0). Similarly, if λ2>1, then the absolute value of q(kcyc)>the absolute value of the initial value q(0), whereas if λ2≤1, then the absolute value of q(kcyc)≤the absolute value of the initial value q(0).

On the other hand, the value of g+d2Zb/dt2 in a normal gait would not be constantly held in the state where g+d2Zb/dt2≤0. Rather, it may be considered that the state where g+d2Zb/dt2≤0 and the state where g+d2Zb/dt2>0 take place alternately. In such a normal gait, generally, one of the two eigenvalues λ1 and λ2 of $\phi(kcyc, \mathbf{0})$ takes a value that is greater than "1", while the other takes a value that is smaller than "1".

Therefore, hereinafter, it is assumed that λ1<1 and λ2>1. That is, of the converted state variable vector $(p(k), q(k))^T$, the first component p(k) is assumed to be the component corresponding to the eigenvalue λ1 that is smaller than "1", and the second component q(k) is assumed to be the component corresponding to the eigenvalue λ2 that is greater than "1". At this time, p(k) has a meaning as the state quantity of a motion component having convergent property in a normal gait repeated infinitely, while q(k) has a meaning as the state quantity of a motion component having divergent property in the normal gait repeated infinitely.

Accordingly, in the present embodiment, the second component q(k) of the converted state variable vector $(p(k), q(k))^T$ defined by the expression 118 is defined as the divergent component described above. The divergent component q(k) thus defined takes a value resulting from linear combination of the state variables Xb(k) and Vxb(k). In this case, in the linear combination, the weighting coefficients by which Xb(k) and Vxb(k) are multiplied are determined dependent on the time series of the inertial force of the body mass point 24b in the period of one cycle of the normal gait. It is noted that the first component p(k) of the converted state variable vector $(p(k), q(k))^T$ defined by the expression 118 is called the convergent component.

More specifically, the convergent component p(k) and the divergent component q(k) defined by the above expression 118 are the convergent component p(k) and the divergent component q(k) on a sagittal plane (the convergent component and the divergent component corresponding to the state variable vector XVb having, as its components, the horizontal position Xb and the horizontal velocity Vxb of the body mass point 24b in the X-axis direction). The convergent component and the divergent component on a lateral plane are defined in a similar manner. Specifically, the convergent component and the divergent component on the lateral plane are defined by an expression in which the components Xb and Vxb of the state variable vector XVb(k) on the right side of the expression 118 have been replaced with the horizontal position and the horizontal velocity, respectively, of the body mass point 24b in the Y-axis direction. In this case, the matrix $\Gamma cyc^{-1}$ in the expression 118 remains the same in both axial directions of the X-axis direction and the Y-axis direction.

In accordance with the above-described definition of the divergent component q, in S222, the normal gait initial divergent component q0 is calculated in the following manner.

The gait generation system 100 calculates an instantaneous value of the inertial force of the body mass point 24b at each time Tk for every notch time ΔT in the period of one cycle from the starting time Ts to the ending time Te of the normal gait (i.e. at each time k from the time when k=0 to the time when k=kcyc−1 in terms of the discrete time system) on the basis of the normal gait parameters. In this case, when the mass mb of the body mass point 24b of the inverted pendulum agrees with the overall mass of the robot 1, then the resultant force of the inertial force in the vertical direction of the body mass point 24b and the gravitational force acting on the body mass point 24b in the normal gait balances with a floor reaction force vertical component in the normal gait.

Thus, in the present embodiment, the gait generation system 100 calculates the instantaneous value of the floor reaction force vertical component at each time in the period of one cycle of the normal gait on the basis of the above-described floor reaction force vertical component trajectory parameters among the normal gait parameters. The instantaneous value is the same as the value calculated in S306 in FIG. 16. Then, the gait generation system 100 uses a value obtained by dividing each of the calculated instantaneous values of the floor reaction force vertical component by the mass mb of the body mass point 24b (=the overall mass of the robot 1) as the value of (g+d2Zb/dt2) in the above expression 100, to thereby calculate the state transition matrix A(k) (k=0, 1, . . . , kcyc−1) in accordance with the above expressions 104a to 104c.

Supplementally, as an alternative, a multi-mass-point model (geometric model), such as the 3-mass-point model described above, may be used to calculate the inertial force in the vertical direction (or the vertical acceleration) of the body 24 of the robot 1 in the normal gait, and the calculated inertial force (or vertical acceleration) may be used as the inertial force (or the vertical acceleration) of the body mass point 24b to thereby calculate the state transition matrix A(k) (k=0, 1, . . . , kcyc−1) at each time.

For example, the instantaneous value of the inertial force of the body mass point 24b in a normal gait may be calculated using the above-described 3-mass-point model in the following manner. Instantaneous values of the inertial force in the vertical direction of the two leg mass points in the 3-mass-point model are calculated on the basis of the foot trajectory parameters of the normal gait, and an instantaneous value of the inertial force in the vertical direction of the overall center of gravity of the robot 1 is calculated on the basis of the floor reaction force vertical component trajectory parameters.

Then, the instantaneous values of the inertial force in the vertical direction of the two leg mass points are subtracted from the instantaneous value of the inertial force in the vertical direction of the overall center of gravity, and the resultant value is determined to be the instantaneous value of the inertial force in the vertical direction of the body mass point 24b.

After calculating kcyc pieces of A(k) (k=0, 1, . . . , kcyc−1) in the period of one cycle from the starting time Ts to the ending time Te of the normal gait as described above, the gait generation system 100 multiplies the values of A(k) to thereby calculate the matrix φ(kcyc,0) (=A(kcyc−1)* . . . *A(1)*A(0)) on the right side of the expression 112.

Further, the gait generation system 100 calculates the eigenvalues λ1 and λ2 of the matrix φ(kcyc,0) and the eigenvectors (a11, a21)$^T$ and (a12, a22)$^T$ corresponding thereto, and determines, from these eigenvectors, the above-described diagonalizing matrix Γcyc in accordance with the note to the above expression 114. Then, the gait generation system 100 calculates the inverse matrix $\Gamma cyc^{-1}$ of the diagonalizing matrix Γcyc.

Further, the gait generation system 100 determines the initial body mass point position/velocity, which is a set of the horizontal position and the horizontal velocity of the body mass point 24b of the inverted pendulum at the starting time Ts of the normal gait, on the basis of the initial body horizontal position/velocity (X0, Vx0) of the normal gait determined in S220 and the initial state of the body posture angle of the normal gait.

Then, the gait generation system 100 calculates the normal gait initial divergent component q0, according to the above expression 118, on the basis of the inverse matrix $\Gamma cyc^{-1}$ obtained as described above and the initial body mass point horizontal position/velocity. More specifically, a component in the X-axis direction (state quantity vector in the X-axis direction) and a component in the Y-axis direction (state quantity vector in the Y-axis direction) of the initial body mass point horizontal position/velocity are respectively multiplied by $\Gamma cyc^{-1}$ to thereby calculate the initial divergent component q0 in each of the X-axis direction and the Y-axis direction.

While the divergent component q(k) has been defined by the above expression 118 in the present embodiment, the divergent component q(k) may simply be defined by the horizontal position Xb and the horizontal velocity Vxb of the body mass point 24b by using the following expression 122:

$$q(k)=Xb(k)+Vxb(k)/\omega a \qquad \text{Expression 122}$$

In the expression 122, ωa is a prescribed value determined in advance (for example, a value of ω0 obtained by setting d2Zb/dt2 on the right side of the above expression 108 to "0", or a value close thereto).

Following the calculation of the initial divergent component q0 of the normal gait as described above, the process proceeds to S224, where the gait generation system 100 converts the initial divergent component q0 of the normal gait into a value observed from a current time's gait supporting leg coordinate system, to determine the resultant value as q0". Further, the gait generation system 100 converts the initial body vertical position/velocity (Z0, Vz0) into a value observed from the current time's gait supporting leg coordinate system, to determine the resultant value as (Z0", Vz0").

Supplementally, (Z0", Vz0") agrees with the body vertical position/velocity at the end of a second turning gait observed from a supporting leg coordinate system of the second turning gait (the supporting leg coordinate system having the X" axis and the Y" axis in FIG. 12 as the two axes on the horizontal plane). Further, q0" also agrees with the divergent component at the end of the second turning gait observed from the supporting leg coordinate system of the second turning gait. Accordingly, (Z0", Vz0") and q0" may be calculated by using these properties.

This completes the processing in S024 in FIG. 8, or, the subroutine processing for determining the initial state of the normal gait.

Figure 17:
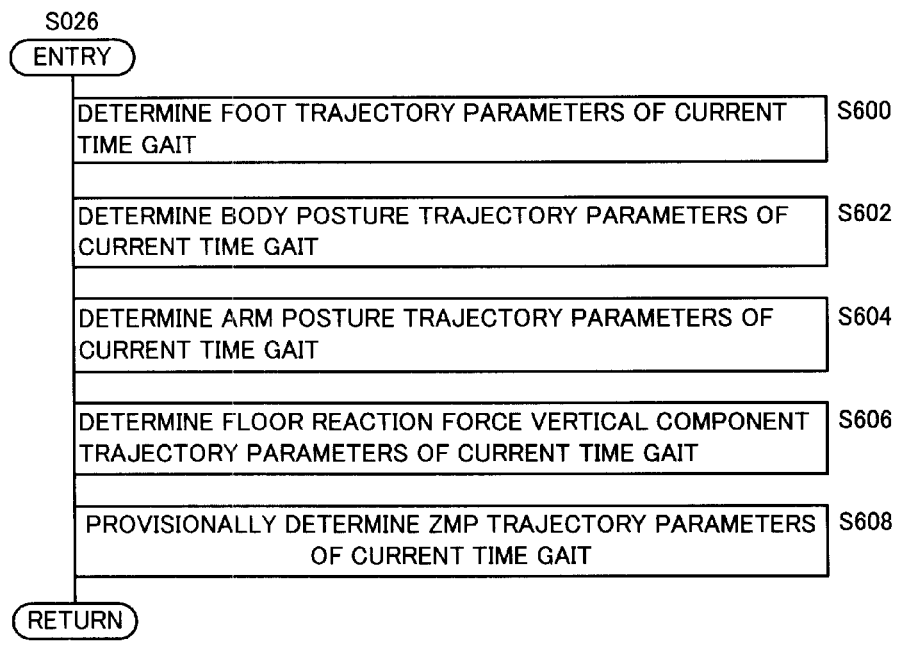
FIG. 17 is a flowchart showing the subroutine processing in S026 in FIG. 8.

Subsequently, the process proceeds to S026 in FIG. 8, where the gait generation system 100 determines gait parameters (some being provisionally determined) of a current time gait. More specifically, in S026, the processing illustrated by a flowchart in FIG. 17 is carried out.

Firstly, in S600, the gait generation system 100 determines foot trajectory parameters of the current time gait such that the foot position/posture trajectory of the current time gait connects to the foot position/posture trajectory of the normal gait.

Specifically, the free leg foot position/posture at the beginning of the current time gait is set to the supporting leg foot position/posture at the end of the last time's gait observed from the current time's gait supporting leg coordinate system (the present free leg foot position/posture).

The supporting leg foot position/posture at the beginning of the current time gait is set to the free leg foot position/posture at the end of the last time's gait observed from the current time's gait supporting leg coordinate system (the present supporting leg foot position/posture).

Further, the free leg foot position/posture at the end of the current time gait is determined in such a manner that the position/posture of the free leg foot 22 of the current time gait when it is turned by a prescribed angle in the pitch direction (in the direction in which the tiptoe of the foot 22 is lowered), without slippage, from the free leg foot position/posture at the end of the current time gait agrees with the above-described landing-time foot reference position/posture corresponding to the next time's gait supporting leg coordinate system.

The supporting leg foot position/posture at the end of the current time gait is set to be a position/posture of the supporting leg foot 22 of the current time gait in the state where it is turned by a prescribed angle in the pitch direction (in the direction in which the heel of the foot 22 is raised), without slippage, from the landing-time foot reference position/posture corresponding to the current time's gait supporting leg coordinate system.

Subsequently, the process proceeds to S602, where the gait generation system 100 determines body posture trajectory parameters of the current time gait. The body posture trajectory parameters are determined such that the body posture trajectory defined thereby continuously connects to the body posture trajectory of the normal gait (such that the body posture angle and the angular velocity at the end of the current time gait agree with the body posture angle and the angular velocity, respectively, at the beginning of the normal gait). In this case, in the present embodiment, the body posture defined by the body posture trajectory parameters of the current time gait is set to the above-described reference body posture, which is a steadily constant posture (in which the trunk axis of the body 24 is in the vertical direction), as with the body posture of the normal gait.

It is noted that the body posture trajectory of the current time gait may be set to change over time from the beginning to the end of the current time gait, as long as it is set to continuously connect to the body posture trajectory of the normal gait.

The process then proceeds to S604, where the gait generation system 100 determines arm posture trajectory parameters of the current time gait. The arm posture trajectory parameters are determined, in the same manner as the arm posture trajectory parameters of the normal gait, such that the arm posture trajectory of the current time gait continuously connects to the arm posture trajectory of the normal gait.

It is noted that the arm posture trajectory parameters of the current time gait determined here, as in the case of the arm posture trajectory parameters of the normal gait, are parameters (e.g., parameters defining the relative height of the distal end of an arm and the relative center-of-gravity position of the entire arm with respect to the body 24) other than those related to the changes in angular momentum of both arms about the vertical axis (or the trunk axis of the body 24).

The process then proceeds to S606, where the gait generation system 100 determines floor reaction force vertical component trajectory parameters of the current time gait such that the floor reaction force vertical component trajectory defined thereby has the above-described pattern as shown in FIG. 5. The floor reaction force vertical component trajectory parameters of the current time gait are determined such that both of the overall center-of-gravity vertical position/velocity of the robot 1 and the floor reaction force vertical component trajectory of the current time gait uninterruptedly continue to those of the normal gait.

Specifically, firstly, the initial overall center-of-gravity vertical position/velocity of the normal gait observed from the current time's gait supporting leg coordinate system is obtained, primarily on the basis of the value (Z0", Vz0") obtained by converting the initial body vertical position/velocity of the normal gait lastly obtained in the processing in S024 in FIG. 8 (the processing for determining the initial state of the normal gait) into the value observed from the current time's gait supporting leg coordinate system, i.e. (Z0", Vz0") determined in S224 in FIG. 15.

For example, the above-described 3-mass-point model (the 3-mass-point model described in conjunction with the processing in S206) is used to obtain the initial overall center-of-gravity vertical position/velocity of the normal gait. In this case, the positions and velocities of the two leg mass points in the 3-mass-point model are obtained on the basis of the desired foot position/posture and the temporal change rate (changing velocity) thereof at the beginning of the normal gait observed from the current time's gait supporting leg coordinate system. Further, the position and velocity of the body mass point in the 3-mass-point model are obtained on the basis of the above-described (Z0", Vz0") and the body posture angle (=reference body posture angle) at the beginning of the normal gait and the temporal change rate thereof. Then, from the positions and the velocities of these three mass points, the center-of-gravity position and velocity of the three mass points are calculated as the initial overall center-of-gravity vertical position/velocity of the normal gait.

It is noted that a multi-mass-point model having a greater number of mass points (e.g., a geometric model having a mass point at each link of the robot 1) may be used to obtain the initial overall center-of-gravity vertical position/velocity of the normal gait more accurately. Further, in the case where the mass of the portion excluding the body 24 is sufficiently small as compared with the mass of the body 24, the initial overall center-of-gravity vertical position/velocity of the normal gait may be obtained from the above-described (Z0", Vz0") and the body posture angle (=reference body posture angle) at the beginning of the normal gait and the temporal change rate thereof.

The initial overall center-of-gravity vertical position/velocity of the normal gait obtained in the above-described manner is substituted into the terminal overall center-of-gravity vertical position/velocity in the above expression 13 and the following expression 41, and the overall center-of-gravity vertical position and velocity of the instantaneous values of the last time's gait (more specifically, the values indicating the terminal state of the last time's gait observed from the current time's gait supporting leg coordinate system) are substituted into the initial overall center-of-gravity vertical position and velocity in the above expression 13 and the following expression 41, to thereby determine the floor reaction force vertical component trajectory parameters of the current time gait that can satisfy the relationships of the expressions 13 and 41. The integrals in the expressions 13 and 41 are those obtained during the period from the beginning to the end of the current time gait.

> Terminal overall center-of-gravity vertical velocity−
> Initial overall center-of-gravity vertical
> velocity=First order integral of (Floor reaction
> force vertical component/Mass of the robot)+
> First order integral of gravitational acceleration    Expression 41

(where the gravitational acceleration takes a negative value)

More specifically, firstly, of the floor reaction force vertical component trajectory parameters (such as the times of the bending points) defining the floor reaction force vertical component trajectory as illustrated in FIG. 5, at least two parameters (for example, a maximum value and a minimum value of the floor reaction force vertical component) are defined as independent unknown variables, and then, the values of the unknown variables are determined by solving the simultaneous equations formed of the expressions 13 and 41.

The process then proceeds to S608, where the gait generation system 100 determines ZMP trajectory parameters defining a ZMP trajectory of the current time gait (including the times and positions of the bending points in the ZMP trajectory) such that the ZMP trajectory will have a high stability allowance and develop no sudden change. For example, the ZMP trajectory parameters are provisionally determined such that the ZMP trajectory has a pattern as illustrated in FIG. 6. The ZMP trajectory parameters of the current time gait are provisionally determined such that the ZMP trajectory of the current time gait will uninterruptedly connect to the ZMP trajectory of the normal gait (such that the position of the ZMP at the end of the current time gait agrees with the position of the ZMP at the beginning of the normal gait).

It is noted that the ZMP trajectory parameters of the current time gait determined in S608 are provisionally determined parameters and are to be corrected as will be described later. Hereinafter, the desired ZMP of the current time gait that is defined by the provisionally determined ZMP trajectory parameters until the correction thereof is completed will be called the "provisional desired ZMP". Further, the gait parameters of the current time gait that include the provisionally determined ZMP trajectory parameters will be called the "provisional current time gait parameters".

Returning to FIG. 8, after carrying out the processing in S026 as described above, in S028, the gait generation system 100 carries out the processing for correcting the gait parameters (specifically, the ZMP trajectory parameters) of the current time gait. In this processing, the ZMP trajectory parameters among the gait parameters are corrected so as to cause the body position/posture trajectory of the current time gait to continue to, or approximate to, that of the normal gait.

Figure 18:
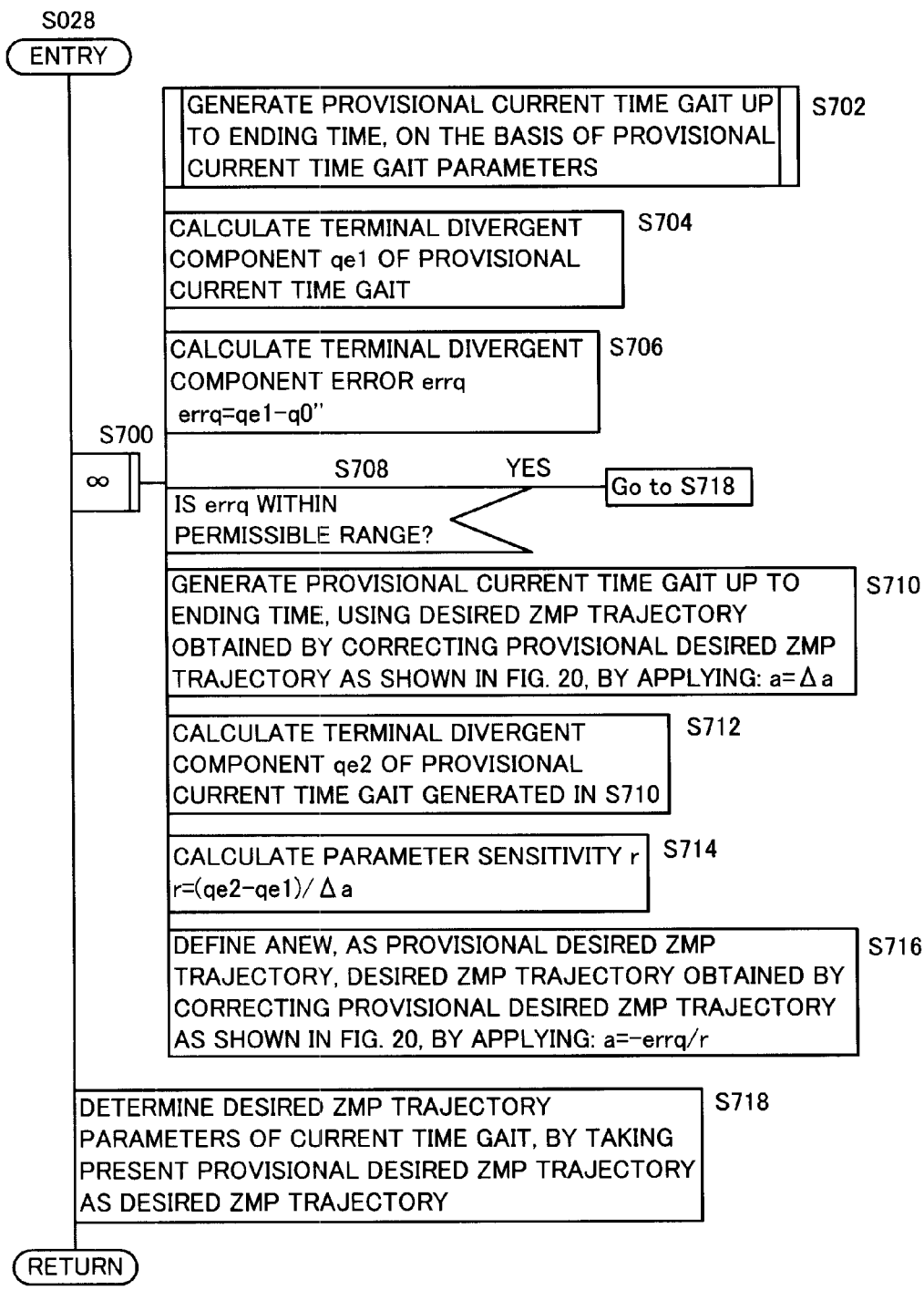
FIG. 18 is a flowchart showing the subroutine processing in S028 in FIG. 8.

This processing is carried out as illustrated by a flowchart in FIG. 18.

Firstly, the process proceeds through S700 to S702, where the gait generation system 100 generates a provisional current time gait up to the ending time of the current time gait, on the basis of the provisional current time gait parameters including the provisionally determined ZMP trajectory parameters.

Figure 19:
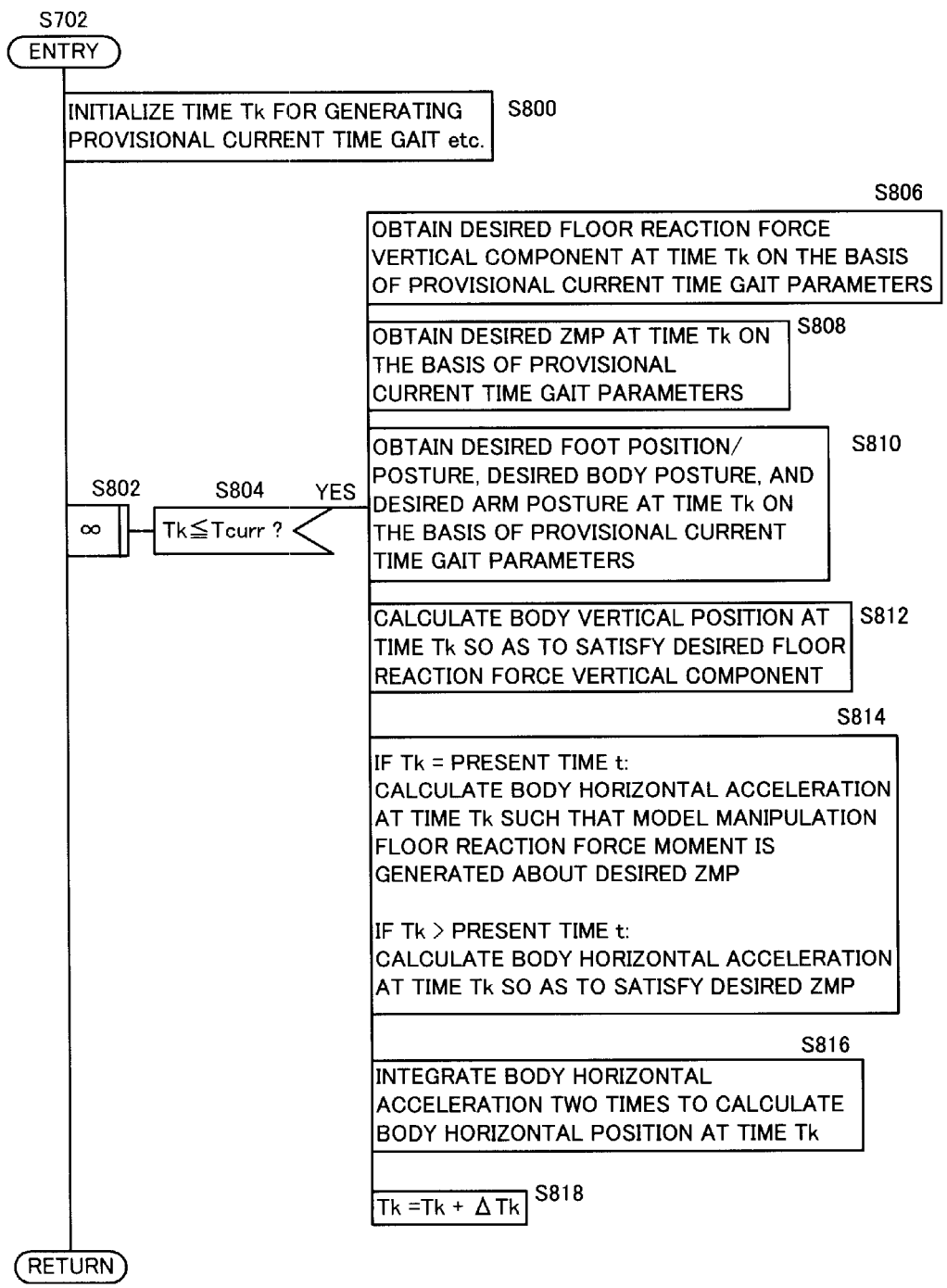
FIG. 19 is a flowchart showing the subroutine processing in S702 in FIG. 18.

In S702, the processing illustrated by a flowchart in FIG. 19 is carried out.

The processing will now be described. Firstly, in S800, the gait generation system 100 performs various initializing operations, including initialization of time Tk for generating a provisional current time gait. Specifically, the time Tk for generating the provisional current time gait is initialized to the present time t. Further, the motional states of the desired gait at time t−Δt (the motional states observed from the current time's gait supporting leg coordinate system), such as the desired body position and the desired body velocity, the desired body posture angle and the angular velocity thereof, the desired foot position/posture, the desired arm posture, and the like that have already been determined by the gait generation system 100 at time t−Δt, are set as the initial motional states immediately before the present time t of the provisional current time gait.

Subsequently, the process proceeds through S802 to S804, where the gait generation system 100 determines whether the time Tk (present value) for generating the provisional current time gait is time before the ending time Tcurr of the current time gait (i.e. whether Tk≤Tcurr). If the determination result is affirmative, then the gait generation system 100 carries out the processing in S806 to S816 (details of which will be described later), to determine instantaneous values of the gait at time Tk.

The process then proceeds to S818, where the gait generation system 100 increases the time Tk for generating the provisional current time gait by a prescribed notch time ΔTk, and then repeats the determination in S804. Here, the notch time ΔTk may be set to coincide with the control cycle Δt, for example, although ΔTk may be set to be longer than Δt in order to reduce the amount of calculations.

If the determination result in S804 is affirmative, the processing from S806 to S818 is repeated. Once the determination result in S804 turns to be negative, the processing illustrated in FIG. 19, i.e. the processing in S702 in FIG. 18, is terminated. Thus, the generation of the provisional current time gait from the starting time to the ending time of the current time gait is completed.

The gait generation system 100 carries out the processing of determining the instantaneous values of the provisional current time gait in the aforementioned S806 to S816 in the following manner. The way of determining the instantaneous values of the provisional current time gait here is similar to the way of determining the instantaneous values of the normal gait (provisional normal gait) in S306 to S316 in FIG. 16.

Firstly, in S806, the gait generation system 100 obtains an instantaneous value at time Tk of the desired floor reaction force vertical component trajectory as illustrated in FIG. 5, on the basis of the provisional current time gait parameters (more specifically, the floor reaction force vertical component trajectory parameters).

Then, in S808, the gait generation system 100 obtains an instantaneous value at time Tk of the desired ZMP trajectory (provisional desired ZMP trajectory) as illustrated in FIG. 6, on the basis of the provisional current time gait parameters (more specifically, the provisionally determined ZMP trajectory parameters).

Subsequently, the process proceeds to S810, where the gait generation system 100 obtains instantaneous values at time Tk of the desired foot position/posture, the desired body posture, and the desired arm posture, on the basis of the provisional current time gait parameters (more specifically, the foot trajectory parameters, the body posture trajectory parameters, and the arm posture trajectory parameters). As to the desired arm posture, more specifically, the overall centerof-gravity positions of both arms are determined, although the motions of the arms (arm swinging motions) that cause changes in angular momentum about the vertical axis (or about the trunk axis of the body 24) are not yet determined.

The process then proceeds to S812, where the gait generation system 100 calculates the body vertical position at time Tk so as to satisfy the desired floor reaction force vertical component determined in S806 (or, to balance the sum of the inertial force in the vertical direction of the overall center of gravity of the robot 1 and the gravitational force with the desired floor reaction force vertical component). The way of calculating the body vertical position here may be the same as that used in S312 (the processing for calculating the instantaneous value of the body vertical position of the normal gait) in FIG. 16, although the multi-mass-point model used in S812 may be different from the model used in S312.

The process then proceeds to S814, where the gait generation system 100 carries out the processing for determining the body horizontal acceleration at time Tk of the provisional current time gait.

Specifically, in the case where the time Tk for generating the provisional current time gait coincides with the present time t (time of the present control cycle of the gait generation system 100), the gait generation system 100 determines the body horizontal acceleration at time Tk of the provisional current time gait such that the model manipulation floor reaction force moment supplied from the compensating total floor reaction force moment distributor 110 (the value at the present control cycle) is generated about the desired ZMP (such that the horizontal component of the moment generated about the desired ZMP by the resultant force of the inertial force of the robot 1 and the gravitational force balances with the model manipulation floor reaction force moment).

In other words, the body horizontal acceleration at time Tk is determined such that the moment generated about the desired ZMP by the resultant force of the inertial force of the robot 1 and the gravitational force agrees with the model manipulation floor reaction force moment with its sign reversed.

Further, in the case where the time Tk for generating the provisional current time gait is ahead of the present time t (i.e. if Tk>present time t), the gait generation system 100 determines the body horizontal acceleration at time Tk so as to satisfy the desired ZMP (or, to satisfy the dynamic balance condition that the horizontal component of the moment generated about the desired ZMP by the resultant force of the inertial force of the robot 1 and the gravitational force is "0").

In these cases, the processing for calculating the body horizontal acceleration at time Tk of the provisional current time gait is carried out by using the dynamic model (inverted pendulum model) in FIG. 7, for example.

Specifically, the vertical position and the horizontal position of the body mass point 24b at time Tk are determined on the basis of the body vertical position at time Tk of the provisional current time gait, the body horizontal position at time (Tk−ΔTk), and the desired body posture at time Tk. In the case where time Tk coincides with the present time t, the body horizontal position in the initial motional states set in S800 is used as the body horizontal position at time (Tk−ΔTk).

Supplementally, as an alternative, the body horizontal position at time Tk may be estimated in an interpolating manner on the basis of either the time series of the body horizontal position up to time (Tk−ΔTk) or the gait state at time (Tk−ΔTk), and the estimated body horizontal position may be used in place of the body horizontal position at time (Tk−ΔTk).

Further, a value obtained by subtracting the gravitational force (=mb*g) acting on the body mass point 24b from the floor reaction force vertical component at time Tk of the provisional current time gait is divided by the mass mb of the body mass point 24b, to thereby obtain the vertical acceleration of the body mass point 24b at time Tk.

Then, in the case where Tk=present time t, the vertical position, the horizontal position, and the vertical acceleration of the body mass point 24b, which have been obtained as described above, are substituted into Zb, Xb, and d2Zb/dt2, respectively, of the above expression 04, the horizontal position and the vertical position of the desired ZMP at time Tk are substituted into Xzmp and Zzmp, respectively, of the expression 04, and Mzmp_y of the expression 04 is set to the model manipulation floor reaction force moment (present value). The resultant expression is then solved on d2Xb/dt2, to thereby calculate the body mass point horizontal acceleration d2Xb/dt2 at time Tk. This body mass point horizontal acceleration d2Xb/dt2 is obtained as the body horizontal acceleration at time Tk.

In the case where Tk>present time t, Mzmp_y of the expression 04 is set to "0", and the resultant expression is solved on d2Xb/dt2, to thereby calculate the body horizontal acceleration at time Tk. The processing in this case is similar to that in the case where Tk=present time t, except that Mzmp_y of the expression 04 is set to "0".

Alternatively, a more precise dynamic model may be used to obtain, in an exploratory manner, the body horizontal acceleration that causes the horizontal component of the floor reaction force moment about the desired ZMP to agree with the model manipulation floor reaction force moment or to attain "0".

The process then proceeds to S816, where the gait generation system 100 integrates two times the body horizontal acceleration obtained in S814, to calculate the body horizontal position at the present time Tk. This calculation is similar to that in S314 in FIG. 16.

The above is the details of the processing (the processing for generating the provisional current time gait) carried out by the gait generation system 100 in S702 in FIG. 18.

After executing the processing in S702 as described above, the gait generation system 100 carries out the processing in S704.

In S704, the gait generation system 100 calculates a terminal divergent component qe1 (divergent component qe1 at the end of the provisional current time gait) on the basis of the body horizontal position/velocity (Xe, Vxe) at the end of the provisional current time gait generated in S702.

Specifically, the gait generation system 100 firstly determines the horizontal position/velocity (the horizontal position and the horizontal velocity) of the body mass point 24b of the inverted pendulum model in FIG. 7, on the basis of (Xe, Vxe) and the body posture (the reference body posture in the present embodiment) at the end of the provisional current time gait. Then, from this body mass point horizontal position/velocity, the gait generation system 100 calculates the terminal divergent component qe1 of the provisional current time gait on the basis of the above expression 118, as in S222 in FIG. 15 described above. In this case, Γcyc$^{-1}$ used to calculate qe1 is the same as that calculated in the processing in S222.

The process then proceeds to S706, where the gait generation system 100 calculates a terminal divergent component error errq (=ge1−q0"), which is the difference between the terminal divergent component qe1 of the provisional current time gait obtained as described above and the initial divergent component q0″ of the normal gait obtained in S224 in FIG. 15.

Further, the process proceeds to S708, where the gait generation system 100 determines whether the terminal divergent component error errq obtained as described above is within a permissible range (a range in the vicinity of "0"), or, whether errq is "0" or substantially "0". More specifically, the determination in S708 is carried out on the terminal divergent component error errq in each axial direction of the X axis direction and the Y axis direction. If the terminal divergent component errors errq in both of the X-axis direction and the Y-axis direction fall within the permissible range, then the determination result in S708 turns to be affirmative. If the terminal divergent component error errq in one of the axial directions is out of the permissible range, then the determination result in S708 turns to be negative.

Figure 20:
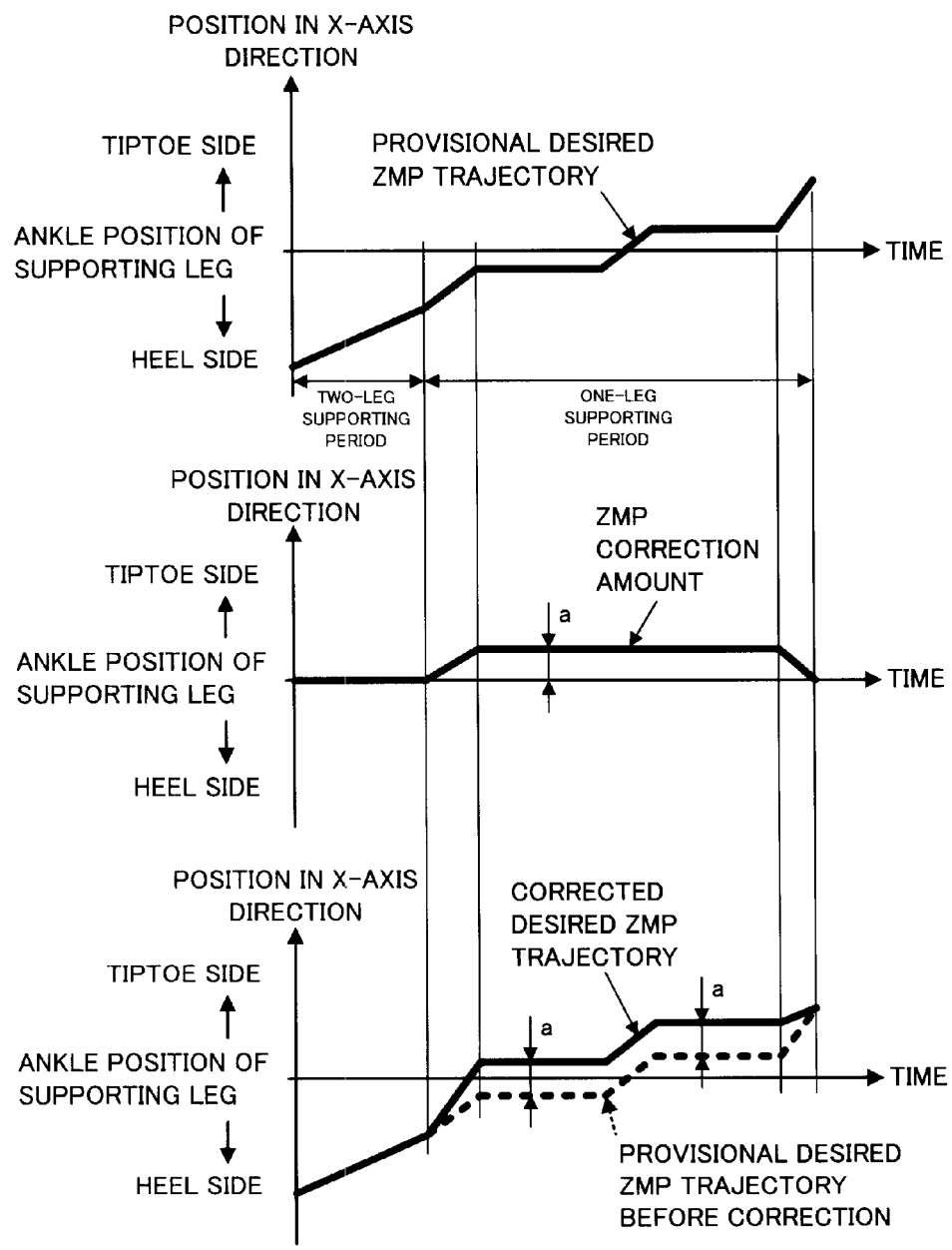
FIG. 20 is graph illustrating the processing in S710 in FIG. 18.

In the case where the determination result in S708 is negative, the process proceeds to S710, where the gait generation system 100 generates a provisional current time gait up to the ending time, as in S702 described above, by using a desired ZMP trajectory obtained by correcting the present provisional desired ZMP trajectory by a correction amount of a trapezoidal pattern, applying a=Δa (Δa: a prescribed minute amount), as illustrated in FIG. 20. That is, the gait generation system 100 generates a provisional current time gait anew by using, not the provisional desired ZMP trajectory used to generate the provisional current time gait in S702, but a desired ZMP trajectory obtained by correcting the same. In this case, the current time gait parameters other than the desired ZMP are the same as those used in S702.

Here, referring to FIG. 20, the "a" mentioned above denotes the height of the correction amount (hereinafter, this may be referred to as the "ZMP correction amount") of the trapezoidal pattern (to be added to the provisional desired ZMP trajectory) for correcting the provisional desired ZMP trajectory, in order to cause the terminal divergent component of the provisional current time gait to coincide with the initial divergent component of the normal gait as much as possible (and, hence, to cause the body horizontal position/posture trajectory of the current time gait to converge to the body horizontal position/posture trajectory of the normal gait).

In this case, in the present embodiment, the correction of the provisional desired ZMP trajectory is made during the one-leg supporting period. Thus, the ZMP correction amount is set such that the ZMP correction amount is not zero (≠0) during the one-leg supporting period, while the ZMP correction amount is zero (=0) during the two-leg supporting period. Further, the time of the bending point of the ZMP correction amount in the above-described trapezoidal pattern is set according to the time of the bending point of the provisional desired ZMP trajectory in the one-leg supporting period. In S710, a=Δa (Δa: a prescribed minute amount) is adapted in order to observe a change in the terminal divergent component error errq when the present provisional desired ZMP trajectory is corrected by a minute amount by the ZMP correction amount of the trapezoidal pattern.

Supplementally, the processing in S710 has been described above by taking, as an example, the case where the position in the X-axis direction of the desired ZMP is to be corrected. In practice, however, the position in the Y-axis direction of the desired ZMP is corrected as well. The correction of the position in the Y-axis direction, as with the correction of the position in the X-axis direction, is made such that the desired ZMP trajectory during the one-leg supporting period is changed in the trapezoidal pattern from the provisional desired ZMP trajectory. In this case, Δa described above may be set to the same value or different values in the respective axial directions.

If the correction of the desired ZMP trajectory in either one of the X-axis direction and the Y-axis direction will exert no influences or sufficiently small influences on the terminal divergent component in the other axial direction, then the processing from S710 to S716, which will be described later, may be carried out separately for the X-axis direction and for the Y-axis direction.

Following the generation of the provisional current time gait in S710 as described above, the process proceeds to S712, where the gait generation system 100 calculates a terminal divergent component qe2 of the provisional current time gait obtained in S710, on the basis of the body horizontal position/velocity (Xe2, Vxe2) at the end of that provisional current time gait, similarly as in S704.

In the present embodiment, Δa has been set to a minute amount of a prescribed value in S710. Alternatively, Δa may be variably set such that Δa approaches "0" as the terminal divergent component error errq is reduced by the repetitive operations which will be described below. In general, however, even when Δa is set to a constant, the terminal divergent component error errq can be made to fall within a permissible range by performing the repetitive operations a few number of times.

The process then proceeds to S714, where the gait generation system 100 calculates a parameter sensitivity r (ratio of a change in the terminal divergent component error relative to Δa) according to the expression in the flowchart. That is, the gait generation system 100 calculates the parameter sensitivity r by dividing the difference between the terminal divergent component qe2 calculated in S712 and the terminal divergent component qe1 calculated in S704 (=qe2−qe1) by Δa.

In this case, more specifically, for example the component in the X-axis direction of (qe2−qe1) is divided by Δa related to the ZMP correction amount in the X-axis direction to thereby calculate the parameter sensitivity r in the X-axis direction. Further, the component in the Y-axis direction of (qe2−qe1) is divided by Δa related to the ZMP correction amount in the Y-axis direction, to thereby calculate the parameter sensitivity r in the Y-axis direction.

The process then proceeds to S716, where the gait generation system 100 sets, as the height "a" of the ZMP correction amount of the trapezoidal pattern, the value obtained by reversing the sign of the value that is determined by dividing the terminal divergent component error errq obtained in S706 by the parameter sensitivity r obtained in S714, i.e. a=−errq/r, and then determines anew, as the provisional desired ZMP, the desired ZMP obtained by correcting the provisional desired ZMP pattern on the basis of the ZMP correction amount, as illustrated in FIG. 20. In this case, the height "a" of the ZMP correction amount is calculated separately for the X-axis direction and for the Y-axis direction.

It is noted that if the correction of the desired ZMP trajectory in either one of the X-axis direction and the Y-axis direction will exert influences on the terminal divergent component in the other axial direction, then the influences are preferably taken into consideration in determining the height "a" of the ZMP correction amount in each axial direction.

Subsequently, the gait generation system 100 carries out the processing from S702 again. At this time, as long as the determination result in S708 is negative, the processing of S702 through S716 described above is repeated. Once the determination result in S708 turns to be affirmative, the process leaves the repetition loop (S700) and proceeds to S718.

Through the loop processing of S702 to S716 described above, the ZMP correction amount which allows the terminal divergent component qe1 to agree or almost agree with the initial divergent component q0" of the normal gait (and, hence, the desired ZMP trajectory of the current time gait) is obtained in an exploratory manner. In other words, the ZMP correction amount is obtained which can cause the body horizontal position/posture trajectory of the current time gait to converge to the body horizontal position/posture trajectory of the normal gait.

In S718 following the loop processing, the gait generation system 100 takes the present provisional desired ZMP trajectory (the provisional desired ZMP trajectory set immediately before leaving the repetition loop in S700) as the final desired ZMP trajectory of the current time gait, and determines the ZMP trajectory parameters in correspondence therewith. This terminates the processing in S028 in FIG. 8 (the processing for correcting the current time gait parameters).

In the present embodiment, the ZMP correction amount has been set to be the trapezoidal pattern. Alternatively, it may be set to another pattern, such as a triangular pattern or a pattern having a continuously changing curvature.

Returning to FIG. 8, following the correction of the current time gait parameters in S028 as described above, the process proceeds to S030, where the gait generation system 100 determines floor reaction force moment permissible range parameters that define the permissible range of the floor reaction force moment (more specifically, the horizontal component of the floor reaction force moment) about the desired ZMP at each time from the beginning to the end of the current time gait. The permissible range of the floor reaction force moment that is defined by the floor reaction force moment permissible range parameters is used by the compensating total floor reaction force moment distributor 110 in the above-described manner.

It is noted that the result obtained by dividing the floor reaction force moment by a floor reaction force vertical component corresponds to the amount of deviation of the ZMP (the floor reaction force central point) from a desired ZMP. Therefore, it may be configured to convert the floor reaction force moment permissible range into a ZMP permissible range (floor reaction force central point permissible range) as the permissible range of the position of the ZMP (the floor reaction force central point), and determine the parameters defining this ZMP permissible range.

In the case where the floor reaction force moment permissible range determined in S030 is used in the compensating total floor reaction force moment distributor 110, the range has a meaning as the permissible range of an actual floor reaction force moment about the desired ZMP controlled by the control processing (compliance control) by the above-described composite-compliance operation determiner 104. The floor reaction force moment permissible range will now be described.

The compliance control implemented by the processing carried out by the composite-compliance operation determiner 104 controls the position/posture of the foot 22 such that the floor reaction force moment generated about the desired ZMP will be the desired floor reaction force moment for compliance control. When the compliance control works faithfully as desired, the actual floor reaction force central point will be a point the position of which is shifted in the horizontal direction from the desired ZMP by a value obtained by dividing the desired floor reaction force moment by a floor reaction force vertical component. The actual floor reaction force central point cannot deviate from a ZMP existible range (in a strict expression, the range in which the actual floor reaction force central point can exist) which is expressed by a so-called supporting polygon. If the actual floor reaction force central point excessively approaches the boundary of the ZMP existible range, problems will occur. For example, the proper ground contact feeling of the foot 22 may deteriorate or the sole (bottom surface) of the foot 22 may float undesirably.

The floor reaction force moment permissible range is to impart restrictions to the floor reaction force moment for compliance control in order to prevent such problems. For this reason, the floor reaction force moment permissible range is preferably determined such that the floor reaction force central point permissible range obtained by dividing the floor reaction force moment permissible range by a floor reaction force vertical component is included in the ZMP existible range.

More specifically, the floor reaction force central point permissible range (ZMP permissible range) should be determined in accordance with the supporting polygon. In this case, the floor reaction force central point permissible range can be generally set to have a complicated shape. In the present embodiment, however, for simplifying the calculations, the floor reaction force central point permissible range is set, for example, to a region of a rectangle (a rectangle having sides parallel to the X-axis direction and sides parallel to the Y-axis direction) on a floor surface. In this case, the floor reaction force moment permissible range obtained by converting the floor reaction force central point permissible range into the floor reaction force moment is set for a component in the X-axis direction and for a component in the Y-axis direction independently from each other.

Figure 21:
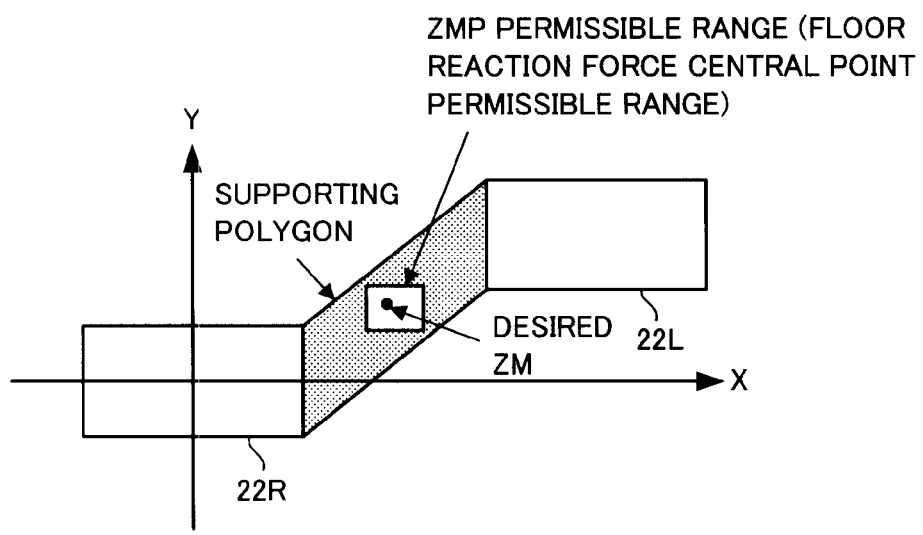
FIG. 21 is a diagram illustrating the processing in S030 in FIG. 8.

For example, in the case where the supporting polygon and the desired ZMP are in the situation as shown in FIG. 21, the floor reaction force central point permissible range (ZMP permissible range) is set to be included in the supporting polygon, as illustrated. At the same time, the floor reaction force central point permissible range (ZMP permissible range) is set to include the desired ZMP.

It is noted that the supporting polygon indicated in the form of a stippled region in FIG. 21 illustrates a supporting polygon of a walking gait in a two-leg supporting period. This example schematically illustrates the state where both the tiptoe of the right foot 22R and the heel of the left foot 22L are in contact with the ground.

In a one-leg supporting period of a walking gait, the supporting polygon corresponds to the ground contact surface (contact surface with a floor surface) of the supporting leg foot 22. In the two-leg supporting period, the supporting polygon corresponds to a region obtained by connecting the ground contact surfaces of both feet 22, 22 (more specifically, a region of a smallest convex polygon including the ground contact surfaces of both feet 22, 22). In the present embodiment, the floor reaction force central point permissible range is set such that it includes a desired ZMP and such that it is included in the supporting polygon or substantially matches the supporting polygon. In this case, the supporting polygon in the current time gait is calculated on the basis of the foot position/posture trajectory parameters of the current time gait parameters determined in S026.

In the case where the desired ZMP is out of the supporting polygon or too close to the boundary of the supporting polygon, an arbitrary region within the supporting polygon not including the desired ZMP, or a point within the supporting polygon other than the desired ZMP (a region having the area of "0"), for example, is provisionally set as the floor reaction force central point permissible range.

In the present embodiment, the range obtained by converting the floor reaction force central point permissible range, set as described above, into a floor reaction force moment is determined to be the floor reaction force moment permissible range.

The floor reaction force moment permissible range is not limited to the supporting polygon defined dependent on the ground contact surface of the robot 1; it may be determined in consideration of the shape of the floor as well as the properties (hardness and the like) of the floor.

Following the determination of the floor reaction force moment permissible range parameters in S030 as described above, the process proceeds to S031, where the gait generation system 100 determines whether the desired ZMP trajectory defined by the ZMP trajectory parameters determined in S028 is an appropriate trajectory. In this case, in the present embodiment, the gait generation system 100 determines whether each instantaneous value (for every prescribed notch time) of the desired ZMP trajectory defined by the ZMP trajectory parameters of the current time gait falls within a prescribed ZMP existence permissible region, which has been set within the supporting polygon, to thereby determine whether the desired ZMP trajectory is an appropriate trajectory.

More specifically, the gait generation system 100 calculates a foot position/posture trajectory of each foot 22 of the current time gait on the basis of the foot position/posture trajectory parameters determined in S026. It then calculates, on the basis of this foot position/posture trajectory, a supporting polygon at each time after the present time (time of the present control cycle of the gait generation system 100), and sets a ZMP existence permissible region within that supporting polygon. In this case, the ZMP existence permissible region may be a region matching the supporting polygon or may be a region slightly smaller than the supporting polygon.

In the case where the desired ZMP at each time (after the present time) of the current time gait falls within the ZMP existence permissible region at the corresponding time, then the gait generation system 100 determines that the desired ZMP trajectory defined by the ZMP trajectory parameters of the current time gait is an appropriate trajectory. In the case where the desired ZMP at any time of the current time gait is out of the ZMP existence permissible region at the corresponding time, then the gait generation system 100 determines that the desired ZMP trajectory defined by the ZMP trajectory parameters of the current time gait is not an appropriate trajectory.

If the determination result in S031 is negative (when the desired ZMP trajectory is not an appropriate trajectory), the gait generation system 100 carries out the processing from S020 again. In this case, in S020, for the purposes of determining a desired ZMP trajectory that gives an affirmative determination result in S031, the gait generation system 100 for example corrects at least one of: a desired landing position out of the desired landing position/posture of the free leg foot 22 in the current time gait (and, hence, the position of the origin of the current time's gait supporting leg coordinate system), and a desired landing time of the free leg foot 22 in the current time gait (and, hence, the current time gait cycle), in a manner as will be described below.

Here, prior to the detailed description of the processing in S020 in the case where the determination result in S031 is negative, the above-described processing for determining a desired ZMP trajectory, carried out in S020 through S028, will be briefly described again.

In the present embodiment, the gait generation system 100 generates a desired ZMP trajectory of the current time gait so as to satisfy both of the following conditions: a condition that each instantaneous value of the desired ZMP trajectory (desired ZMP at each time) of the current time gait is within a ZMP existence permissible region in a supporting polygon (hereinafter, this condition will be referred to as the "ZMP existence region requisite condition"); and a condition that the motion of the current time gait generated in accordance with the desired ZMP trajectory on the dynamic model of the robot 1 (in the present embodiment, the inverted pendulum model shown in FIG. 7) is a motion that can be realized continuously (hereinafter, this condition will be referred to as the "motion continuity requisite condition").

Here, the motion continuity requisite condition in the present embodiment is the condition that the motion of the current time gait which is generated so as to satisfy the desired ZMP trajectory on the dynamic model of the robot 1 (such that a horizontal component of the moment generated about the desired ZMP by the resultant force of the inertial force generated by the motion of the robot 1 and the gravitational force acting on the robot 1 is "0") becomes a motion which can converge to the motion of the normal gait in the future.

In this case, in the above-described processing in S020 through S028, the gait generation system 100 determines a provisional desired ZMP trajectory that satisfies the ZMP existence region requisite condition in S026, on the basis of the foot position/posture trajectory parameters that have been set on the premise of the next time's gait supporting leg coordinate system determined to satisfy the geometric leg motion requisite condition in S020 as described above (or the desired landing position/posture of the free leg foot 22 of the current time gait) as well as the current time gait cycle.

Further, the gait generation system 100 determines a normal gait that follows the current time gait, on the premise of the next time's gait supporting leg coordinate system and the next but one time's gait supporting leg coordinate system (or the desired landing positions/postures of the free leg foot 22 in the current time gait and in the next time gait) and the current time gait cycle and the next time gait cycle (or the desired landing times of the free leg foot 22 in the current time gait and in the next time gait) determined in S020.

Then, the gait generation system 100 determines a ZMP correction amount such that the terminal divergent component of the current time gait generated on the dynamic model of the robot 1 agrees or substantially agrees with the initial divergent component of the normal gait, and corrects the provisional desired ZMP trajectory by the ZMP correction amount, to thereby determine a desired ZMP trajectory so as to satisfy the above-described motion continuity requisite condition.

Namely, in the present embodiment, the gait generation system 100 determines foot position/posture trajectory parameters defining the foot position/posture trajectory, and determines a provisional desired ZMP trajectory to satisfy the ZMP existence region requisite condition, and further, corrects the provisional desired ZMP trajectory by a ZMP correction amount so as to satisfy the motion continuity requisite condition, to thereby determine a desired ZMP trajectory.

In determining the desired ZMP trajectory as described above, if the ZMP correction amount for satisfying the motion continuity requisite condition is set to a large amount, the corrected desired ZMP trajectory may not be able to satisfy the ZMP existence region requisite condition, rendering the determination result in S031 to be negative.

On the other hand, changing for example either the desired landing position or the desired landing time of the free leg foot 22 of the current time gait causes the foot position/posture trajectory of the current time gait to change, which will accompany a change of the provisional desired ZMP trajectory that can satisfy the ZMP existence region requisite condition. Further, changing either the desired landing position or the desired landing time of the free leg foot 22 of the current time gait and, hence, the foot position/posture trajectory of the current time gait will result in a change of the ZMP correction amount for satisfying the motion continuity requisite condition.

This means that when the desired landing position or the desired landing time of the free leg foot 22 of the current time gait is corrected as appropriate within the range that can satisfy the geometric leg motion requisite condition, then a desired ZMP trajectory that can satisfy both the ZMP existence region requisite condition and the motion continuity requisite condition will be able to be determined.

In view of the foregoing, according to the present embodiment, in the processing in S020 in the case where the determination result in S031 is negative, the gait generation system 100 corrects the desired landing position or the desired landing time of the free leg foot 22 of the current time gait, and then determines anew the next time's gait supporting leg coordinate system, the next but one time's gait supporting leg coordinate system, the current time gait cycle, and the next time gait cycle.

In this case, the problem is how to correct the desired landing position or the desired landing time of the free leg foot 22 of the current time gait so that a desired ZMP trajectory that can satisfy both the ZMP existence region requisite condition and the motion continuity requisite condition can be determined and that the geometric leg motion requisite condition can also be satisfied.

Here, the height (peak value) a of the ZMP correction amount of the trapezoidal pattern that has been determined in S028 on the premise of the next time's gait supporting leg coordinate system, the next but one time's gait supporting leg coordinate system, the current time gait cycle, and the next time gait cycle determined in the latest S020 processing in each control cycle (the latest one of the processing of S020 that have been carried out prior to the determination processing in S031) is set as a present ZMP correction amount height a0.

Further, the correction amount of the desired landing position of the free leg foot 22 of the current time gait (correction amount from the desired landing position corresponding to the next time's gait supporting leg coordinate system determined in the latest S020 processing in each control cycle; hereinafter, referred to as the "landing position correction amount") is denoted by ΔPOS, and the correction amount of the desired landing time of the free leg foot 22 of the current time gait (correction amount from the desired landing time corresponding to the current time gait cycle determined in the latest S020 processing in each control cycle; hereinafter, referred to as the "landing time correction amount") is denoted by ΔTm.

Furthermore, the change amount (from the present ZMP correction amount height a0) of the height (peak value) a of the ZMP correction amount that is determined in S028 in the case where the desired landing position and the desired landing time of the free leg foot 22 of the current time gait are changed by ΔPOS and ΔTm, respectively, from the present values (latest values) is denoted by ΔZMP. In other words, the height (peak value) a of the ZMP correction amount that is determined in S028 when the desired landing position and the desired landing time of the free leg foot 22 of the current time gait are changed from the present values (latest values) by ΔPOS and ΔTm, respectively, is denoted by (a0+ΔZMP).

At this time, it is considered that the relationship expressed by the following expression 150 approximately holds between ΔZMP on one hand and ΔPOS and ΔTm on the other hand.

$$\Delta ZMP = Sp^* \Delta POS + St^* \Delta Tm \quad \text{Expression 150}$$

In this expression 150, Sp represents a sensitivity of the change in ΔZMP relative to the change in ΔPOS (hereinafter, referred to as the "ZMP/landing position sensitivity Sp"), and St represents a sensitivity of the change in ΔZMP relative to the change in ΔTm (hereinafter, referred to as the "ZMP/landing time sensitivity St"). In practice, the expression 150 is formed of an expression related to the components in the X-axis direction (the expression when ΔZMP and ΔPOS are the components in the X-axis direction), and an expression related to the components in the Y-axis direction (the expression when ΔZMP and ΔPOS are the components in the Y-axis direction). In this case, the values of Sp and St in the expression 150 related to the components in the X-axis direction and the values of Sp and St in the expression 150 related to the components in the Y-axis direction are generally different from each other.

In the following description, when ΔZMP and ΔPOS are to be distinguished between the components in the X-axis direction and in the Y-axis direction, the components in the X-axis direction will be represented as ΔZMPx and ΔPOSx, respectively, and the components in the Y-axis direction will be represented as ΔZMPy and ΔPOSy, respectively. Further, Sp and St related to the components in the X-axis direction, ΔZMPx and ΔPOSx, will be represented as Spx and Stx, respectively, and Sp and St related to the components in the Y-axis direction, ΔZMPy and ΔPOSy, will be represented as Spy and Sty, respectively.

The following expression 152 is derived from the above expression 150. Therefore, ΔPOS can be represented as the function value with ΔZMP and ΔTm.

$$\Delta POS = (\Delta ZMP - St^* \Delta Tm)/Sp \quad \text{Expression 152}$$

Here, in order for a desired ZMP trajectory, which is obtained by correcting a provisional desired ZMP trajectory by the ZMP correction amount with the trapezoidal pattern height a=a0+ΔZMP, to satisfy the above-described ZMP existence region requisite condition, it is required that the instantaneous values of the desired ZMP trajectory in a one-leg supporting period fall within the above-described ZMP existence permissible region in the supporting polygon corresponding to the ground contact surface of the supporting leg foot 22 in that one-leg supporting period.

Thus, the permissible range of ΔZMP for satisfying the ZMP existence region requisite condition is defined in accordance with this requirement.

Here, regarding the components in the X-axis direction, the present ZMP correction amount height a0 in the X-axis direction is denoted by a0x and the lower limit and the upper limit of the range in the X-axis direction of the ZMP existence permissible region in the one-leg supporting period are denoted by ZMPx1 and ZMPx2, respectively.

At this time, in order for the position in the X-axis direction of the desired ZMP to satisfy the ZMP existence region requisite condition, the following relationship needs to hold: ZMPx1≤a0x+ΔZMPx+ZMPx≤ZMPx2. According to this relationship, the permissible range of ΔZMPx is defined as the range of: ZMPx1−a0x−ZMPx≤ΔZMPx≤ZMPx2−a0x−ZMPx.

Similarly, the present ZMP correction amount height a0 in the Y-axis direction is denoted by a0y and the lower limit and the upper limit of the range in the Y-axis direction of the ZMP existence permissible region in the one-leg supporting period are denoted by ZMPy1 and ZMPy2, respectively. At this time, the permissible range of ΔZMPy is defined as the range of: ZMPy1−a0y−ZMPy≤ΔZMPy≤ZMPy2−a0y−ZMPy.

Further, in the present embodiment, the gait cycle of each gait for one step is restricted within a prescribed gait cycle permissible range for limiting the displacement speeds of the joints of the legs 2 and others, as described above. That is, it is required that the current time gait cycle, which is the difference between the desired landing time corrected by ΔTm of the free leg foot 22 of the current time gait and the desired landing time of the free leg foot 22 in the last time's gait, take a value falling within the gait cycle permissible range. Thus, the permissible range of ΔTm is defined in accordance with this requirement.

In this case, when the current time gait cycle determined in the processing in latest S020 is denoted by Tcyc0 and the lower limit and the upper limit of the gait cycle permissible range are denoted by Tcyc1 and Tcyc2, respectively, then the permissible range of ΔTm is the range of: Tcyc1−Tcyc0≤ΔTm≤Tcyc2−Tcyc0.

As such, ΔZMP and ΔTm in the expression 152 have their permissible ranges defined. On the basis of these permissible ranges, a permissible range of ΔPOS necessary for satisfying the above-described ZMP existence region requisite condition and motion continuity requisite condition can be determined, in accordance with the expression 152, inclusive of the influence of the landing time correction amount ΔTm of the free leg foot 22 of the current time gait.

This in turn makes it possible to determine a permissible region for the desired landing position of the free leg foot 22 of the current time gait which is necessary for satisfying the ZMP existence region requisite condition and the motion continuity requisite condition, inclusive of the influence of the landing time correction amount ΔTm of the free leg foot 22 of the current time gait. In other words, the requirement for satisfying the ZMP existence region requisite condition and the motion continuity requisite condition can be expressed as the permissible region for the desired landing position (desired position of the origin of the next time's gait supporting leg coordinate system) of the free leg foot 22 of the current time gait.

Therefore, according to the present embodiment, in the processing in S020 in the case where the determination result in S031 is negative, a permissible region for the desired landing position (hereinafter, referred to as the "second landing permissible region") of the free leg foot 22 of the current time gait for determining a desired ZMP trajectory that can satisfy the ZMP existence region requisite condition and the motion continuity requisite condition is determined on the basis of the expression 152, and then, a desired landing position of the free leg foot 22 of the current time gait is determined within a region where the second landing permissible region overlaps the above-described first landing permissible region corresponding to the geometric leg motion requisite condition.

In this case, the second landing permissible region is determined in the following manner.

Firstly, the gait generation system 100 determines the ZMP/landing position sensitivity Sp and the ZMP/landing time sensitivity St in the above expression 152.

Specifically, Sp is determined as follows. The gait generation system 100 calculates a ZMP correction amount in the X-axis direction by carrying out the processing similar to that in S022 through S028, using the next but one time's gait supporting leg coordinate system, the current time gait cycle, and the next time gait cycle previously determined in latest S020, and a next time's gait supporting leg coordinate system for sensitivity calculation that is obtained from the next time's gait supporting leg coordinate system previously determined in latest S020 by shifting the position of its origin in the X-axis direction (X-axis direction of the current time's gait supporting leg coordinate system) by a prescribed amount (minute perturbation quantity) ΔX.

It is noted that the position of the origin in the Y-axis direction (Y-axis direction of the current time's gait supporting leg coordinate system) of the next time's gait supporting leg coordinate system for sensitivity calculation and the posture of that next time's gait supporting leg coordinate system are set to be the same as those of the next time's gait supporting leg coordinate system previously determined in latest S020.

Then, the gait generation system 100 divides a difference between the height (peak value) ax of the ZMP correction amount in the X-axis direction and the present ZMP correction amount height a0x in the X-axis direction (i.e. the height of the ZMP correction amount in the X-axis direction previously calculated in latest S028) (=ax−a0x) by the prescribed amount ΔX, and determines the resultant value as the ZMP/landing position sensitivity Sp in the X-axis direction.

The ZMP/landing position sensitivity Sp in the Y-axis direction is determined in the same manner as described above. In this case, the next time's gait supporting leg coordinate system for sensitivity calculation is the coordinate system that is obtained from the next time's gait supporting leg coordinate system previously determined in latest S020 by shifting the position of its origin in the Y-axis direction (Y-axis direction of the current time's gait supporting leg coordinate system) by a prescribed amount ΔY.

Further, St is determined as follows. The gait generation system 100 calculates a ZMP correction amount in the X-axis direction and a ZMP correction amount in the Y-axis direction by carrying out the processing similar to that in S022 through S028, using the next time's gait supporting leg coordinate system, the next but one time's gait supporting leg coordinate system, and the next time gait cycle previously determined in latest S020, and a current time gait cycle for sensitivity calculation which is obtained from the current time gait cycle previously determined in latest S020 by shifting the same by a prescribed time (minute perturbation time) ΔT.

Then, the gait generation system 100 divides a difference between the height (peak value) ax of the ZMP correction amount in the X-axis direction and the present ZMP correction amount height a0x in the X-axis direction (i.e. the height of the ZMP correction amount in the X-axis direction previously calculated in latest S028) (=ax−a0x) by the prescribed time ΔT, and determines the resultant value as the ZMP/landing time sensitivity St in the X-axis direction.

Similarly, the gait generation system 100 divides a difference between the calculated height (peak value) ay of the ZMP correction amount in the Y-axis direction and the present ZMP correction amount height a0y in the Y-axis direction (i.e. the height of the ZMP correction amount in the Y-axis direction previously calculated in latest S028) (=ay−a0y) by the prescribed time ΔT, and determines the resultant value as the ZMP/landing time sensitivity St in the Y-axis direction.

In this manner, Sp and St in the expression 152 are determined.

Subsequently, the gait generation system 100 determines a permissible range (permissible range in the X-axis direction and permissible range in the Y-axis direction) of ΔZMP in the expression 152, in the above-describe manner, on the basis of the ZMP existence permissible region in the one-leg supporting period in the current time gait, among the ZMP existence permissible region (region in the supporting polygon) at each time of the current time gait set as described above in the determination processing in latest S031, and also on the basis of the provisional desired ZMP trajectory and the ZMP correction amount in the one-leg supporting period previously determined in the processing in latest S026 and S028, respectively.

Namely, the permissible range of the X-axis direction component $\Delta ZMPx$ of $\Delta ZMP$ is determined to be a range of: $ZMPx1-a0x-ZMPx \leq \Delta ZMPx \leq ZMPx2-a0x-ZMPx$, and the permissible range of the Y-axis direction component $\Delta ZMPy$ of $\Delta ZMP$ is determined to be a range of: $ZMPy1-a0y-ZMPy \leq \Delta ZMPy \leq ZMPy2-a0y-ZMPy$. The width in the X-axis direction and the width in the Y-axis direction of the permissible range of $\Delta ZMP$ determined in this manner are identical to the width in the X-axis direction and the width in the Y-axis direction, respectively, of the ZMP existence permissible region.

Figure 22:
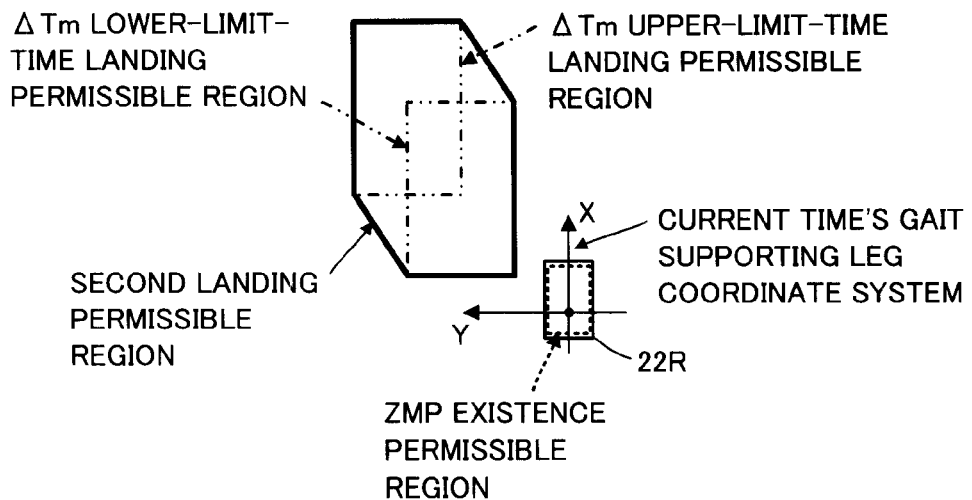
FIG. 22 is a diagram visually showing an example of a second landing permissible region used in the processing in S020 that is carried out in the case where the determination result in S031 in FIG. 8 is negative.

It is noted that in the present embodiment, the ZMP existence permissible region in the one-leg supporting period is a rectangular region as illustrated in FIG. 22 (a region delimited by two sides parallel to the X-axis direction and two sides parallel to the Y-axis direction of the current time's gait supporting leg coordinate system). This ZMP existence permissible region is a region of approximately the same shape as the supporting polygon formed by the ground contact surface of the supporting leg foot 22 that is in contact with the ground during the one-leg supporting period.

Further, the gait generation system 100 determines a permissible range of $\Delta Tm$ in the expression 152, in the above-described manner, on the basis of the current time gait cycle previously determined in the latest S020 processing and the above-described gait cycle permissible range. That is, the permissible range of $\Delta Tm$ is determined to be a range of: $Tcyc1-Tcyc0 \leq \Delta Tm \leq Tcyc2-Tcyc0$.

After determining the values of Sp and St and the permissible ranges of $\Delta ZMP$ and $\Delta Tm$ in the expression 152 as described above, the gait generation system 100 determines a permissible range (permissible range in the X-axis direction and permissible range in the Y-axis direction) of $\Delta POS$ corresponding to the permissible range of $\Delta ZMP$, in accordance with the above expression 152, separately for the case where the value of $\Delta Tm$ is made to coincide with the lower limit of its permissible range (=$Tcyc1-Tcyc0$; hereinafter, this will be denoted by $\Delta Tm\_min$) and for the case where the value of $\Delta Tm$ is made to coincide with the upper limit of its permissible range (=$Tcyc2-Tcyc0$; hereinafter, this will be denoted by $\Delta Tm\_max$).

Specifically, the gait generation system 100 substitutes the lower limit $\Delta Tm\_min$ into $\Delta Tm$ in the expression 152, and further substitutes the lower limit and the upper limit of the permissible range of $\Delta ZMPx$ in the X-axis direction into $\Delta ZMP$ in the expression 152, to thereby calculate the lower limit and the upper limit, respectively, of the permissible range of $\Delta POSx$ in the X-axis direction in the case where $\Delta Tm = \Delta Tm\_min$.

Similarly, the gait generation system 100 substitutes the lower limit $\Delta Tm\_min$ into $\Delta Tm$ in the expression 152, and further substitutes the lower limit and the upper limit of the permissible range of $\Delta ZMPy$ in the Y-axis direction into $\Delta ZMP$ in the expression 152, to thereby calculate the lower limit and the upper limit, respectively, of the permissible range of $\Delta POSy$ in the Y-axis direction in the case where $\Delta Tm = \Delta Tm\_min$. In this manner, the permissible range of $\Delta ZMP$ for satisfying the ZMP existence region requisite condition and the motion continuity requisite condition is converted into the permissible range of $\Delta POS$ in the case where $\Delta Tm = \Delta Tm\_min$.

Furthermore, the gait generation system 100 substitutes the upper limit $\Delta Tm\_max$ into $\Delta Tm$ in the expression 152, and further substitutes the lower limit and the upper limit of the permissible range of $\Delta ZMPx$ in the X-axis direction into $\Delta ZMP$ in the expression 152, to thereby calculate the lower limit and the upper limit, respectively, of the permissible range of $\Delta POSx$ in the X-axis direction in the case where $\Delta Tm = \Delta Tm\_max$.

Similarly, the gait generation system 100 substitutes the upper limit $\Delta Tm\_max$ into $\Delta Tm$ in the expression 152, and further substitutes the lower limit and the upper limit of the permissible range of $\Delta ZMPy$ in the Y-axis direction into $\Delta ZMP$ in the expression 152, to thereby calculate the lower limit and the upper limit, respectively, of the permissible range of $\Delta POSy$ in the Y-axis direction in the case where $\Delta Tm = \Delta Tm\_max$. In this manner, the permissible range of $\Delta ZMP$ for satisfying the ZMP existence region requisite condition and the motion continuity requisite condition is converted into the permissible range of $\Delta POS$ in the case where $\Delta Tm = \Delta Tm\_max$.

It is noted that the permissible range in the X-axis direction of $\Delta POS$ in the case where $\Delta Tm = \Delta Tm\_max$ corresponds to the permissible range in the X-axis direction of $\Delta POS$ in the case where $\Delta Tm = \Delta Tm\_min$ that is offset by $-(Stx/Spx)*(\Delta Tm\_max - \Delta Tm\_min)$ in the X-axis direction.

Similarly, the permissible range in the Y-axis direction of $\Delta POS$ in the case where $\Delta Tm = \Delta Tm\_max$ corresponds to the permissible range in the Y-axis direction of $\Delta POS$ in the case where $\Delta Tm = \Delta Tm\_min$ that is offset by $-(Sty/Spy)*(\Delta Tm\_max - \Delta Tm\_min)$ in the Y-axis direction.

Subsequently, the gait generation system 100 determines a permissible region for the desired landing position of the free leg foot 22 of the current time gait for satisfying the above-described ZMP existence region requisite condition and motion continuity requisite condition in the case where $\Delta Tm = \Delta Tm\_min$, on the basis of the permissible range of $\Delta POS$ when $\Delta Tm = \Delta Tm\_min$, determined in the above-described manner, and the desired landing position of the free leg foot 22 of the current time gait corresponding to the next time's gait supporting leg coordinate system previously determined in the latest S020 processing.

Here, the permissible region for the desired landing position of the free leg foot 22 of the current time gait in the case where $\Delta Tm = \Delta Tm\_min$ (hereinafter, referred to as the "$\Delta Tm$ lower-limit-time landing permissible region") is an existible region of the desired landing position of the free leg foot 22 of the current time gait corresponding to the next time's gait supporting leg coordinate system previously determined in the latest S020 processing that is corrected by an arbitrary $\Delta POS$ within the permissible range of $\Delta POS$ when $\Delta Tm = \Delta Tm\_min$.

In this case, the boundary positions in the X-axis direction of the $\Delta Tm$ lower-limit-time landing permissible region are determined to be the positions obtained by adding the lower limit and the upper limit, respectively, of $\Delta POSx$ in the X-axis direction to the X-axis direction component of the desired landing position of the free leg foot 22 of the current time gait corresponding to the next time's gait supporting leg coordinate system previously determined in the latest S020 processing. Further, the boundary positions in the Y-axis direction of the $\Delta Tm$ lower-limit-time landing permissible region are determined to be the positions obtained by adding the lower limit and the upper limit, respectively, of $\Delta POSy$ in the Y-axis direction to the Y-axis direction component of the desired landing position of the free leg foot 22 of the current time gait corresponding to the next time's gait supporting leg coordinate system previously determined in the latest S020 processing.

Further, the gait generation system 100 determines a permissible region for the desired landing position of the free leg foot 22 of the current time gait for satisfying the ZMP existence region requisite condition and the motion continuity requisite condition in the case where $\Delta Tm = \Delta Tm\_max$ (hereinafter, this will be referred to as the "$\Delta Tm$ upper-limit-time landing permissible region"), in a similar manner as described above, on the basis of the permissible range of $\Delta POS$ when $\Delta Tm = \Delta Tm\_max$ and the desired landing position of the free leg foot 22 of the current time gait corresponding to the next time's gait supporting leg coordinate system previously determined in the latest S020 processing.

Examples of the $\Delta Tm$ lower-limit-time landing permission region and the $\Delta Tm$ upper-limit-time landing permission region determined as described above are visually shown in FIG. 22. The width in the X-axis direction of each of the $\Delta Tm$ lower-limit-time landing permissible region and the $\Delta Tm$ upper-limit-time landing permissible region agrees with a value obtained by dividing the width of the permissible range of $\Delta ZMPx$, i.e. the width in the X-axis direction of the ZMP existence permissible region in the one-leg supporting period of the current time gait, by the ZMP/landing position sensitivity Spx in the X-axis direction.

Further, the width in the Y-axis direction of each of the $\Delta Tm$ lower-limit-time landing permissible region and the $\Delta Tm$ upper-limit-time landing permissible region agrees with a value obtained by dividing the width of the permissible range of $\Delta ZMPy$, i.e. the width in the Y-axis direction of the ZMP existence permissible region in the one-leg supporting period of the current time gait, by the ZMP/landing position sensitivity Spy in the Y-axis direction.

Subsequently, the gait generation system 100 determines a region obtained by connecting the $\Delta Tm$ lower-limit-time landing permissible region and the $\Delta Tm$ upper-limit-time landing permissible region as shown in FIG. 22 (i.e. the region of a smallest convex polygon including the $\Delta Tm$ lower-limit-time landing permissible region and the $\Delta Tm$ upper-limit-time landing permissible region) to be the second landing permissible region which is the permissible region for the desired landing position of the free leg foot 2 of the current time gait for determining a desired ZMP trajectory that satisfies the ZMP existence region requisite condition and the motion continuity requisite condition.

As such, in the processing in S020 in the case where the determination result in S031 is negative, the second landing permissible region is determined in the above-described manner.

Figure 23:
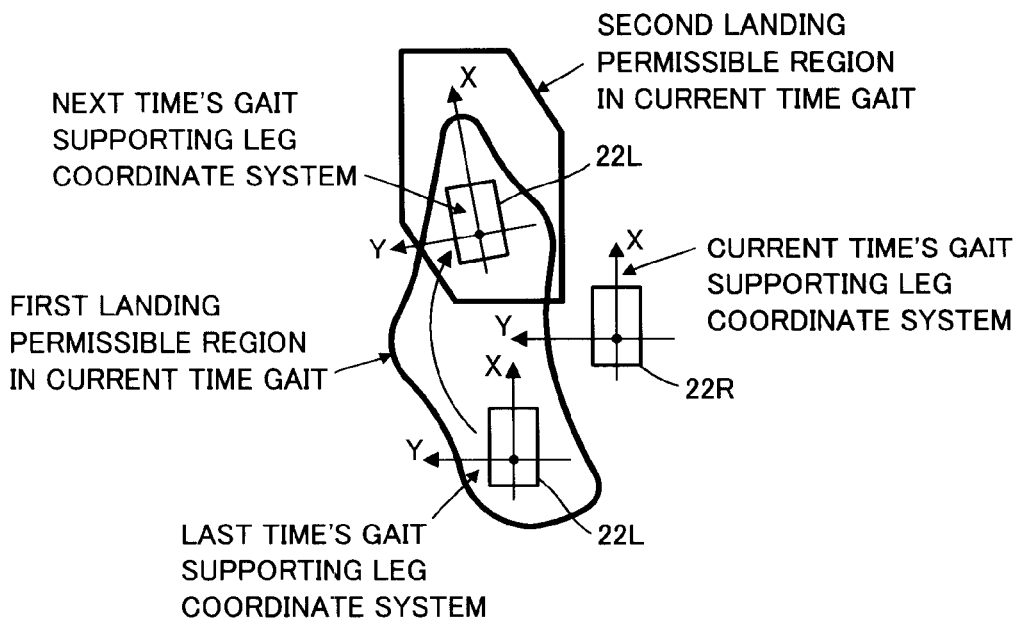
FIG. 23 is a diagram illustrating the processing for determining a desired landing position of a free leg foot in S020 that is carried out in the case where the determination result in S031 in FIG. 8 is negative.

Subsequently, the gait generation system 100 determines a new desired landing position of the free leg foot 22 of the current time gait, on the basis of the second landing permissible region determined as described above and the above-described first landing permissible region of the free leg foot 22 of the current time gait (the first landing permissible region in the current time gait shown in FIG. 9). In this case, as shown in FIG. 23, the new desired landing position of the free leg foot 22 of the current time gait is determined within a region where the first and second landing permissible regions overlap each other.

The new desired landing position may be determined for example in the vicinity of the center of the overlapping region of the first and second landing permissible regions, although it may be determined in another position as long as it is within the overlapping region. For example, the new desired landing position may be determined, within the overlapping region, in the position as close as possible to the required value of the landing position of the free leg foot 22 of the current time gait defined by the above-described request parameters.

Further, the gait generation system 100 determines a new desired landing posture of the free leg foot 22 of the current time gait to be identical to the desired landing posture corresponding to the next time's gait supporting leg coordinate system previously determined in the latest S020 processing.

Then, the gait generation system 100 determines the supporting leg coordinate system corresponding to the new desired landing position/posture of the free leg foot 22 of the current time gait, determined in the above-described manner, as a new next time's gait supporting leg coordinate system.

Further, the gait generation system 100 determines a correction amount $\Delta Tm$ of the current time gait cycle, within the gait cycle permissible range, in accordance with the desired landing position of the free leg foot 22 of the current time gait newly determined as described above. That is, when the value of $\Delta Tm$ to be determined is denoted by $\Delta Tma$, $\Delta Tma$ is determined such that the desired landing position of the free leg foot 22 of the current time gait which is newly determined is included within a permissible region for the desired landing position of the free leg foot 22 of the current time gait that is calculated, in a similar manner as the $\Delta Tm$ lower-limit-time landing permissible region and the $\Delta Tm$ upper-limit-time landing permissible region, on the basis of the permissible range of $\Delta POS$ in the case where $\Delta Tm = \Delta Tma$ and the desired landing position of the free leg foot 22 of the current time gait corresponding to the next time's gait supporting leg coordinate system previously determined in the latest S020 processing.

In this case, $\Delta Tma$ may be determined, for example, to be a value that is as close as possible to the required value defined by the above-described request parameters within the range of $\Delta Tm$ that ensures that the desired landing position of the free leg foot 22 of the current time gait newly determined is included in the permissible region for the desired landing position of the free leg foot 22 of the current time gait in the case where $\Delta Tm = \Delta Tma$.

Alternatively, $\Delta Tma$ may be determined, for example, to be a value that is closest to "0" (including "0") within the range of $\Delta Tm$ that ensures that the desired landing position of the free leg foot 22 of the current time gait newly determined is included in the permissible region for the desired landing position of the free leg foot 22 of the current time gait in the case where $\Delta Tm = \Delta Tma$.

The gait generation system 100 determines a new current time gait cycle by adding $\Delta Tm$, determined as described above, to the current time gait cycle previously determined in the latest S020 processing.

Further, the gait generation system 100 sets the first landing permissible region in the next time's gait supporting leg coordinate system (i.e. the first landing permissible region of the free leg foot 22 of the next time gait) in accordance with the newly determined desired landing position/posture of the free leg foot 22 of the current time gait. Then, the gait generation system 100 determines for example a position in this first landing permissible region that is closest to the desired landing position (including the same position as the desired landing position) of the free leg foot 22 corresponding to the next but one time's gait supporting leg coordinate system previously determined in the latest S020 processing, to be a new desired landing position of the free leg foot 22 of the next time gait.

Furthermore, the gait generation system 100 determines a new desired landing posture of the free leg foot 22 of the next time gait as the same posture as the desired landing posture of the free leg foot 22 corresponding to the next but one time's gait supporting leg coordinate system previously determined in the latest S020 processing.

Then, the gait generation system 100 determines the supporting leg coordinate system corresponding to the desired landing position/posture of the free leg foot 22 of the next time gait, newly determined in the above-described manner, as a new next but one time's gait supporting leg coordinate system.

Further, the gait generation system 100 determines a new next time gait cycle as the same value as the next time gait cycle previously determined in the latest S020 processing.

The above is the processing that is carried out in S020 in the case where the determination result in S031 is negative. Accordingly, the next time's gait supporting leg coordinate system, the next but one time's gait supporting leg coordinate system, the current time gait cycle, and the next time gait cycle are determined anew.

The subsequent processing from S022 is carried out in the same manner as described above. That is, the processing in S020 through S028 is repeated until the determination result in S031 turns to be affirmative.

Returning to FIG. 8, in the case where the determination result in S031 is affirmative, the process proceeds to S032, where the gait generation system 100 determines instantaneous values of the current time gait (including the instantaneous values of the desired foot position/posture of the current time gait at the present control cycle). In S032, the current time gait instantaneous values are determined such that the model manipulation floor reaction force moment determined by the posture stabilization control calculator 112 as previously described is generated about a desired ZMP.

Figure 24:
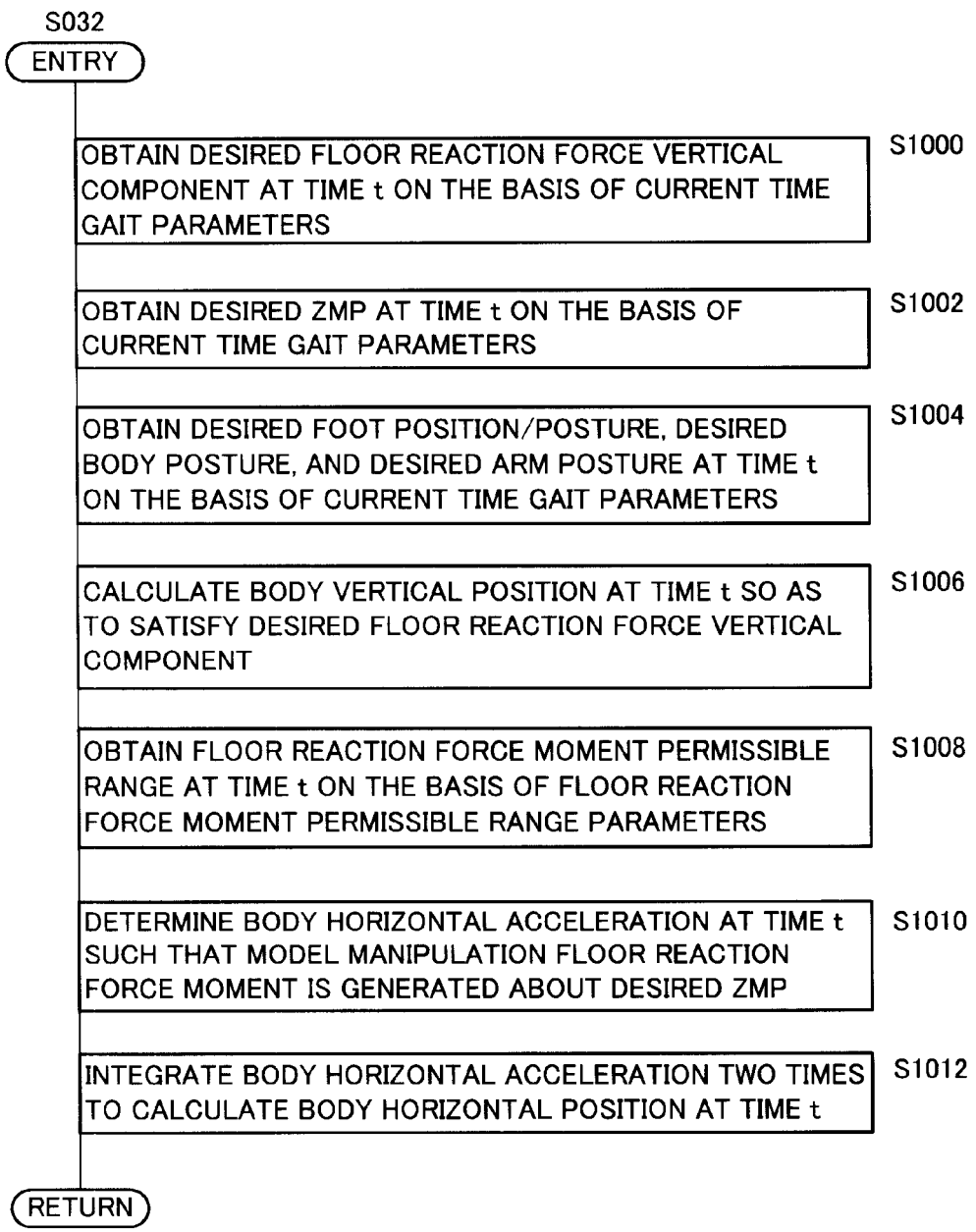
FIG. 24 is a flowchart showing the subroutine processing in S032 in FIG. 8.

Specifically, the gait instantaneous values are determined as illustrated by a flowchart in FIG. 24. The processing will now be described. Firstly, the gait generation system 100 carries out the processing from S1000 to S1006 in a similar manner as the processing from S806 to S812 in FIG. 19 (or from S306 to S312 in FIG. 16), to thereby calculate the instantaneous values of the desired floor reaction force vertical component, the desired ZMP, the desired foot position/posture, the desired body posture, the desired arm posture, and the desired body vertical position at the present time t (the present control cycle) of the current time gait.

These instantaneous values are calculated in the same manner as in the processing from S806 to S812 in FIG. 19 (or from S306 to S312 in FIG. 16) except that the current time gait parameters that have been corrected lastly in S028 in FIG. 8 are used as the gait parameters.

The process then proceeds to S1008, where the gait generation system 100 determines an instantaneous value of the floor reaction force moment permissible range at the present time t of the current time gait, on the basis of the floor reaction force moment permissible range parameters determined in S030 in FIG. 8. The instantaneous value of the floor reaction force moment permissible range is output from the gait generation system 100 to the previously-described compensating total floor reaction force moment distributor 110 (see FIG. 3). Then, the model manipulation floor reaction force moment (the value at the present time t) calculated in the distributor 110 in accordance with the above expression 52 is supplied to the gait generation system 100.

The process then proceeds to S1010, where the gait generation system 100 determines a body horizontal acceleration at the present time t of the current time gait such that the model manipulation floor reaction force moment supplied from the compensating total floor reaction force moment distributor 110 is generated about the desired ZMP (such that the horizontal component of the moment generated about the desired ZMP by the resultant force of the inertial force of the robot 1 and the gravitational force balances with the model manipulation floor reaction force moment).

In other words, the body horizontal acceleration at the present time t of the current time gait is determined such that the moment generated about the desired ZMP by the resultant force of the inertial force of the robot 1 and the gravitational force agrees with the model manipulation floor reaction force moment with its sign reversed.

In this case, the body horizontal acceleration of the current time gait is calculated by using the dynamic model (the inverted pendulum model) in FIG. 7 for example, in a similar manner as in the processing in S814 in FIG. 19.

Specifically, the vertical position and the horizontal position of the body mass point 24$b$ at the present time t are determined on the basis of the body vertical position at the present time t of the current time gait, the body horizontal position at time (t–Δt), and the desired body posture at the present time t. Alternatively, the body horizontal position at time t may be estimated in an interpolating manner on the basis of either the time series of the body horizontal position up to time (t–Δt) or the gait state at time (t–Δt), and the estimated body horizontal position may be used in place of the body horizontal position at time (t–Δt).

Further, a value obtained by subtracting the gravitational force (=mb*g) acting on the body mass point 24$b$ from the floor reaction force vertical component at the present time t of the current time gait is divided by the mass mb of the body mass point 24$b$, to thereby obtain a vertical acceleration of the body mass point 24$b$ at the present time t.

Then, the vertical position, the horizontal position, and the vertical acceleration of the body mass point 24$b$, which have been determined as described above, are substituted into Zb, Xb, and d2Zb/dt2, respectively, of the above expression 04, the horizontal position and the vertical position of the desired ZMP at the present time t are substituted into Xzmp and Zzmp, respectively, of the expression 04, and Mzmp_y of the expression 04 is made to coincide with the model manipulation floor reaction force moment. The resultant expression is then solved on d2Xb/dt2, to calculate the body mass point horizontal acceleration d2Xb/dt2 at the present time t. This body mass point horizontal acceleration d2Xb/dt2 is obtained as the body horizontal acceleration at the present time t.

Alternatively, a more precise dynamic model may be used to determine, in an exploratory manner, the body horizontal acceleration that causes the horizontal component of the floor reaction force moment about the desired ZMP to agree with the model manipulation floor reaction force moment.

The process then proceeds to S1012, where the body horizontal acceleration obtained as described above in S1010 is integrated two times so as to calculate a body horizontal position at the present time t. This calculation is similar to that in S316 in FIG. 16 (or S816 in FIG. 19). This completes the processing in S032 in FIG. 8.

The process then proceeds to S034, where arm operations for cancelling a spinning force (so as to cause the floor reaction force moment vertical component generated about the desired ZMP by the motions of the portions other than the arms of the robot 1 to attain "0" or substantially "0") are determined. Specifically, the floor reaction force moment vertical component trajectory at the desired ZMP in the case where the arms are not swung (strictly speaking, each instantaneous value, with its sign reversed, of the vertical component trajectory of the moment acting on the desired ZMP due to the resultant force of the gravitational force and the inertial force of the robot when a gait is generated without arm swings) is obtained.

Namely, the instantaneous value of the vertical component of the floor reaction force moment about the desired ZMP that balances with the instantaneous value of the motion (including no arm swinging motion) of the current time gait generated by the processing in S032 is obtained. Then, the instantaneous value of the floor reaction force moment vertical component is divided by an equivalent inertia moment of an arm swinging motion so as to obtain an angular acceleration of the arm swinging operation necessary to cancel the spinning force. In the case where the arm swing is excessively large, the instantaneous value of the floor reaction force moment vertical component may be divided by a value that is larger than the equivalent inertia moment.

Subsequently, the gait generation system 100 integrates the angular acceleration two times and passes the resultant value through a low-cut filter for preventing the integral from becoming excessive. The gait generation system 100 then sets the obtained angle as an arm swinging operation angle. In the arm swinging operation, the right and left arms are swung longitudinally in opposite directions so as not to change the center of gravity of both arms. Alternatively, an arm swinging motion for cancelling the spinning force may be generated in the normal gait as well, and the arm swinging motion in the current time gait may be determined so as to continue to the arm swinging motion in the normal gait.

The process then proceeds to S036, where the gait generation system 100 adds the control cycle $\Delta t$ to the time t, and carries out the processing from S014 again.

As a result, the instantaneous values of the current time gait are generated in a time series manner.

In this case, the current time gait is determined so as to cause the trajectory of the desired motion of the current time gait to converge to (or gradually approximate to) the motion trajectory of the normal gait, which is a cyclic motion as a virtual normative motion, in the future.

More specifically, after the initial states (initial divergent component and others) of the normal gait following the current time gait are determined, the foot trajectory parameters that define the foot position/posture trajectory of the current time gait that can satisfy the above-described geometric leg motion requisite condition are provisionally determined, and then, the ZMP trajectory parameters that define a desired ZMP trajectory are determined, by using the dynamic model (in the present embodiment, the dynamic model shown in FIG. 7) of the robot 1, so as to be able to satisfy the motion continuity requisite condition for causing the trajectory of the desired motion of the current time gait to converge to the motion trajectory of the normal gait.

In the case where the desired ZMP trajectory thus determined satisfies the above-described ZMP existence region requisite condition (i.e. in the case where the determination result in S031 in FIG. 8 is affirmative), instantaneous values of the desired gait (current time gait) including the desired foot position/posture and the desired body position/posture are determined in sequence by using the foot trajectory parameters previously determined provisionally, the ZMP trajectory parameters, and the dynamic model of the robot 1 (in the present embodiment, the dynamic model in FIG. 7).

In this case, in the present embodiment, when sequentially generating the instantaneous values of the desired motion of the current time gait, for the purposes of performing feedback control of the actual body posture of the robot 1 to the desired posture, the desired body position of the robot 1 is determined such that the above-described model manipulation floor reaction force moment as the feedback manipulated variable is generated about the desired ZMP on the dynamic model.

Further, in the case where the determination result in S031 in FIG. 8 is negative, the desired landing position or the desired landing time of the free foot leg 22 in the current time gait is corrected so as to make it possible to determine a desired ZMP trajectory that can satisfy both the ZMP existence region requisite condition and the motion continuity requisite condition. In this case, the relationship among the landing position correction amount $\Delta POS$, the landing time correction amount $\Delta Tm$, and the change amount $\Delta ZMP$ (change amount of the height a of the trapezoidal pattern of the ZMP correction amount) of the desired ZMP for satisfying the motion continuity requisite condition is expressed by the above expression 152.

Then, the ZMP/landing position sensitivity Sp and the ZMP/landing time sensitivity St defining the relationship expressed by the expression 152 are calculated, and then, the ZMP existence permissible region related to the ZMP existence region requisite condition and the above-described gait cycle permissible range are converted, on the basis of the expression 152, into the second landing permissible region which is the permissible region for the landing position of the free leg foot 22 of the current time gait.

In this manner, the permissible region for the desired landing position (i.e. the second landing permissible region) of the free leg foot 22 of the current time gait is determined which makes it possible to determine a desired ZMP trajectory that can satisfy the ZMP existence region requisite condition and the motion continuity requisite condition, inclusive of the influence of the correction (within the range capable of satisfying the gait cycle permissible range) of the desired landing time of the free leg foot 22 of the current time gait.

Then, a new desired landing position of the free leg foot 22 of the current time gait is determined within the region where the second landing permissible region overlaps the first landing permissible region corresponding to the geometric leg motion requisite condition, and hence, the current time's gait supporting leg coordinate system is determined. Further, a new current time gait cycle is determined so as to be able to realize the desired landing position (and consequently, a new desired landing time of the free leg foot 22 of the current time gait is determined).

Further, using the current time's gait supporting leg coordinate system and the current time gait cycle newly determined as described above, new foot trajectory parameters of the current time gait and new ZMP trajectory parameters thereof (parameters defining a desired ZMP trajectory that can cause the desired motion of the current time gait to converge to the motion of the normal gait) are determined anew, and then the determination processing in S031 is carried out again.

In this case, the desired landing position of the free leg foot 22 of the current time gait expressed by the new foot trajectory parameters is determined at a position within the second landing permissible region, and accordingly, the determination result in S031 is basically affirmative. Then, using the new foot trajectory parameters, the new ZMP trajectory parameters, and the dynamic model of the robot 1 (in the present embodiment, the dynamic model in FIG. 7), the instantaneous values of the desired gait (current time gait) including the desired foot position/posture and the desired body position/posture are determined sequentially.

According to the present embodiment, in the case where the determination result in S031 is negative and it is thus necessary to correct the desired landing position and/or the desired landing time of the free leg foot 22 of the current time gait, the second landing permissible region determined in the above-described manner is used to determine a desired landing position of the free leg foot 22 of the current time gait in the region where the second landing permissible region and the above-described first landing permissible region overlap each other. This enables the foot trajectory parameters to be determined to satisfy the geometric leg motion requisite condition, and further to make it possible to determine a desired ZMP trajectory that can satisfy the ZMP existence region requisite condition and the motion continuity requisite condition.

As such, the processing of determining the foot trajectory parameters by correcting the desired landing position and/or the desired landing time of the free leg foot 22 of the current time gait so as to be able to satisfy the geometric leg motion requisite condition, the ZMP existence region requisite condition, and the motion continuity requisite condition can be carried out following the appropriate guidelines. Accordingly, the foot trajectory parameters appropriate for satisfying the geometric leg motion requisite condition, the ZMP existence region requisite condition, and the motion continuity requisite condition can be determined efficiently and in a short time, without the need of exploratory processing of repeatedly correcting the desired landing position and/or the desired landing time of the free leg foot 22 of the current time gait by try and error.

As a result, the control cycle can be shortened and, hence, the responsiveness of the operation control of the robot 1 can be improved.

Here, the correspondence between the above-described embodiment and the present invention will be described supplementally.

The foot trajectory parameter and the ZMP trajectory parameter in the present embodiment correspond to the leg motion parameter and the floor reaction force element parameter, respectively, of the present invention. The ZMP (floor reaction force central point) in the present embodiment corresponds to the floor reaction force element of the present invention.

Further, the geometric leg motion requisite condition, the ZMP existence region requisite condition, and the motion continuity requisite condition in the present embodiment correspond to the geometric leg motion requisite condition, the floor reaction force element permissible range requisite condition, and the motion continuity requisite condition, respectively, of the present invention.

Furthermore, the processing of S600 included in the processing of S026 that is carried out for the first time in each control cycle implements the leg motion parameter provisionally determining unit of the present invention. The foot trajectory parameters determined by the processing of S600 in the processing of S026 that is carried out for the first time in each control cycle are substantially defined by the next time's gait supporting leg coordinate system and the current time gait cycle determined by the processing of S020 that is carried out for the first time in each control cycle (i.e. the processing of S020 that is carried out following the processing of S016 or S018). Therefore, the processing of S020 may be regarded as the leg motion parameter provisionally determining unit.

The processing of S608 included in the processing of S026 that is carried out for the first time in each control cycle implements the floor reaction force element parameter provisionally determining unit of the present invention.

The loop processing in S702 through S716 included in the processing of S028 that is carried out for the first time in each control cycle implements the ZMP correction amount determining unit of the present invention.

The determination processing in S031 implements the determining unit of the present invention.

Further, the processing of S020 (to be more specific, the processing for determining the first landing permissible region included in the processing of S020) implements the first landing permissible region determining unit of the present invention.

Furthermore, the processing of S020 that is carried out in the case where the determination result in S031 is negative (to be more specific, the processing for determining the second landing permissible region included in the processing of S020) implements the second landing permissible region determining unit of the present invention. In this case, the ZMP/landing position sensitivity Sp and the ZMP/landing time sensitivity St described above each correspond to the landing position-landing time-floor reaction force element interrelation parameter of the present invention.

Still further, the processing of S600 included in the processing of S026 that is carried out in the case where the determination result in S031 is negative implements the leg motion parameter determining unit of the present invention, and the processing of S718 included in the processing of S028 that is carried out in the case where the determination result in S031 is negative implements the floor reaction force element parameter determining unit of the present invention.

Second Embodiment

In the above-described embodiment, in the processing in S020, as the permissible regions for restricting the desired landing position of the free leg foot 22, two permissible regions of the first landing permissible region corresponding to the geometric leg motion requisite condition and the second landing permissible region corresponding to the motion continuity requisite condition and the ZMP existence region requisite condition (the floor reaction force element permissible range requisite condition) have been used on the premise that the floor surface is a surface on which the free leg foot 22 can be landed at any place.

However, in the case where the position on which the free leg foot 22 can land is restricted dependent on the environment surrounding the robot 1 (for example, in the case where the floor surface is made up of stepping stones, in the case where there are irregularities, steps, or obstacles on the floor surface on which it is not preferable for the foot 22 to land, or in the case where the floor surface is locally slippery), it may be configured to further set a third landing permissible region which is dependent on the environment, and to determine the desired landing position of the free leg foot 22 in the processing in S020 by further taking the third landing permissible region into consideration.

Figure 25:
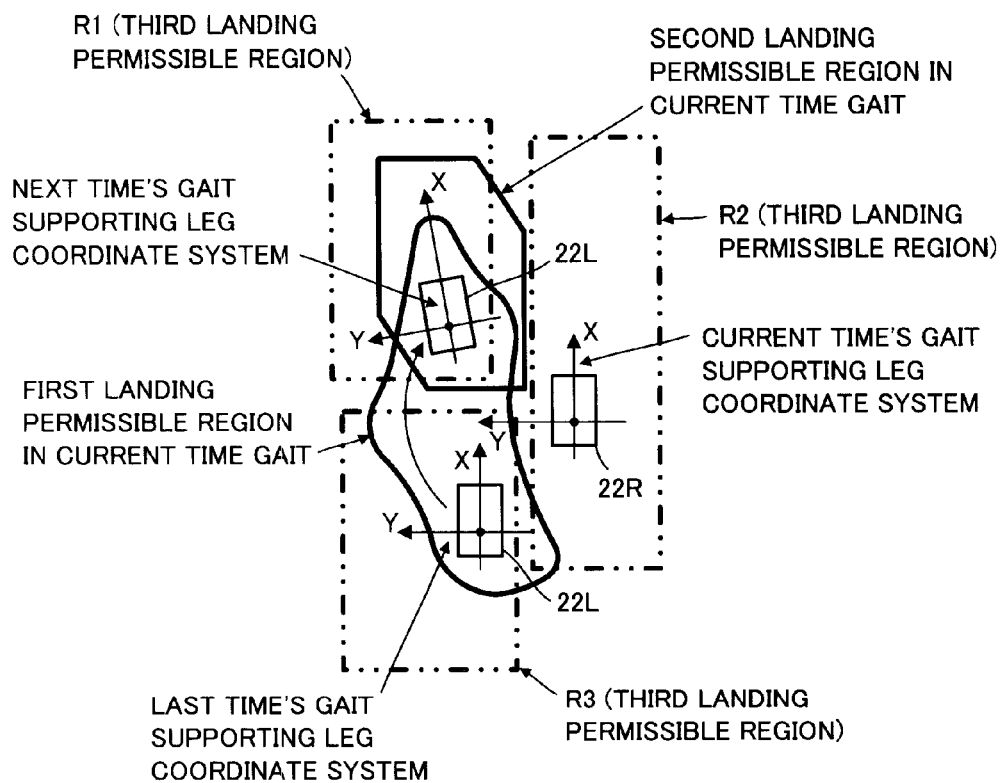
FIG. 25 is a diagram illustrating the processing for determining the desired landing position of the free leg foot in S020 in FIG. 8 according to a second embodiment of the present invention.

A more specific example of using such a third landing permissible region will now be described as a second embodiment with reference to FIG. 25. The processing in the second embodiment is identical to that of the first embodiment except for a part of the processing that the gait generation system 100 carries out in S020 in FIG. 8. Thus, the difference will primarily be described below. The parts identical to those of the first embodiment will be denoted by the same reference characters as in the first embodiment, and description thereof will not be repeated.

In the present embodiment, the environmental information about the surroundings of the robot 1, including the above-described floor shape information, is input to the gait generation system 100. The environmental information may include, besides the floor shape information, property information of the floor surface, such as how slippery the surface is (or a friction coefficient thereof), the degree of hardness and the like, and location information of the obstacles arranged on the floor surface. Of the environmental information, the floor shape information includes, for example, location information of irregularities, steps, stepping stones and the like existent on the floor surface, and other detailed information about the shape of the floor surface.

In the processing in S020, the gait generation system 100 determines the third landing permissible region on the basis of the environmental information. For example, regions R1, R2, and R3 delimited by chain double-dashed lines in FIG. 25 are determined as the third landing permissible regions. In the illustrated example, the floor surface inside each of the third landing permissible regions R1, R2, and R3 is the surface that is generally flat and unlikely to slip, on which the free leg foot 22 (22L in the illustrated example) can be landed with no problem. The spaces between the neighboring two of the third landing permissible regions R1, R2, and R3 are the portions including e.g. irregularities, steps, obstacles, or slippery parts, on which it is not possible, or not preferable, for the free leg foot 22 (22L in the illustrated example) to land.

In general, the environmental information would not change in a relatively short period, such as within the period during which a current time gait is generated. Therefore, the processing for determining the third landing permissible region(s) may be performed for example only in the case where the determination result in S016 is affirmative.

Then, in the processing in S020, the gait generation system 100 determines the next time's gait supporting leg coordinate system and the next but one time's gait supporting leg coordinate system to reflect the third landing permissible region(s) determined as described above.

Specifically, in the processing of S020 that is performed following the processing in S018 or the determination processing in S016, the gait generation system 100 firstly sets the first landing permissible region that restricts the landing position of the free leg foot 22 of the current time gait (the first landing permissible region on the current time's gait supporting leg coordinate system), in a similar manner as in the first embodiment, and then determines a desired landing position of the free leg foot 22 within a region where the first landing permissible region overlaps the third landing permissible region. For example in the case illustrated in FIG. 25, the desired landing position of the free leg foot 22L of the current time gait is determined in the region where the first landing permissible region overlaps the third landing permissible region R1 among the third landing permissible regions R1, R2, and R3, as shown in the figure.

In this case, the way of determining the desired landing position of the free leg foot 22 in the region where the first landing permissible region and the third landing permissible region overlap each other may be the same as the way of determining the desired landing position of the free leg foot 22 in the first landing permissible region in S020 in the first embodiment.

Further, the gait generation system 100 determines a desired landing posture of the free leg foot 22 of the current time gait in a similar manner as in the first embodiment. The gait generation system 100 then determines a supporting leg coordinate system corresponding to the desired landing position/posture of the free leg foot 22 of the current time gait, determined as described above, as the next time's gait supporting leg coordinate system.

Subsequently, the gait generation system 100 sets the first landing permissible region that restricts the landing position of the free leg foot 22 of the next time gait (the first landing permissible region on the next time's gait supporting leg coordinate system), similarly as in the first embodiment, and then determines the next but one time's gait supporting leg coordinate system in a similar manner as described above.

In this case, the desired landing position of the free leg foot 22 of the next time gait that defines the position of the origin of the next but one time's gait supporting leg coordinate system is determined in a region where the first landing permissible region that has been set on the next time's gait supporting leg coordinate system as a permissible region for the desired landing position of the free leg foot 22 of the next time gait overlaps the above-described third landing permissible region. The way of determining the desired landing position here may be the same as the way of determining the desired landing position of the free leg foot 22 of the next time gait in the first landing permissible region on the next time's gait supporting leg coordinate system in S020 in the first embodiment. Further, the desired landing posture of the free leg foot 22 of the next time gait is determined in a similar manner as in the first embodiment.

In the processing of S020 that is carried out following the processing in S018 or the determination processing in S016, the gait cycles of the current time gait and the next time gait are determined in a similar manner as in the first embodiment.

Further, in the processing of S020 that is carried out following the determination processing in S031, the gait generation system 100 firstly sets the first landing permissible region and the second landing permissible region that restrict the landing position of the free leg foot 22 of the current time gait (the first and second landing permissible regions on the current time's gait supporting leg coordinate system), in a similar manner as in the first embodiment, and then determines a desired landing position of the free leg foot 22 of the current time gait within a region where the first landing permissible region, the second landing permissible region, and the third landing permissible region overlap one another. For example in the case illustrated in FIG. 25, the desired landing position of the free leg foot 22L of the current time gait is determined in the region where the first landing permissible region, the second landing permissible region, and the third landing permissible region R1 among the third landing permissible regions R1, R2, and R3 overlap one another, as shown in the figure.

In this case, the way of determining the desired landing position of the free leg foot 22 of the current time gait in the region where the first, second, and third landing permissible regions overlap one another may be the same as the way of determining the desired landing position of the free leg foot 22 of the current time gait in the region where the first and second landing permissible regions overlap each other in S020 in the first embodiment.

Further, the gait generation system 100 determines a desired landing posture of the free leg foot 22 of the current time gait in a similar manner as in the first embodiment. Then, the gait generation system 100 determines a supporting leg coordinate system corresponding to the desired landing position/posture of the free leg foot 22 of the current time gait, determined as described above, as the next time's gait supporting leg coordinate system.

Subsequently, the gait generation system 100 determines the first landing permissible region for the free leg foot 22 of the next time gait (the first landing permissible region on the next time's gait supporting leg coordinate system) in a similar manner as in the first embodiment, and determines a desired landing position of the free leg foot 22 of the next time gait in a region where the first landing permissible region and the third landing permissible region overlap each other. The way of determining the desired landing position here may be the same as the way of determining the desired landing position of the free leg foot 22 of the next time gait within the first landing permissible region in S020 in the first embodiment.

Further, the gait generation system 100 determines a desired landing posture of the free leg foot 22 of the next time gait in a similar manner as in the first embodiment. Then, the gait generation system 100 determines a supporting leg coordinate system corresponding to the desired landing position/posture of the free leg foot 22 of the next time gait, determined as described above, as the next but one time's gait supporting leg coordinate system.

In the processing of S020 that is carried out following the determination processing in S031, the gait cycles of the current time gait and the next time gait are determined in a similar manner as in the first embodiment.

The remaining processing in the second embodiment is similar to that of the first embodiment.

Supplementally, in the second embodiment, in the case where there is more than one third landing permissible region, there may be more than one region in which the first landing permissible region and the third landing permissible region overlap each other, or there may be more than one region in which the first, second, and third landing permissible regions overlap one another. In such a case, the desired landing position of the free leg foot 22 may be determined in one of such regions having the largest area.

According to the present embodiment, it is possible to determine, efficiently and in a short time, appropriate foot trajectory parameters taking account of the restraints dependent on the environment surrounding the robot 1 in addition to the geometric leg motion requisite condition, the ZMP existence region requisite condition, and the motion continuity requisite condition described above.

It is noted that in the present embodiment, the processing of S020 (to be more specific, the processing for determining the third landing permissible region included in the processing of S020) implements the third landing permissible region determining unit of the present invention.

[Modifications]

Hereinafter, some modifications to the above-described embodiments will be described.

In the above-described embodiments, it has been configured such that the current time gait cycle (the desired landing time of the free leg foot 22 of the current time gait) can also be corrected in the case where the determination result in S031 is negative. Alternatively, it may be configured such that only the desired landing position of the free leg foot 22 of the current time gait can be corrected. In this case, the second landing permissible region may be determined on the basis of the above expression 152 in which $\Delta Tm$ is set to "0". In this case, it is unnecessary to calculate the ZMP/landing time sensitivity St. The ZMP/landing position sensitivity Sp corresponds to the landing position-floor reaction force element interrelation parameter of the present invention.

Further, in the above-described embodiments, it has been configured such that the model manipulation floor reaction force moment as the feedback manipulated variable for causing the body posture angle error $\Delta\theta$ to converge to "0" is fed back to the gait generation system 100. Alternatively, the model manipulation floor reaction force moment may be set constantly to "0".

Furthermore, in the above-described embodiments, in calculating the ZMP/landing position sensitivity Sp and/or the ZMP/landing time sensitivity St, it has been configured to calculate anew the initial state of the normal gait by carrying out the same processing as that in S022 and S024. For calculating Sp and/or St, however, each of the desired landing position and the desired landing time of the free leg foot 22 of the current time gait will be changed by only a prescribed minute amount. Therefore, it may be configured such that the initial state of the normal gait that has been determined in the processing in latest S022 and S024 prior to the determination processing in S031 is used as it is to carry out the same processing as that in S026 and S028.

In the above-described embodiments, the walking operation of the robot 1 has been described by way of example. However, in the case of the running operation of the robot 1 as well, the desired landing position and/or the desired landing time of the free leg foot 22 of the current time gait may be corrected in a similar manner as in the above embodiments. In this case, as the dynamic model for generating a desired gait of the robot 1, the dynamic model proposed by the present applicant in Japanese Patent No. 4246638 (the dynamic model including a flywheel and a plurality of mass points), for example, may be used.

In the case of the walking operation as well, the dynamic model proposed in an embodiment in Japanese Patent No. 4246638 or a multi-mass-point model including a mass point for each link of the robot 1 may be used as the dynamic model of the robot 1, to generate a desired gait.

Furthermore, while the ZMP has been used as the floor reaction force element of the present invention in the above-described embodiments, the floor reaction force moment about a prescribed point on a floor surface, for example, may be used as well.

What is claimed is:

1. A control device for a legged mobile robot having a plurality of legs extended from a base body, the control device being configured to determine, while the robot is in motion, a leg motion parameter and a floor reaction force element parameter to satisfy a plurality of kinds of requisite conditions, the leg motion parameter defining a motion trajectory of a distal end portion of each leg, the floor reaction force element parameter defining a desired trajectory of a floor reaction force element which is a prescribed constituent element of a floor reaction force to be applied to the robot, and use the leg motion parameter and the floor reaction force element parameter to generate a desired gait including at least a desired motion of the robot, to thereby control an operation of the robot so as to cause an actual gait of the robot to follow the desired gait, the plurality of kinds of requisite conditions including at least a geometric leg motion requisite condition that the motion trajectory of the distal end portion of each leg defined by the leg motion parameter becomes a motion trajectory within a geometrical range of movement of the leg, a motion continuity requisite condition that the desired trajectory of the floor reaction force element defined by the floor reaction force element parameter becomes a desired trajectory capable of implementing a continuous motion of the robot on a dynamic model expressing the dynamics of the robot, and a floor reaction force element permissible range requisite condition that a desired value of the floor reaction force element on the desired trajectory of the floor reaction force element defined by the floor reaction force element parameter falls within a prescribed permissible range, the control device comprising:

a first landing permissible region determining unit configured to determine a first landing permissible region, the first landing permissible region being a first permissible region for a desired landing position of a distal end portion of a free leg among the plurality of legs of the robot that is to be landed after the present time, so as to satisfy the geometric leg motion requisite condition;

a second landing permissible region determining unit configured to determine a second landing permissible region, the second landing permissible region being a second permissible region for the desired landing position that makes it possible to determine a desired trajectory of the floor reaction force element that satisfies the motion continuity requisite condition and the floor reaction force element permissible range requisite condition, on the basis of a relation and the permissible range related to the desired value of the floor reaction force element, the relation including a relationship between a change of the desired landing position of the distal end portion of the free leg and a change of the floor reaction force element satisfying the motion continuity requisite condition;

a leg motion parameter determining unit configured to determine the leg motion parameter such that the desired landing position of the distal end portion of the free leg is located within a region in which at least the first landing permissible region and the second landing permissible region overlap each other; and a floor reaction force element parameter determining unit configured to determine the floor reaction force element parameter defining the desired trajectory of the floor reaction force element, by using the leg motion parameter.

2. The control device for a legged mobile robot according to claim 1, further comprising a third landing permissible region determining unit configured to determine a third landing permissible region, the third landing permissible region being a third permissible region for the desired landing position of the distal end portion of the free leg, on the basis of information about the environment surrounding the robot, wherein the leg motion parameter determining unit determines the leg motion parameter such that the desired landing position of the distal end portion of the free leg is located within a region in which at least the first landing permissible region, the second landing permissible region, and the third landing permissible region overlap one another.

3. The control device for a legged mobile robot according to claim 1, wherein the motion continuity requisite condition is a condition that, in the case where the desired trajectory of the floor reaction force element defined by the floor reaction force element parameter is input into the dynamic model to generate a motion of the robot, a trajectory of the generated motion converges to a motion trajectory in a cyclic gait, the cyclic gait being a gait in which a motion of a same pattern of the robot is repeated periodically.

4. The control device for a legged mobile robot according to claim 1, wherein the leg motion parameter determining unit is configured to determine the leg motion parameter so as to allow a desired landing time of the free leg to be adjusted within a prescribed permissible range, and the second landing permissible region determining unit determines the second landing permissible region on the basis of a relation among a change of the desired landing position of the distal end portion of the free leg, a change of the desired landing time of the distal end portion of the free leg, and a change of the floor reaction force element satisfying the motion continuity requisite condition, the permissible range related to the desired value of the floor reaction force element, and the permissible range related to the desired landing time of the free leg.

5. The control device for a legged mobile robot according to claim 1, wherein the floor reaction force element is a position of a ZMP as a point of application of a total floor reaction force acting on the robot, and the permissible range related to the desired value of the floor reaction force element is an existence permissible region of the ZMP set within a supporting polygon determined in accordance with a contact surface of the robot with a floor surface.

6. The control device for a legged mobile robot according to claim 1, wherein the floor reaction force element is a position of a ZMP as a point of application of a total floor reaction force acting on the robot, and the permissible range related to the desired value of the floor reaction force element is an existence permissible region of the ZMP set within a supporting polygon determined in accordance with a contact surface of the robot with a floor surface, the control device further comprising:

a leg motion parameter provisionally determining unit configured to determine a provisional value of the leg motion parameter such that the desired landing position of the free leg is within the first landing permissible region;

a floor reaction force element parameter provisionally determining unit configured to use the determined provisional value of the leg motion parameter to determine a provisional value of the floor reaction force element parameter defining a desired trajectory of the position of the ZMP which is the floor reaction force element so as to satisfy at least the floor reaction force element permissible range requisite condition;

a ZMP correction amount determining unit configured to use a provisional ZMP trajectory which is a desired trajectory of the position of the ZMP defined by the determined provisional value of the floor reaction force element parameter and the dynamic model to determine a ZMP correction amount for correcting the provisional ZMP trajectory so as to satisfy the motion continuity requisite condition; and a conclusion unit configured to determine whether a position of the ZMP obtained by correcting the provisional ZMP trajectory by the determined ZMP correction amount is within the existence permissible region; wherein in the case where the determination result of the conclusion unit is negative, the second landing permissible region conclusion unit calculates a change amount of the ZMP correction amount in the case where the desired landing position of the free leg is changed by a prescribed amount from the desired landing position defined by the determined provisional value of the leg motion parameter to thereby determine a landing position-floor reaction force element interrelation parameter defining a relation between a change of the desired landing position of the distal end portion of the free leg and a change of the floor reaction force element satisfying the motion continuity requisite condition, and converts the permissible range related to the desired value of the floor reaction force element into a permissible region for the desired landing position of the distal end portion of the free leg, in accordance with the relation defined by the landing position-floor reaction force element interrelation parameter, to thereby determine the second landing permissible region.

7. The control device for a legged mobile robot according to claim 4, wherein the floor reaction force element is a position of a ZMP as a point of application of a total floor reaction force acting on the robot, and the permissible range related to the desired value of the floor reaction force element is an existence permissible region of the ZMP set within a supporting polygon determined in accordance with a contact surface of the robot with a floor surface, the control device further comprising:

a leg motion parameter provisionally determining unit configured to determine a provisional value of the leg motion parameter such that the desired landing position of the free leg is within the first landing permissible region;

a floor reaction force element parameter provisionally determining unit configured to use the determined provisional value of the leg motion parameter to determine a provisional value of the floor reaction force element parameter defining a desired trajectory of the position of the ZMP which is the floor reaction force element so as to satisfy at least the floor reaction force element permissible range requisite condition;

a ZMP correction amount determining unit configured to use a provisional ZMP trajectory which is a desired trajectory of the position of the ZMP defined by the determined provisional value of the floor reaction force element parameter and the dynamic model to determine a ZMP correction amount for correcting the provisional ZMP trajectory so as to satisfy the motion continuity requisite condition; and a conclusion unit configured to determine whether a position of the ZMP obtained by correcting the provisional ZMP trajectory by the determined ZMP correction amount is within the existence permissible region; wherein in the case where the determination result of the conclusion unit is negative, the second landing permissible region conclusion unit calculates a change amount of the ZMP correction amount in the case where the desired landing position of the free leg is changed by a prescribed amount from the desired landing position defined by the determined provisional value of the leg motion parameter and a change amount of the ZMP correction amount in the case where the desired landing time of the free leg is changed by a prescribed amount from the desired landing time defined by the determined provisional value of the leg motion parameter to thereby determine a landing position-landing time-floor reaction force element interrelation parameter defining a relation among a change of the desired landing position of the distal end portion of the free leg, a change of the desired landing time of the distal end portion of the free leg, and a change of the floor reaction force element satisfying the motion continuity requisite condition, and converts the permissible range related to the desired value of the floor reaction force element and the permissible range related to the desired landing time of the distal end portion of the free leg into a permissible region for the desired landing position of the distal end portion of the free leg, in accordance with the relation defined by the landing position-landing time-floor reaction force element interrelation parameter, to thereby determine the second landing permissible region.

* * * * *